US012081052B2

(12) United States Patent
Fuchs et al.

(10) Patent No.: US 12,081,052 B2
(45) Date of Patent: Sep. 3, 2024

(54) VEHICLE COMMUNICATION AND MONITORING

(71) Applicant: Polaris Industries Inc., Medina, MN (US)

(72) Inventors: Benjamin S. Fuchs, Nowthen, MN (US); Timothy P. Norstad, Turtle Lake, WI (US); Kevin E. Nelson, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 188 days.

(21) Appl. No.: 17/506,249

(22) Filed: Oct. 20, 2021

(65) Prior Publication Data
US 2022/0123570 A1    Apr. 21, 2022

Related U.S. Application Data

(60) Provisional application No. 63/192,407, filed on May 24, 2021, provisional application No. 63/093,819, filed on Oct. 20, 2020.

(51) Int. Cl.
H02J 7/00        (2006.01)
B60L 58/12       (2019.01)
H04L 12/40       (2006.01)

(52) U.S. Cl.
CPC .......... H02J 7/0048 (2020.01); B60L 58/12 (2019.02); H04L 12/40032 (2013.01); H04L 2012/40215 (2013.01)

(58) Field of Classification Search
CPC .. H02J 7/0048; B60L 58/12; H04L 12/40032; H04L 2012/40215
See application file for complete search history.

(56) References Cited

U.S. PATENT DOCUMENTS

| | | | |
|---|---|---|---|
| 3,979,657 A * | 9/1976 | Yorksie ................... | H02J 9/002 340/661 |
| 9,352,635 B1 * | 5/2016 | Schepmann ....... | B60H 1/00392 |
| 2012/0158249 A1 | 6/2012 | Xu et al. | |
| 2012/0271484 A1 | 10/2012 | Feit et al. | |
| 2012/0313769 A1 | 12/2012 | Holbert et al. | |
| 2013/0005272 A1 * | 1/2013 | Shah ..................... | H04B 1/7113 455/67.11 |
| 2013/0060410 A1 | 3/2013 | Crain et al. | |
| 2013/0253729 A1 | 9/2013 | Takahashi et al. | |
| 2014/0135061 A1 | 5/2014 | Rousu et al. | |
| 2014/0300739 A1 | 10/2014 | Mimar | |
| 2014/0343831 A1 * | 11/2014 | Hosey ................... | H02J 7/0032 324/426 |
| 2015/0127212 A1 | 5/2015 | Chacon et al. | |

(Continued)

OTHER PUBLICATIONS

International Search Report and Written Opinion received for PCT Patent Application No. PCT/US2021/055880, mailed on Mar. 17, 2022, 13 pages.

(Continued)

Primary Examiner — Hongmin Fan
(74) Attorney, Agent, or Firm — Faegre Drinker Biddle & Reath LLP

(57) ABSTRACT

Systems and methods for vehicle communication are provided, for example to provide various connectivity and functionality according to hardware availability, power constraints, and environmental conditions, among other examples.

11 Claims, 56 Drawing Sheets

(56) References Cited

U.S. PATENT DOCUMENTS

| | | | |
|---|---|---|---|
| 2015/0151648 | A1 | 6/2015 | Przybylski |
| 2016/0180721 | A1 | 6/2016 | Otulic |
| 2016/0207418 | A1 | 7/2016 | Bergstrom et al. |
| 2016/0294942 | A1 | 10/2016 | Tembey et al. |
| 2017/0015265 | A1 | 1/2017 | Watanabe |
| 2017/0051697 | A1 | 2/2017 | Campbell |
| 2017/0053461 | A1 | 2/2017 | Pal et al. |
| 2017/0108342 | A1 | 4/2017 | Foreman et al. |
| 2017/0166151 | A1 | 6/2017 | Gergely et al. |
| 2018/0101998 | A1 | 4/2018 | Pierce et al. |
| 2019/0118792 | A1 | 4/2019 | Malone et al. |
| 2019/0375298 | A1 * | 12/2019 | Symanow ............... B60L 50/61 |
| 2020/0294385 | A1 | 9/2020 | Lowe et al. |
| 2022/0118969 | A1 | 4/2022 | Liu et al. |

OTHER PUBLICATIONS

International Search Report and Written Opinion issued by the International Searching Authority, dated Jan. 25, 2022, for International Patent Application No. PCT/US2021/055803; 13 pages.
Invitation to Pay Additional Fees received for PCT Patent Application No. PCT/US2021/055880, mailed on Dec. 28, 2021, 2 pages.

* cited by examiner

|  | PLUG-IN/DONGLE (NO IVI)  |
|---|---|
| READ VS. READ/WRITE | LIMITED TO READ-ONLY<br>VEHICLE OFF: FROM PLUG-IN (GPS)<br>VEHICLE ON: LIVE VEHICLE DATA |
| ABILITY | NO DISPLAY TO ACT AS "BRAIN", SO CONNECTIVITY IS PRIMARILY BETWEEN THE DONGLE DEVICE ITSELF AND THE CLOUD. WHEN VEHICLE ON, DEVICE CAN TRANSMIT LIVE VEHICLE DATA TO THE CLOUD. |
| USE CASES | MAINTENANCE<br>● VEHICLE HEALTH STATUS<br>● ISSUE DIAGNOSIS<br>● PREDICTIVE MAINTENANCE<br>SECURITY<br>● REMOTE VEHICLE LOCATOR<br>● THEFT ALERT<br>COMMUNITY<br>● GROUP RIDE TRACKING<br>● POST RIDE REPORT<br>NAVIGATION<br>● PERSONALIZED ROUTE PLANNING |

FIG. 5A

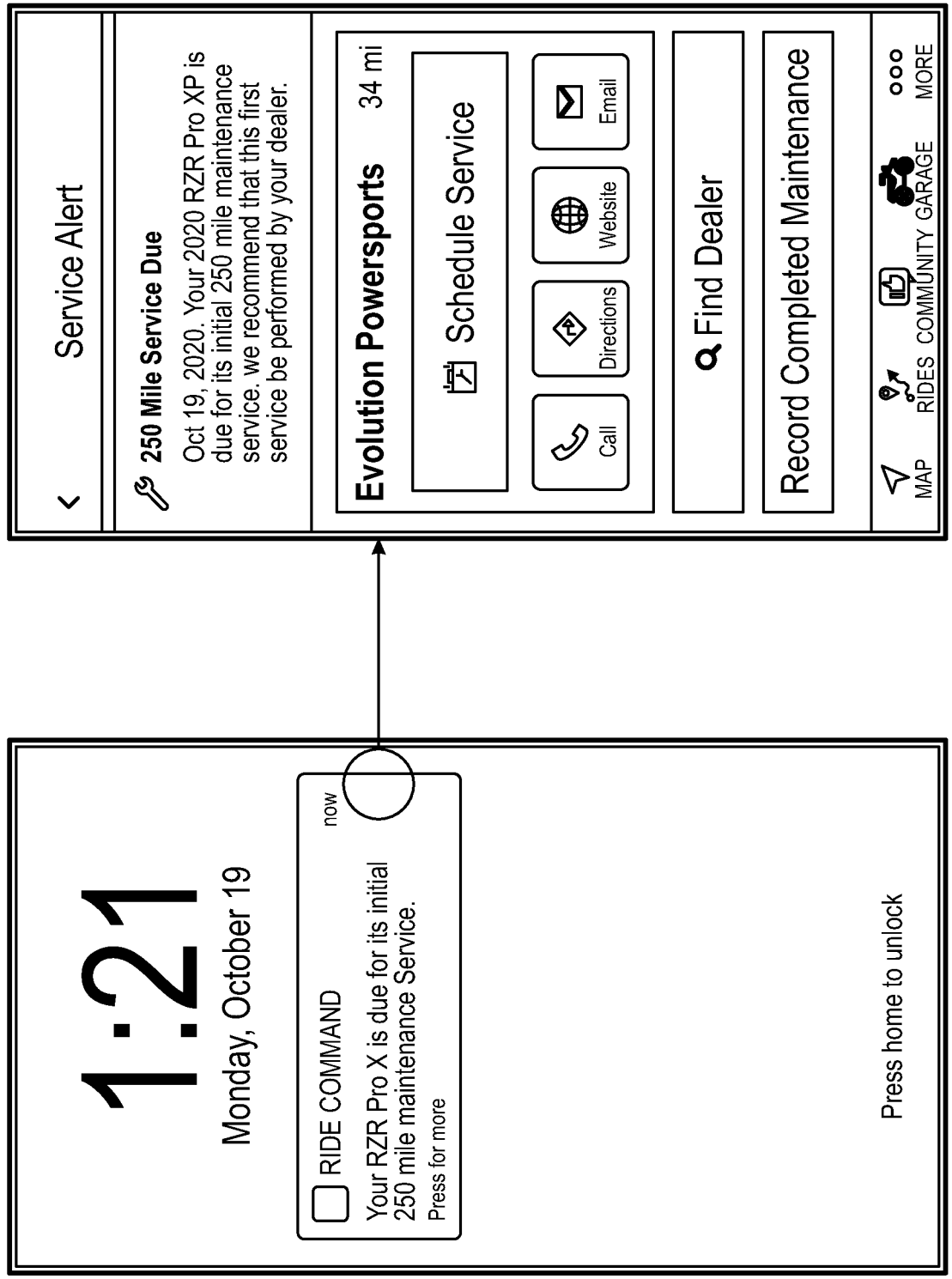

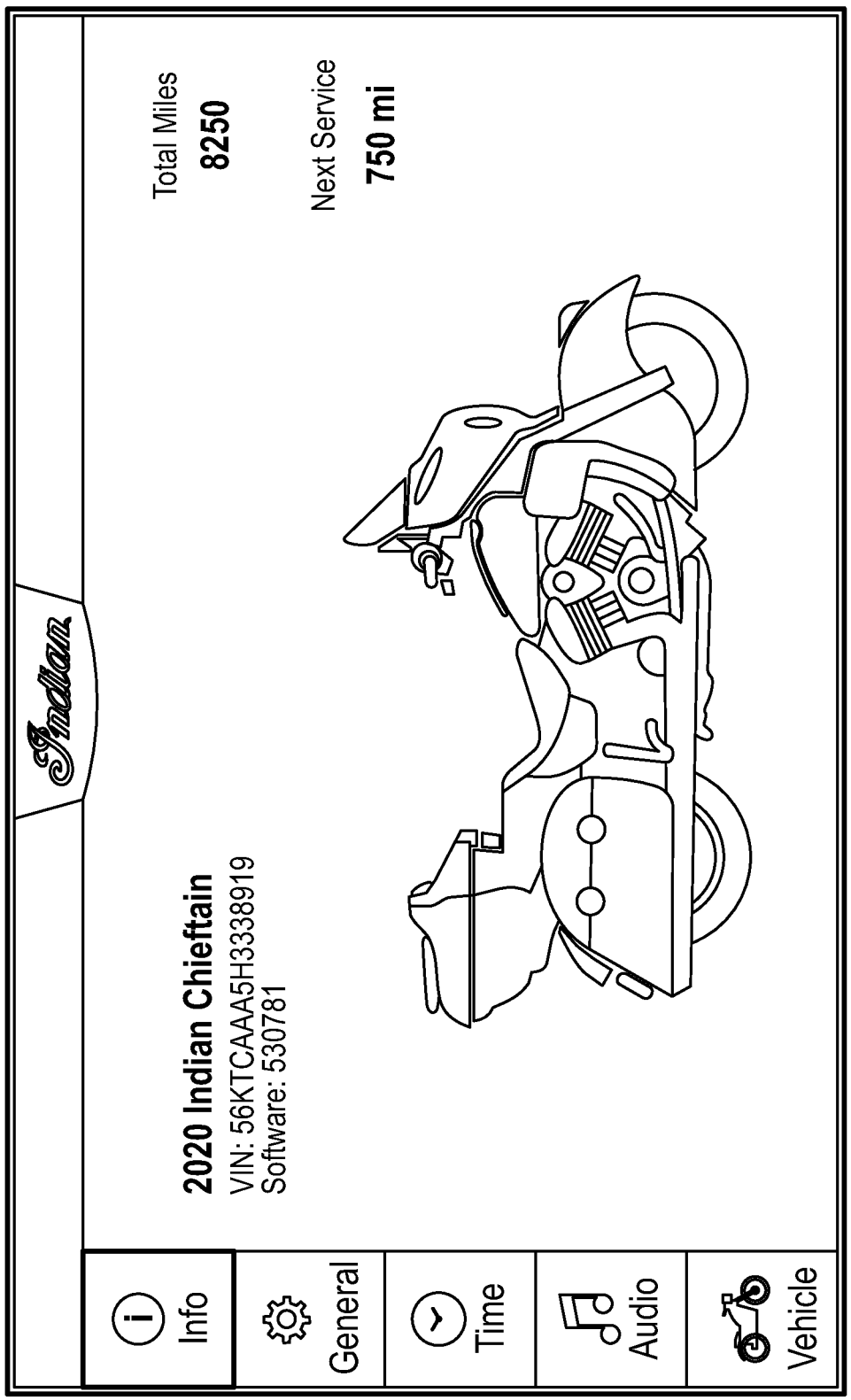

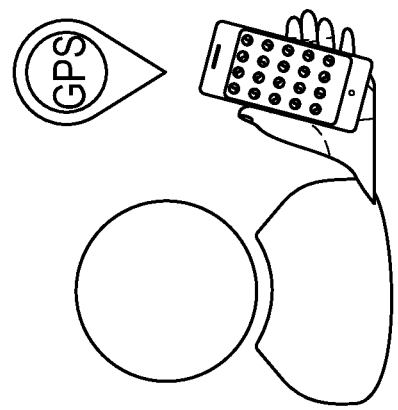
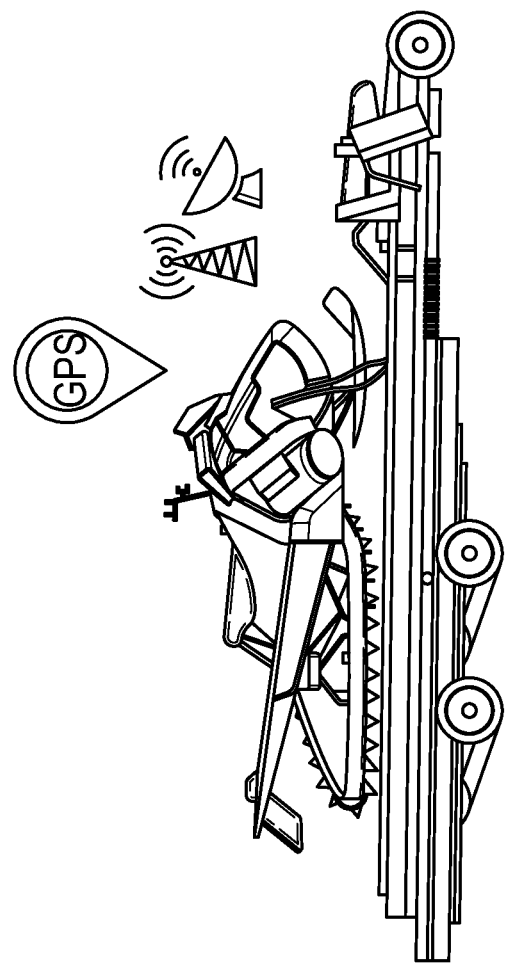
FIG. 32

VEHICLE COMMUNICATION AND MONITORING

RELATED APPLICATIONS

The present disclosure claims the benefit of U.S. Provisional Patent Application No. 63/093,819, filed Oct. 20, 2020, titled VEHICLE COMMUNICATION AND MONITORING SYSTEMS AND METHODS, U.S. Provisional Application No. 63/192,407, filed May 24, 2021, titled VEHICLE COMMUNICATION AND MONITORING, and is related to U.S. Provisional Application No. 63/165,920, filed Mar. 25, 2021, titled SYSTEMS AND METHODS FOR VEHICLE HAZARDOUS CONDITION DETECTION, the entire disclosures of which are expressly incorporated by reference herein.

BACKGROUND OF THE DISCLOSURE

Recreational vehicles, such as motorcycles, or off-road vehicles such as all-terrain vehicles (ATVs), utility vehicles (UVs), side-by-side vehicles, and snowmobiles, are widely used for recreational purposes. These vehicles might be used on both roads and trails, or only on trails and equipped with alert systems to monitor the recreational vehicles.

It is with respect to these and other general considerations that embodiments have been described. Also, although relatively specific problems have been discussed, it should be understood that the embodiments should not be limited to solving the specific problems identified in the background.

SUMMARY OF THE DISCLOSURE

As set forth above, embodiments provided herein relate to recreational vehicles. Exemplary embodiments include but are not limited to the following examples.

In one aspect, an intercept circuit for a vehicle is provided. The intercept circuit comprises: a first connector that can be connected to a key switch connector of the vehicle; a second connector that can be connected to a key switch harness of the vehicle; and a controller connected to the first connector and the second connector, wherein the controller is configured to: pass a signal from the first connector to the second connector in a first operating mode; and interrupt the signal in a second operating mode, thereby preventing transmission of the signal from the first connector to the second connector.

In another aspect, a vehicle is provided. The vehicle comprises: a frame; a prime mover supported by the frame; a battery supported by the frame; and a controller configured to: receive an indication of an operating mode, wherein the operating mode is at least one of: a shipping operating mode; an operator connectivity operating mode; an off-season storage operating mode; a start guarantee operating mode; an over-the-air (OTA) operating mode; and a warehouse operating mode; and configure the vehicle according to the indicated operating mode.

In a further aspect, a method for configuring a vehicle based on a state of charge of a battery is provided. The method comprises: evaluating, based on a first predetermined threshold, the state of charge; based on determining the state of charge is below the first predetermined threshold: configuring a connectivity circuit of the vehicle to awaken periodically; and when the connectivity circuit is awake, communicating with a vehicle platform; evaluating, based on a second predetermined threshold that is below the first predetermined threshold, the state of charge; and based on determining the state of charge is below the second predetermined threshold: disabling the connectivity circuit of the vehicle.

In one aspect, a telematics control unit for a vehicle is provided. The telematics control unit comprises: a first cellular modem; a second cellular modem; a set of shared modem resources comprising an antenna; a switch having: a first state in which the first modem is coupled to the antenna; and a second state in which the second modem is coupled to the antenna; and a controller connected to the switch. The controller is configured to: configure the switch in the first state; establish a first connection with a cellular network using the first modem; configure the switch in the second state; and establish a second connection with the cellular network using the second modem.

In another aspect, another telematics control unit for a vehicle is provided. The telematics control unit comprises: a cellular modem; a switch in electrical communication with the cellular modem; an extensibility interface that enables communication with the cellular modem via the switch when the switch is in a first state; and a processor in communication with the cellular modem via the switch with the switch is in a second state. The processor is configured to: based on determining to perform processing in a high-power domain, configure the switch to be in the first state; and based on determining to perform processing in a low-power domain associated with the processor, configure the switch to be in the second state.

In a further aspect, a method for managing a high-power state and a low-power state of a telematics control unit is provided. The method comprises: processing, using a low-power domain of a first processor of the telematics control unit, data received from a vehicle platform using a first cellular modem; determining, based on the received data, to transition to the high-power state; based on determining to transition to the high power state, booting a high-power domain of a second processor of the telematics control unit; and in response to receiving an indication from the high-power domain, providing at least a part of the received data to the second processor for processing.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein:

FIGS. 5A-C illustrate exemplary processing sequences and additional details regarding each of the embodiments of vehicle 100 illustrated in FIGS. 1-4.

FIGS. 16-19 illustrate exemplary user interfaces communicating predictive maintenance information.

FIG. 32 provides a representation of vehicle 100 being towed.

Figure 1:
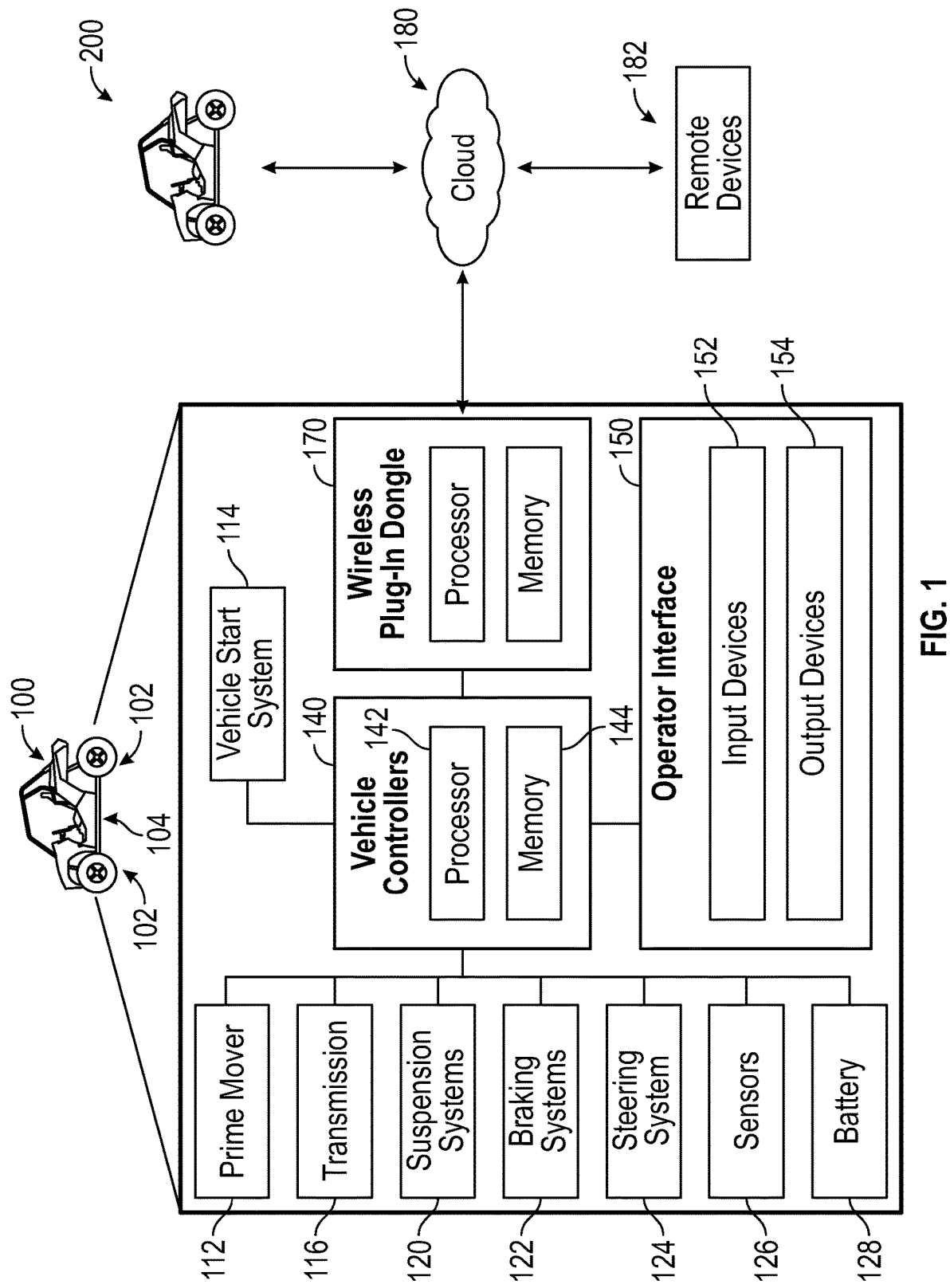
FIGS. 1-4 illustrate an example recreational vehicle according to aspects of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The examples set out herein illustrate embodiments of the disclosure and such examples are not to be construed as limiting the scope of the disclosure in any manner.

DETAILED DESCRIPTION OF THE DRAWINGS

Various embodiments of the present disclosure will be described in detail with reference to the drawings, wherein like reference numerals represent like parts and assemblies throughout the several views. Additionally, any examples set forth in this specification are not intended to be limiting and merely set forth some of the many possible embodiments.

Referring to FIG. 1, a vehicle 100 is represented. Vehicle 100 is an exemplary recreational vehicle, particularly a side-by-side off road vehicle. Additional details regarding exemplary embodiments of vehicle 100 are disclosed in vehicle 200, as described herein, may be further configured as shown in U.S. Pat. No. 8,827,028; U.S. patent application Ser. No. 16/458,797, published as US20200164742A1; U.S. patent application Ser. No. 16/244,462, published as US20190210668A1; and/or U.S. patent application Ser. No. 16/861,859, the entire disclosures of which are expressly incorporated by reference herein. Other exemplary recreational vehicles include snowmobiles, boats, motorcycles, ATVs, utility vehicles, golf carts, and other suitable vehicles. Additional exemplary vehicles and display systems are disclosed in US Published Patent Application No. US20180257726, filed Mar. 5, 2018, titled TWO-WHEELED VEHICLE; U.S. patent application Ser. No. 16/723,754, filed Dec. 20, 2019, titled SNOWMOBILE STORAGE COMPARTMENT, DISPLAY, ANTENNA, AND BODY TRIM SYSTEM; and US Published Patent Application No. US20170334500, filed May 23, 2016, titled DISPLAY SYSTEMS AND METHODS FOR A RECREATIONAL VEHICLE, the entire disclosures of which are expressly incorporated by reference herein.

Recreational vehicle 100 includes a plurality of ground engaging members 102. Exemplary ground engaging members include skis, endless tracks, wheels, and other suitable devices which support vehicle 100 relative to the ground. Recreational vehicle 100 further includes a frame 104 supported by the plurality of ground engaging members 102. In one embodiment, frame 104 includes cast portions, weldments, tubular components or a combination thereof. In one embodiment, frame 104 is a rigid frame. In one embodiment, frame 104 has at least two sections which are moveable relative to each other.

An operator support is supported by frame 104. Exemplary operator supports include straddle seats, bench seats, bucket seats, and other suitable support members. In addition to operator support, recreational vehicle 100 may further include a passenger support. Exemplary passenger supports include straddle seats, bench seats, bucket seats, and other suitable support members.

A power system is supported by frame 104 and illustratively includes a prime mover 112 and a transmission 116. The power system provides the motive force and communicates the same to at least one of the ground engagement members 102 to power movement of recreational vehicle 100.

Exemplary prime movers 112 include internal combustion engines, two stroke internal combustion engines, four stroke internal combustion engines, diesel engines, electric motors, hybrid engines, and other suitable sources of motive force. To start the prime mover 112, a vehicle start system 114 is provided. The type of vehicle start system 114 depends on the type of prime mover 112 used. In one embodiment, prime mover 112 is an internal combustion engine and vehicle start system 114 is one of a pull start system and an electric start system. In one embodiment, prime mover 112 is an electric motor and vehicle start system 114 is a switch system which electrically couples one or more batteries to the electric motor. In embodiments, vehicle start system includes a key (or key fob).

Transmission 116 is coupled to prime mover 112. In embodiments, transmission 116 includes a shiftable transmission and a continuously variable transmission ("CVT"). In one arrangement, the CVT is coupled to prime mover 112 and the shiftable transmission is in turn coupled to the CVT. In one embodiment, the shiftable transmission includes a forward high setting, a forward low setting, a neutral setting, a park setting, and a reverse setting. Exemplary CVTs are disclosed in U.S. Pat. Nos. 3,861,229; 6,176,796; 6,120,399; 6,860,826; and 6,938,508, the disclosures of which are expressly incorporated by reference herein. Transmission 116 is further coupled to at least one differential (not shown) which is in turn coupled to at least one ground engaging members 102.

Recreational vehicle 100 further includes a plurality of suspension systems 120 which couple the ground engaging members 102 to frame 104. Exemplary suspension systems are disclosed in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

Recreational vehicle 100 further includes a braking system 122. In one embodiment, braking system 122 includes anti-lock brakes.

Recreational vehicle 100 further includes a steering system 124. Steering system 124 is coupled to at least one of the ground engagement members 102 to direct recreational vehicle 100.

Recreational vehicle 100 further includes a plurality of sensors 126 which monitor various characteristics of vehicle 100 and a battery 128 which provides power to various components of vehicle 100. Example sensors include, but are not limited to, a Global Positioning System (GPS) sensor, an accelerometer, a conductive ball and socket, an ambient temperature sensor, an image sensor, a microphone, or a light detection and ranging (LIDAR) sensor, among other examples.

Further, recreational vehicle 100 includes a vehicle controller 140 having at least one processor 142 and at least one associated memory 144. Vehicle controller 140 provides the electronic control of the various components of recreational vehicle 100. Further, vehicle controller 140 is operatively coupled to the plurality of sensors 126 which monitor various parameters of recreational vehicle 100 or the environment surrounding vehicle 100. Vehicle controller 140 performs certain operations to control one or more subsystems of other vehicle components, such as one or more of a fuel system, an air handling system, the CVT, the shiftable transmission, prime mover 112, suspensions 120, and other systems. In certain embodiments, the controller 140 forms a portion of a processing subsystem including one or more computing devices having memory, processing, and communication hardware. The controller 140 may be a single device or a distributed device, and the functions of the controller 140 may be performed by hardware and/or as computer instructions on a non-transitory computer readable storage medium, such as memory 144.

Vehicle controller 140 also interacts with an operator interface 150 which includes at least one input device 152 and at least one output device 154. Exemplary input devices 152 include levers, buttons, switches, soft keys, and other suitable input devices. Exemplary output devices include lights, displays, audio devices, tactile devices, and other suitable output devices. An operator may signal to vehicle controller 140 to alter the operation of one or more systems of vehicle 100 through the input devices 152. Additional aspects of vehicle controller 140 are described below with respect to FIGS. 5A-C.

Further, vehicle 100 includes a wireless plug-in dongle 170 which is operatively coupled to controller 140. Dongle 170 provides a communication link between vehicle controller 140 and remote storage, illustratively a cloud 180. Dongle may receive information and/or instructions from the cloud for use by vehicle controller 140 and may provide information and/or instructions to remote devices 182 or other vehicles 200 through the cloud 180. Further, the information stored in the cloud 180 may be retrieved through a web interface associated with the vehicle 100. In embodiments, dongle 170, also referred to as a connectivity circuit, is powered by battery 128 of vehicle 100. Processing sequences for controlling the drain of battery 128 are provided herein.

Figure 2:
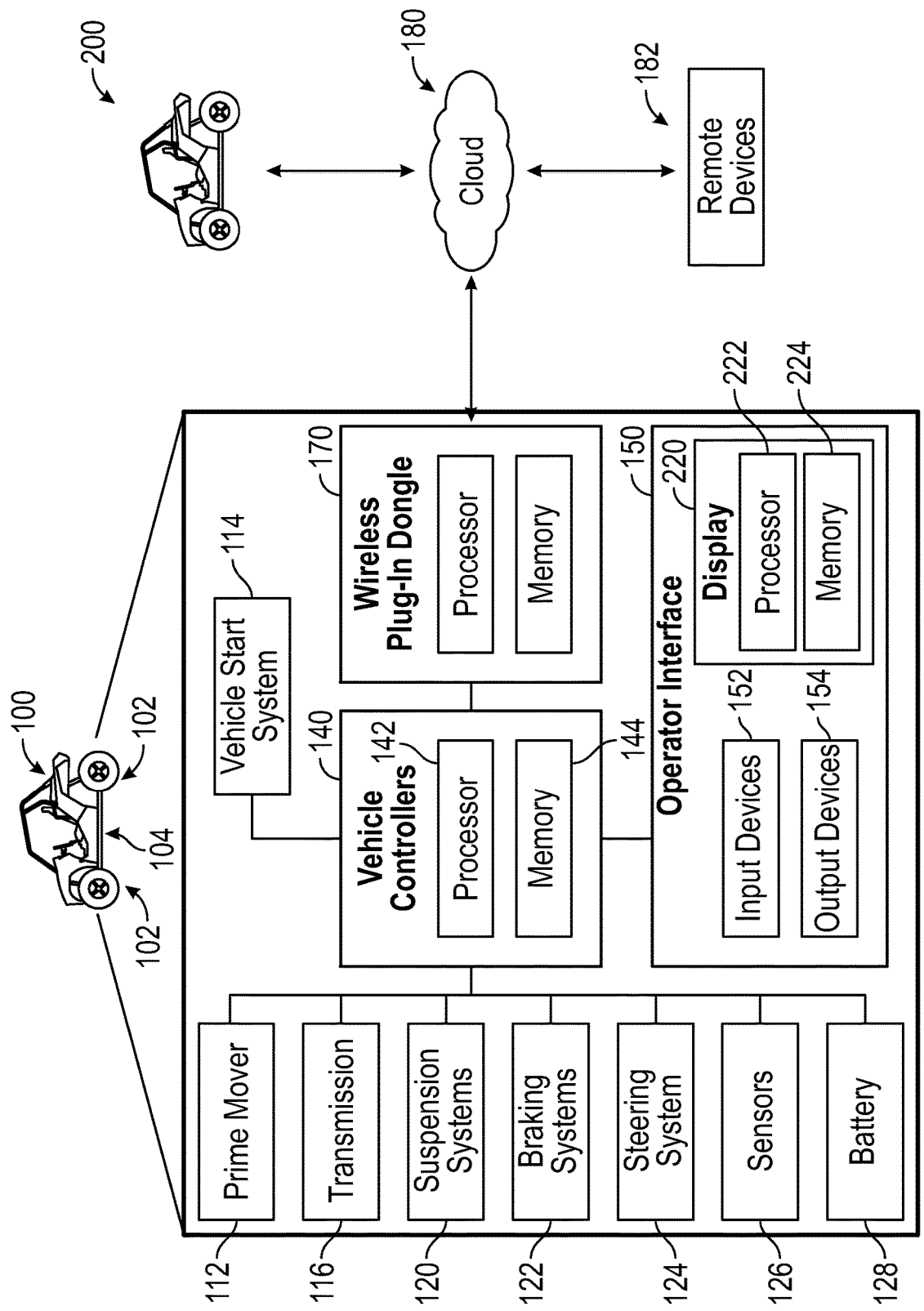

Referring to FIG. 2, another exemplary embodiment of vehicle 100 is illustrated. As shown in FIG. 2, vehicle 100 includes a display 220 as part of operator interface 150. Display 220 includes a processor 222 and associated memory 224. In embodiments, operator interface 150 with display 220 is an in-vehicle infotainment ("IVI") system. In one example, display 220 is a touch screen display and operator interface interprets various types of touches to the touch screen display as inputs and controls the content displayed on touch screen display.

Figure 3:
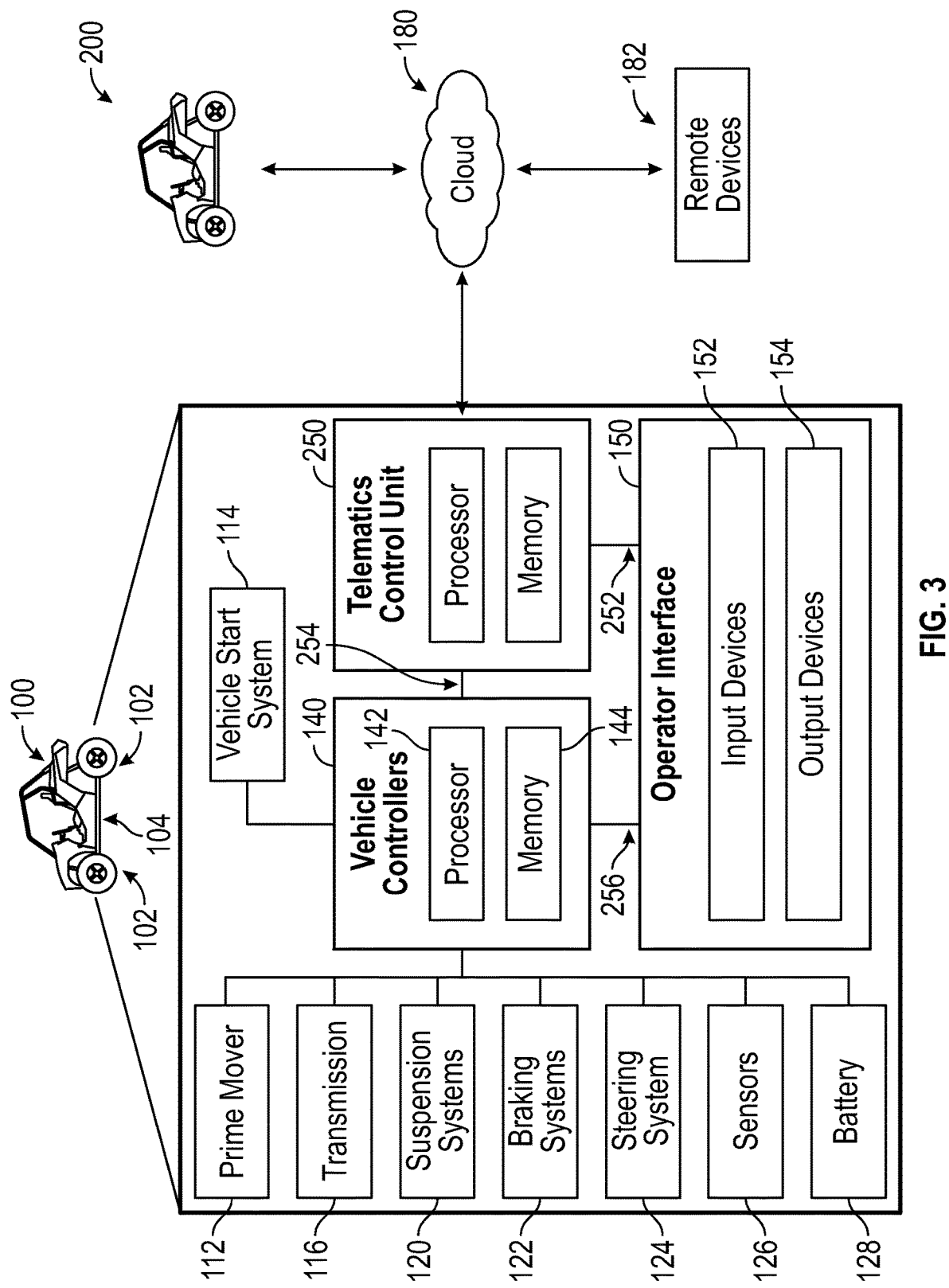

Referring to FIG. 3, a further exemplary embodiment of vehicle 100 is illustrated. The vehicle 100 of FIG. 3 is the same as the vehicle 100 of FIG. 1 except that dongle 170 is replaced with a telematics control unit ("TCU") 250. Telematics control unit 250, differs from dongle 170, in that telematics control unit 250 is capable of waking up periodically while vehicle 100 is not running to communicate with cloud 180, remote devices 182, and/or other vehicles 200. Both TCU 250 and Dongle 170 have security features enabled for remote notification for a theft alert when the vehicle is not running. In embodiments, telematics control unit 250, also referred to as a connectivity circuit, is powered by battery 128 of vehicle 100. Processing sequences for controlling the drain of battery 128 are provided herein.

Telematics control unit 250 is further illustrated as having high-speed connection 252 (e.g., to operator interface 150) and low-speed connection 254 (e.g., to vehicle controllers 140). Similar to the aspects discussed in greater detail below with respect to high-speed connection 538 and low-speed connection 540 in FIG. 34, telematics control unit 250 may utilize high-speed connection 252 in association with various high-speed functionality of operator interface 150. Similarly, telematics control unit 250 may utilize low-speed connection 254 for a variety of low-speed functionality, such as communicating with vehicle controllers 140. In examples, low-speed connection 254 is a CAN bus connection, such that while a line is illustrated from telematics control unit 250 to vehicle controllers 140, it will be appreciated that telematics control unit 250 may utilize low-speed connection 254 to communicate with any of a variety of other components of vehicle 100. For example, telematics control unit 250 may communicate with operator interface 150 via its connection 256, which may similarly be a low-speed connection (e.g., to a CAN bus). Similarly, high-speed connection 252 need not be exclusively between telematics control unit 250 and operator interface 150, but may, for example, comprise a packet-switched network among additional and/or alternative vehicle components.

Figure 4:
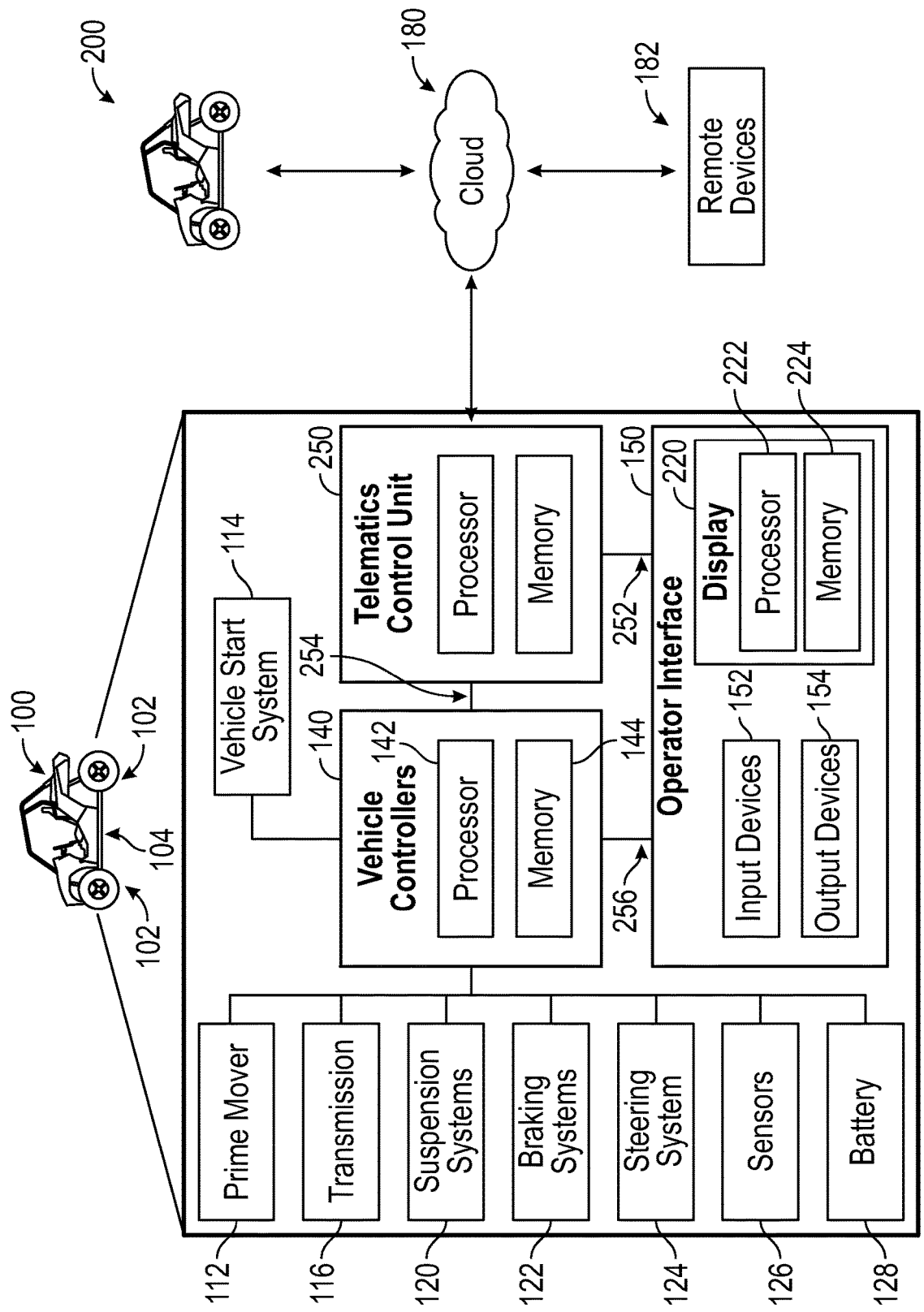

Referring to FIG. 4, a further exemplary embodiment of vehicle 100 is illustrated. The vehicle 100 of FIG. 3 is the same as the vehicle 100 of FIG. 2 except that dongle 170 is replaced with a telematics control unit ("TCU") 250. Telematics control unit 250, differs from dongle 170, in that telematics control unit 250 is capable of waking up periodically while vehicle 100 is not running to communicate with cloud 180, remote devices 182, and/or other vehicles 200. In embodiments, telematics control unit 250, also referred to as a connectivity circuit, is powered by battery 128 of vehicle 100. Processing sequences for controlling the drain of battery 128 are provided herein.

Figure 5B:
Figure 5C:
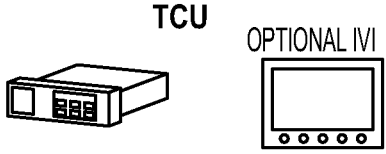

Referring to FIGS. 5A-C, exemplary processing sequences and additional details regarding each of the embodiments of vehicle 100 illustrated in FIGS. 1-4 are shown. In examples, aspects of FIG. 5A are utilized in the context of FIG. 1, for example, using wireless plug-in dongle 170. In some instances, aspects of FIG. 5B are utilized in the context of FIG. 2, for example using wireless plug-in dongle 170 and operator interface 150. In other instances, aspects of FIG. 5C are utilized in the context of FIGS. 3 and/or 4, for example using telematics control unit 250 and/or operator interface 150.

In embodiments, dongle 170 or TCU 250 includes a location determiner, such as a GPS, to provide an indication of a location of vehicle 100. In embodiments, a location determiner is provided on vehicle 100 separate from dongle 170 or TCU 250 to provide an indication of a location of vehicle 100.

In embodiments, vehicle 100 includes a separate communication system in addition to or in place of dongle 170 or TCU 250. In embodiments, exemplary communication systems provide a wireless connection to personal computing devices, such as mobile phones, carried by an operator of vehicle 100, In embodiments, exemplary communication systems provide a cellular communication device, an RF antenna for direct vehicle 100 to vehicle 200 communications, a satellite communication device, and other suitable devices which may connect vehicle 100 to one or more of vehicle 200, remote devices 182, and cloud 180. Exemplary vehicle communication systems and associated processing sequences are disclosed in U.S. patent application Ser. No. 16/234,162, filed Dec. 27, 2018, titled RECREATIONAL VEHICLE INTERACTIVE TELEMETRY, MAPPING AND TRIP PLANNING SYSTEM; U.S. patent application Ser. No. 15/262,113, filed Sep. 12, 2016, titled VEHICLE TO VEHICLE COMMUNICATIONS DEVICE AND METHODS FOR. RECREATIONAL VEHICLES; U.S. Pat. No. 10,764,729, titled COMMUNICATION SYSTEM USING VEHICLE TO VEHICLE RADIO AS AN ALTERNATE COMMUNICATION MEANS, filed Dec. 12, 2018; US Published Patent Application No. US20190200189, titled COMMUNICATION SYSTEM USING CELLULAR SYSTEM AS AN ALTERNATE TO A VEHICLE TO VEHICLE RADIO, filed Dec. 12, 2018; US Published Patent Application No. US20190200173, titled METHOD AND SYSTEM FOR FORMING A DISTANCED-BASED GROUP IN A VEHICLE TO VEHICLE COMMUNICATION SYSTEM, filed Dec. 12, 2018; US Published Patent Application No. US20190200188, titled VEHICLE-TO-VEHICLE COMMUNICATION SYSTEM, filed Dec. 12, 2018; U.S. patent application Ser. No. 16/811,865, filed Mar. 6, 2020, titled RECREATIONAL VEHICLE GROUP MANAGEMENT SYSTEM; U.S. Patent Application Ser. No. 63/016,684, filed Apr. 28, 2020, titled. SYSTEM. AND METHOD FOR DYNAMIC ROUTING; U.S. patent application Ser. No. 16/013,210, filed Jun. 20, 2018, titled VEHICLE HAVING SUSPENSION WITH CONTINUOUS DAMPING CONTROL; and U.S. patent application Ser. No. 15/816,368, filed Nov. 17, 2017, titled VEHICLE HAVING ADJUSTABLE SUSPENSION, the entire disclosures of which are expressly incorporated by reference herein.

Referring to FIGS. 6-33 and 48-61, various processing sequences and systems which may be carried out by vehicle 100 are provided and discussed in further detail herein. For example, such aspects may be implemented using a dongle, telematics control unit, and/or operator interface according to aspects described herein, among other examples.

Vehicle Health Status (See FIGS. 6-10)

Figure 6:
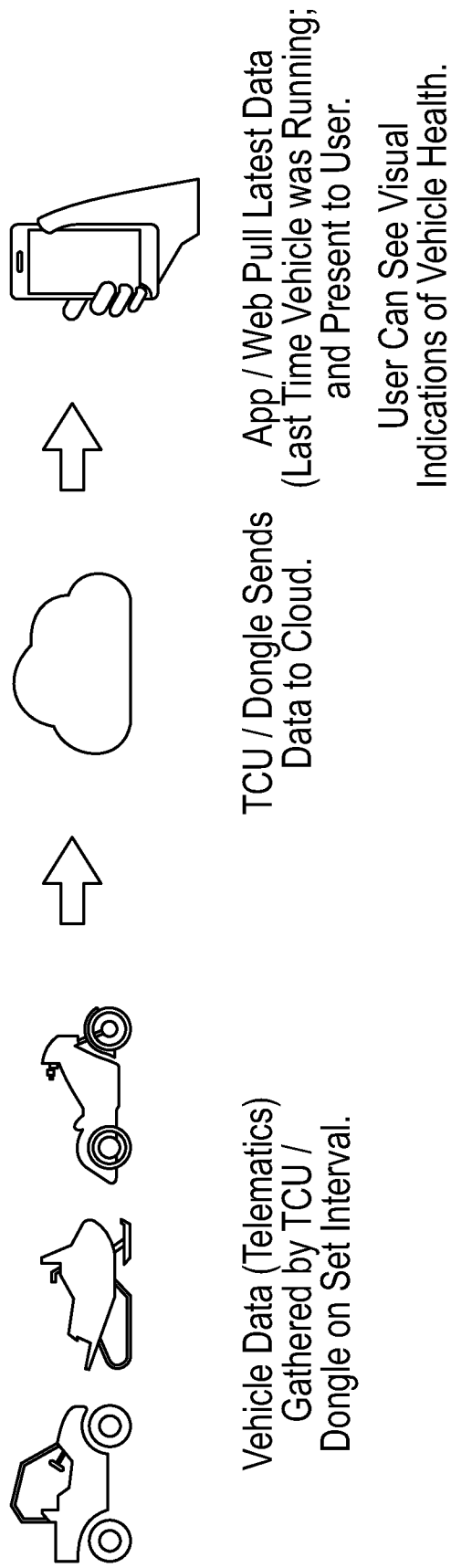
FIG. 6 illustrates an exemplary processing sequence for vehicle 100 related to communicating vehicle health status.
Figure 8:
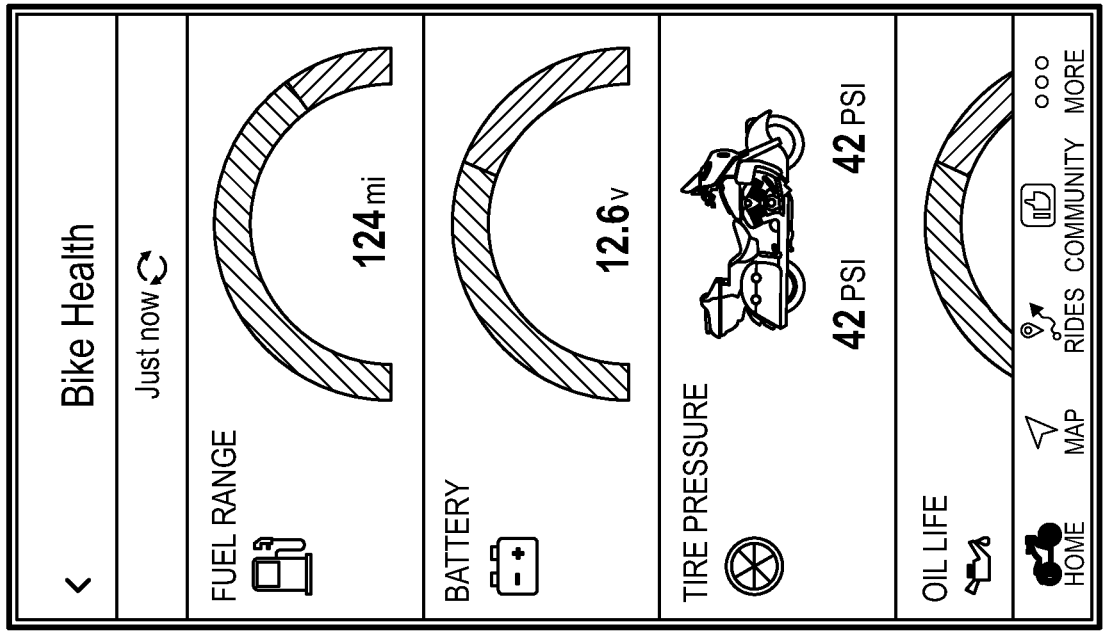
FIGS. 7-9 illustrate exemplary user interfaces displaying exemplary vehicle health status information on an app for a personal computing device, such as a mobile phone, or on a website.
Figure 7:
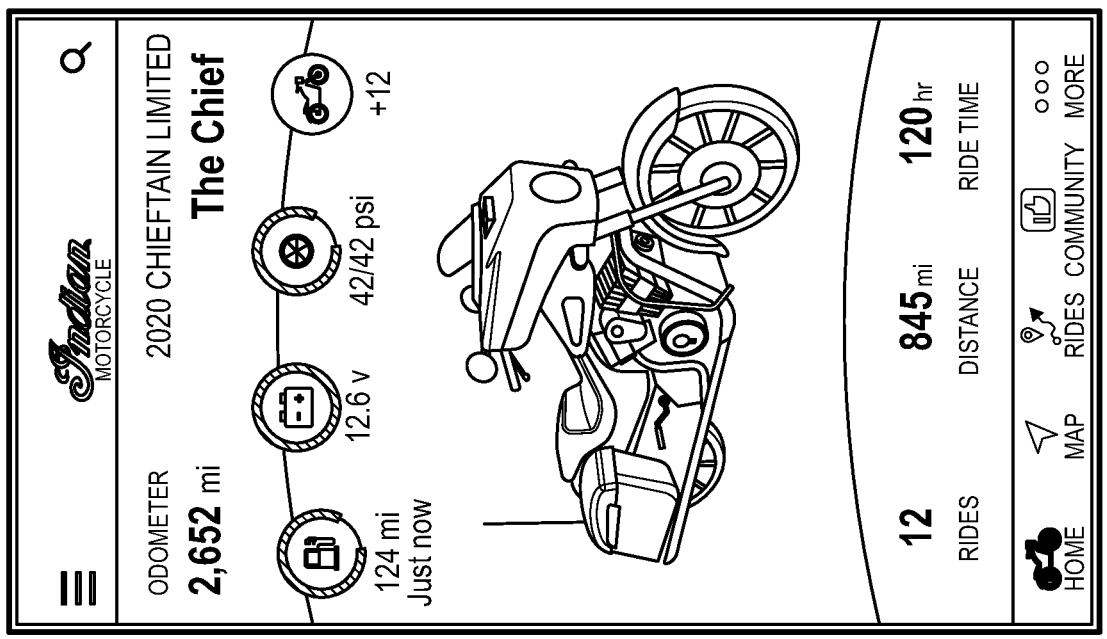
Figure 9:
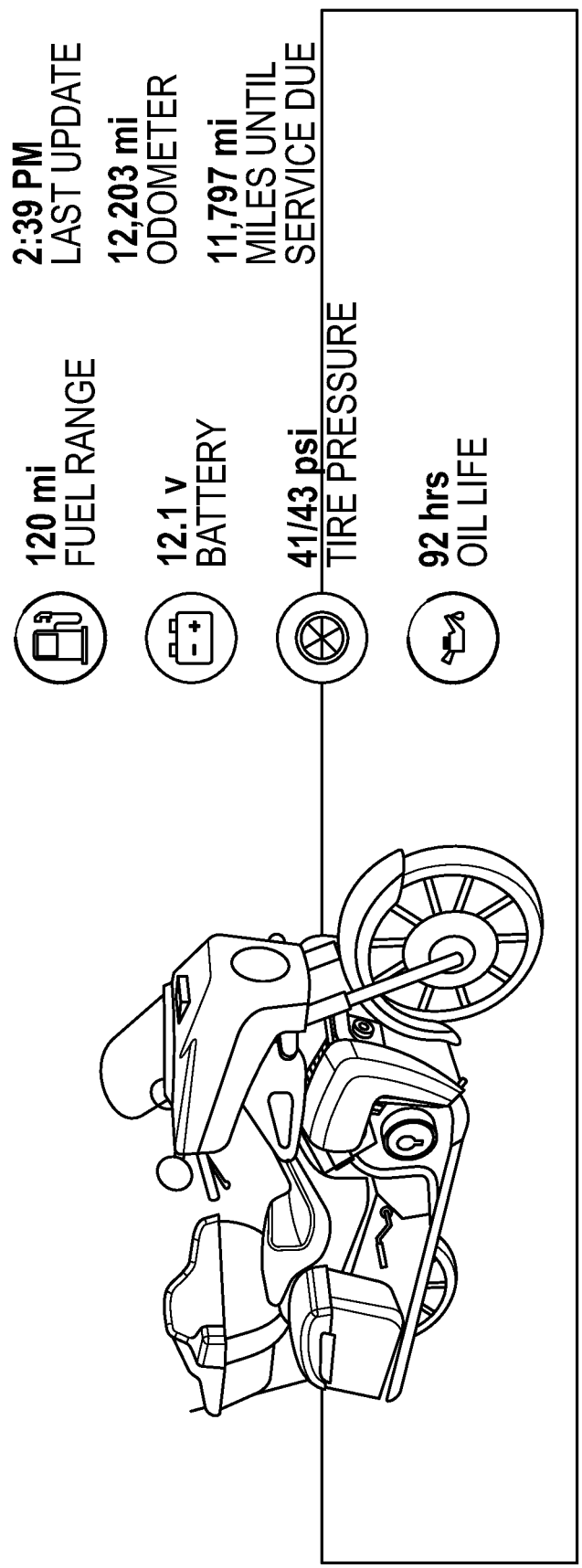

Referring to FIG. 6, an exemplary processing sequence for vehicle 100 related to communicating vehicle health status is illustrated. As illustrated, vehicle data may be gathered (e.g., by dongle or TCU) in response to an event or according to a predetermined interval, such that it may be transmitted to a remote computing device, such as a cloud or a vehicle platform, among other examples. The vehicle data and/or associated processing (e.g., relating to vehicle health status information) may be provided for display to a user, for example using a mobile phone or a website.

Figure 10:
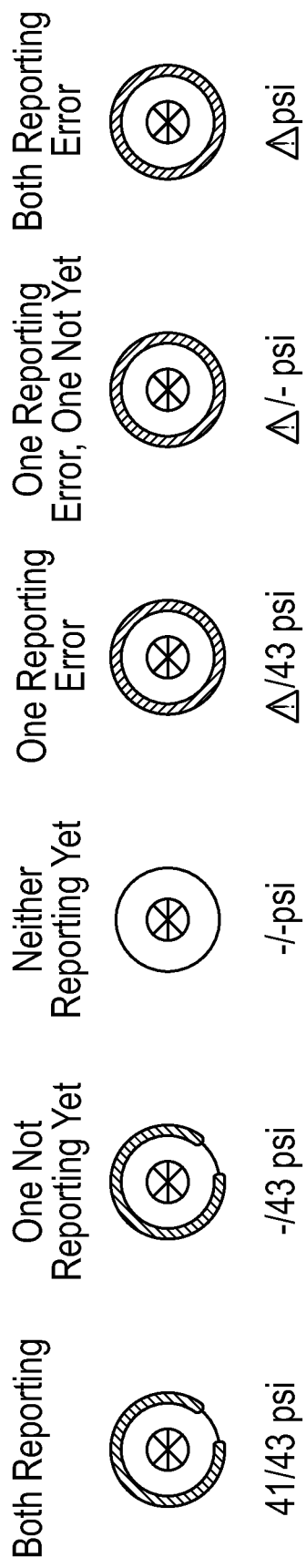
FIG. 10 provides a various graphical representations of tire pressure status information.

FIGS. 7-10 illustrate exemplary user interfaces displaying exemplary vehicle health status information on an app for a personal computing device, such as a mobile phone, or on a website. FIG. 10 provides a various graphical representations of tire pressure status information. Thus, vehicle health status information may be displayed on a vehicle display and/or mobile application, for example in context with target values (or OK/not OK status) to provide a picture of vehicle health, among other indicators. In examples, a notification may be generated when one or more trigger conditions are met. For example, a push notification may be sent based on vehicle mileage according to recommended service intervals. Additional notifications could include, but are not limited to: oil change needed, tire pressures low, battery low, and periodic maintenance. In examples, a notification may include one or more follow up actions to schedule service or a link to read/watch how-to self-check guides.

The vehicle communication systems disclosed or referenced herein may provide vehicle health data to remote devices or the cloud for storage. Exemplary information is provided by one or more of the vehicle systems or sensors supported on the vehicle 100. Exemplary information includes:

Ambient Temperature
Battery Voltage
Fuel Level
Fuel Range
Odometer
Time
Tire Pressure Front (if equipped w/TPMS)
Tire Pressure Rear (if equipped w/TPMS)
Vehicle Hours
VIN—vehicle identification number
Miles/hours to next service
Software Update availability
VIN Specific recalls
Days since last usage
Oil change needed
Periodic maintenance reminders with easy follow up actions to schedule service or read/watch how-to self-check guides
Trip History
Diagnostics Codes
General recall bulletins
Historic codes with the ability to clear and an ability to explain what the code is—such as "misfire—check x, y, z"
Based on last date the fuel peaked, recommend if over a threshold duration a fuel stabilizer or fresh fuel
Reminders based on time of year—i.e. it's fall—consider doing x, y, z to your unit.

In some instances, a data analysis campaign may be defined at the remote computing device to run on a specific vehicle or set of vehicles. For example, the data analysis campaign may cause specific vehicle data to be collected according to a predetermined interval or in response to a specified event, among other examples (e.g., "collect oil pressure vs engine temperature for first 10 minutes of run-time for all vehicles using part number XXX stored in locations with <10° C. ambient temperature for the next two weeks").

As an example, a service department may see multiple reports of an issue, at which point an engineering department may want more specific data and instance cases. Accordingly, a dynamic data analysis/collection campaign may be used to identify particular vehicles in the field with specific conditions, such that on-board telematics collection and analysis may be performed accordingly. An OTA communication may deliver a data analysis campaign package to selected vehicles in the field and in-field data analysis campaign launched, deployed, and run. Telematics data may then be collected and sent back (e.g., as illustrated in FIG. 6). Eventually, a notification associated with a service advisory or OTA update to fix an identified problem or other information may be sent to vehicles and/or associated operators (e.g., at least some of which may be in the group for which the data analysis campaign aspects described herein was performed).

Issue Diagnosis (see FIGS. 11-14)

Figure 11:
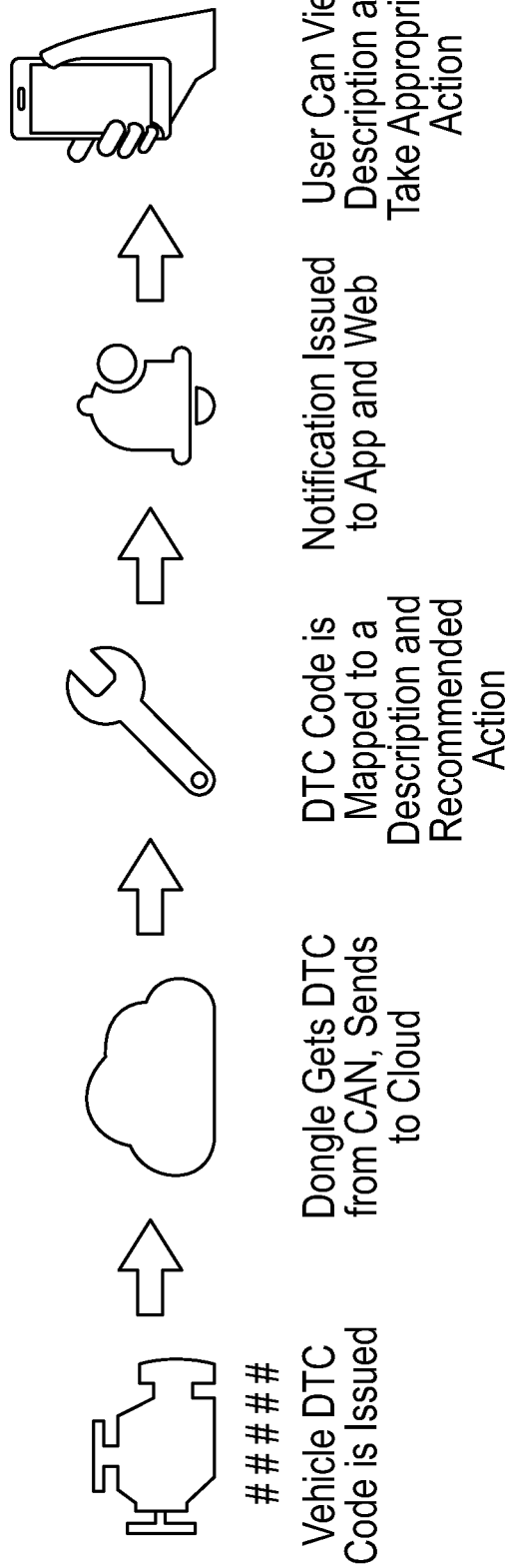
FIG. 11 illustrates an exemplary processing sequence for vehicle 100 related to issue diagnosis.
Figure 12:
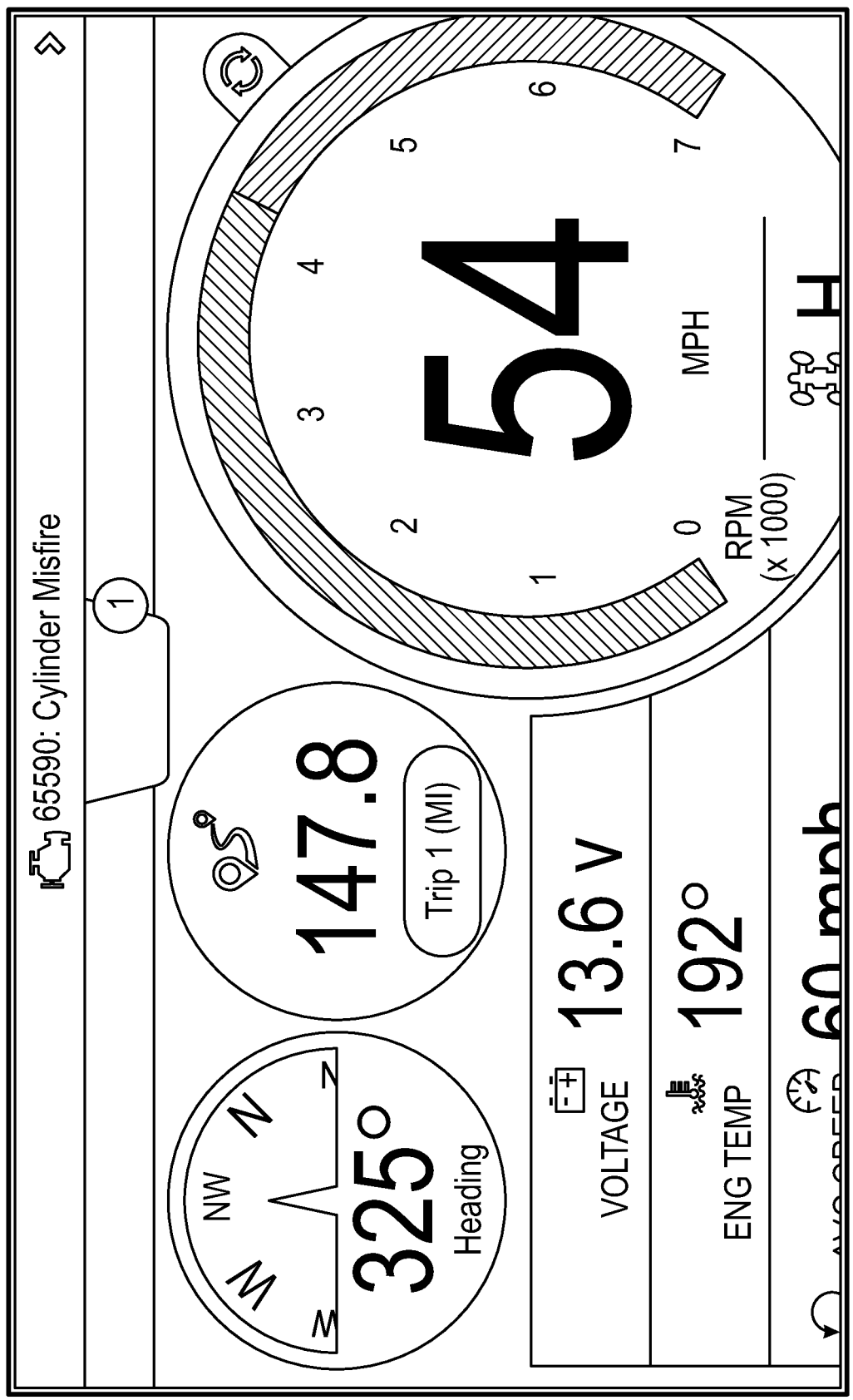
FIGS. 12-14 illustrate exemplary user interfaces communicating issue diagnosis information.
Figure 14:
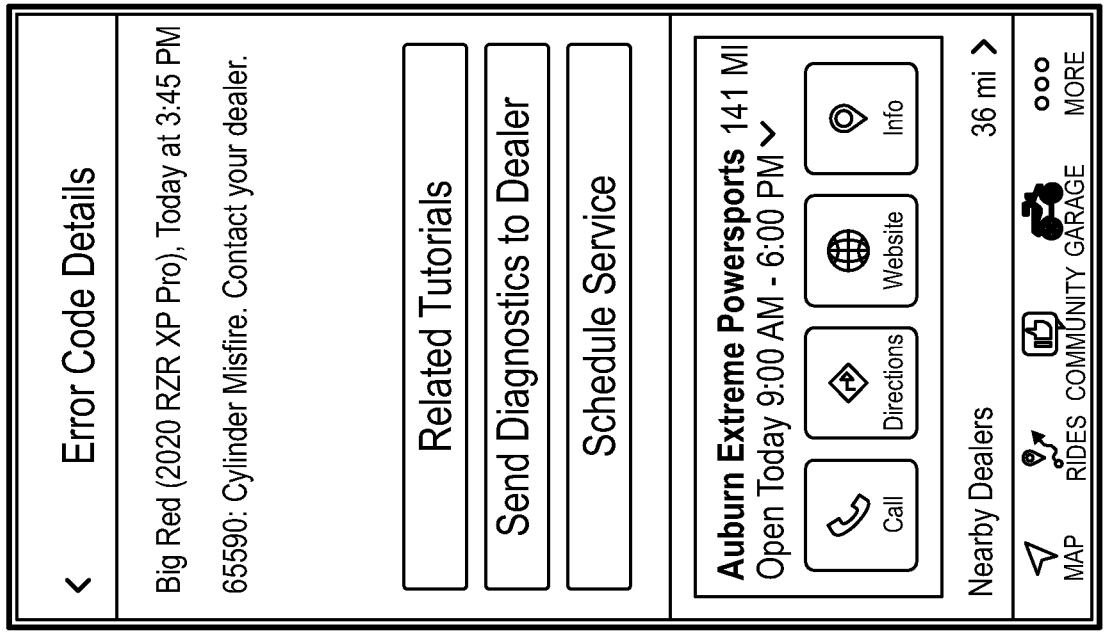
Figure 13:
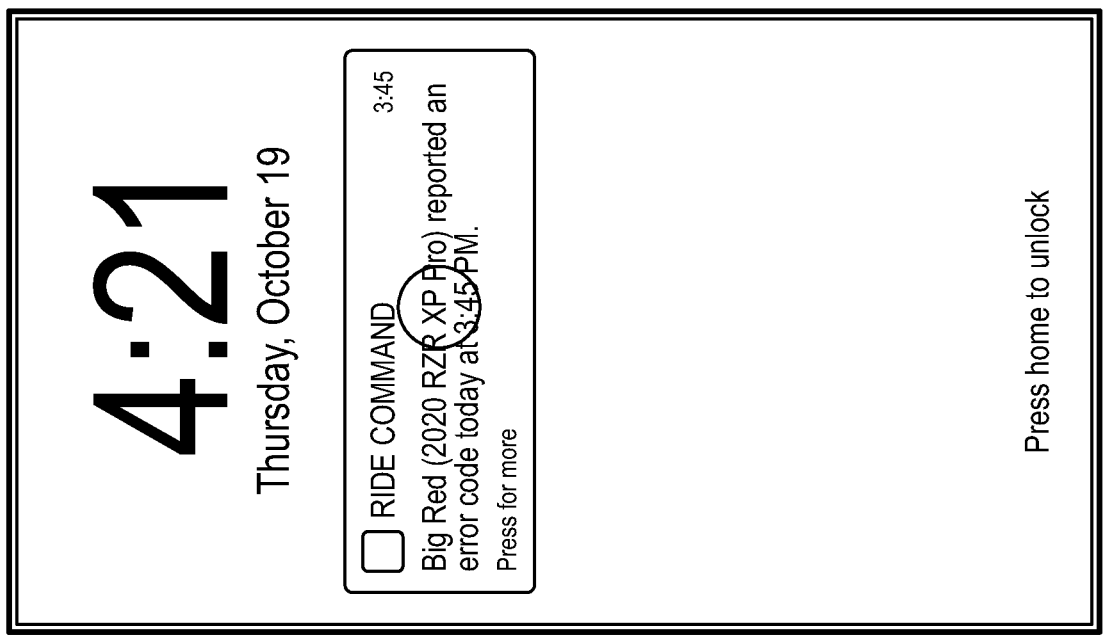

Beyond a health summary, issue diagnosis processing sequences involve analysis of telematics data to trigger actions which are communicated to an operator or other party on a display of the vehicle, on a remote device, such as a computer or mobile phone to inform of the best course of action. FIG. 11 illustrates an exemplary processing sequence for vehicle 100 related to issue diagnosis. As illustrated, a diagnostic trouble code (DTC) may be issued by a vehicle, such that the DTC may be obtained (e.g., via a CAN bus by dongle or TCU) and transmitted to a remote computing device, such as a cloud or a vehicle platform, among other examples. The DTC is mapped to a description and/or recommended action. Accordingly, a notification may be generated (e.g., to an application of an operator's mobile phone) and information available to the operator (e.g., via such a mobile application or a website) may be updated to reflect the DTC, description, and/or recommended action, among other information. Thus, the operator is able to view such issue diagnosis information and take appropriate action.

Examples include a simple DTC code triggering a recommended action or based on the collected data and subsequent analysis communicating steps to an operator to mitigate a problem themselves. Exemplary user interfaces communicating issue diagnosis information are provided in FIGS. 12-14. Further, the operator may be provided with a link to service scheduling (see FIG. 14). In embodiments, the error codes are stored for later retrieval between key off events. For example, a history of error codes and associated issue diagnostic information may be provided, for example on vehicle 100 and/or via the mobile application/website, among other examples. In other examples, an indication of the DTC and/or other associated information may be provided to a dealer or other service provider, to an automated system to return on-screen help/tutorials loaded from internet, or to a call center (e.g., in response to which live help may be provided to the operator).

Predictive Maintenance (see FIGS. 15-19)

Figure 15:
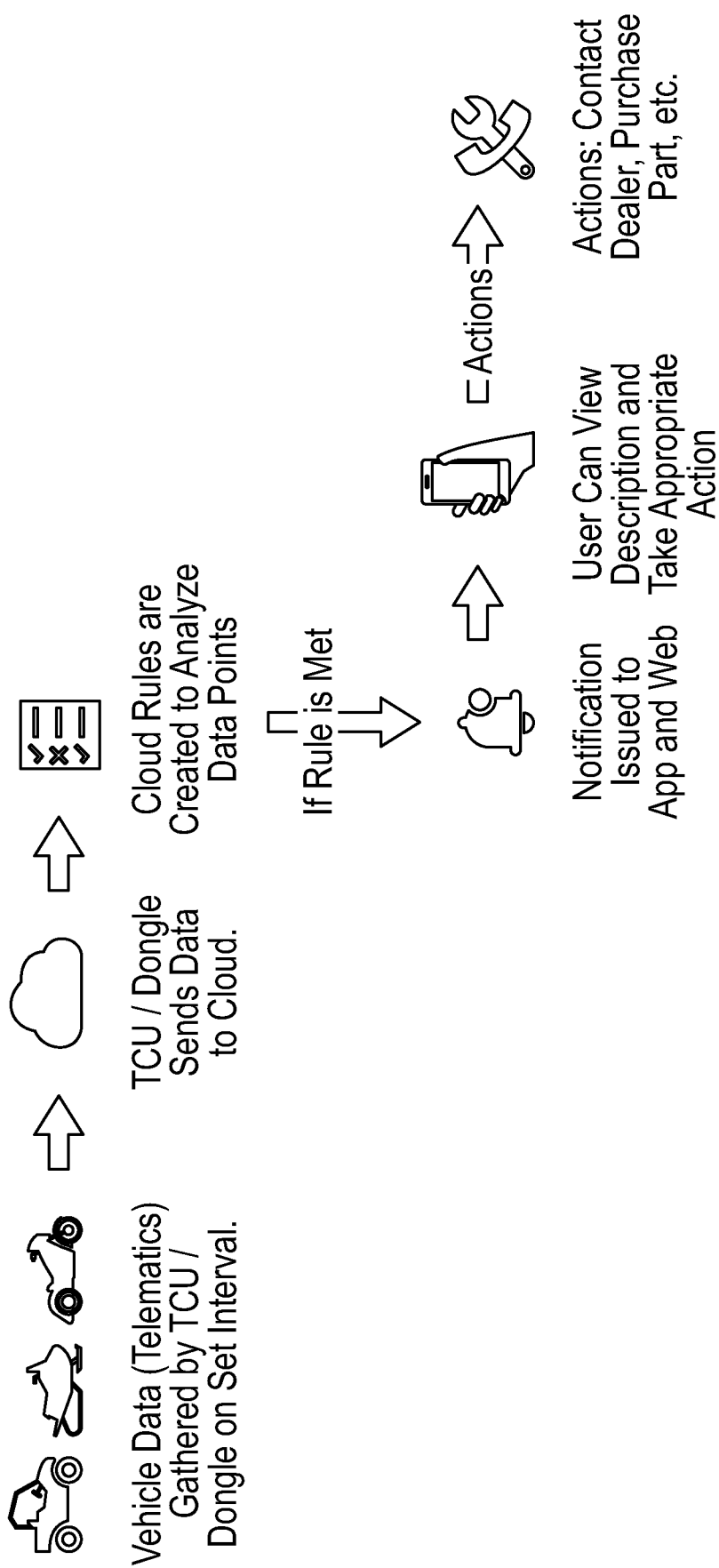
FIG. 15 illustrates an exemplary processing sequence for vehicle 100 related to predictive maintenance.
Figure 19:
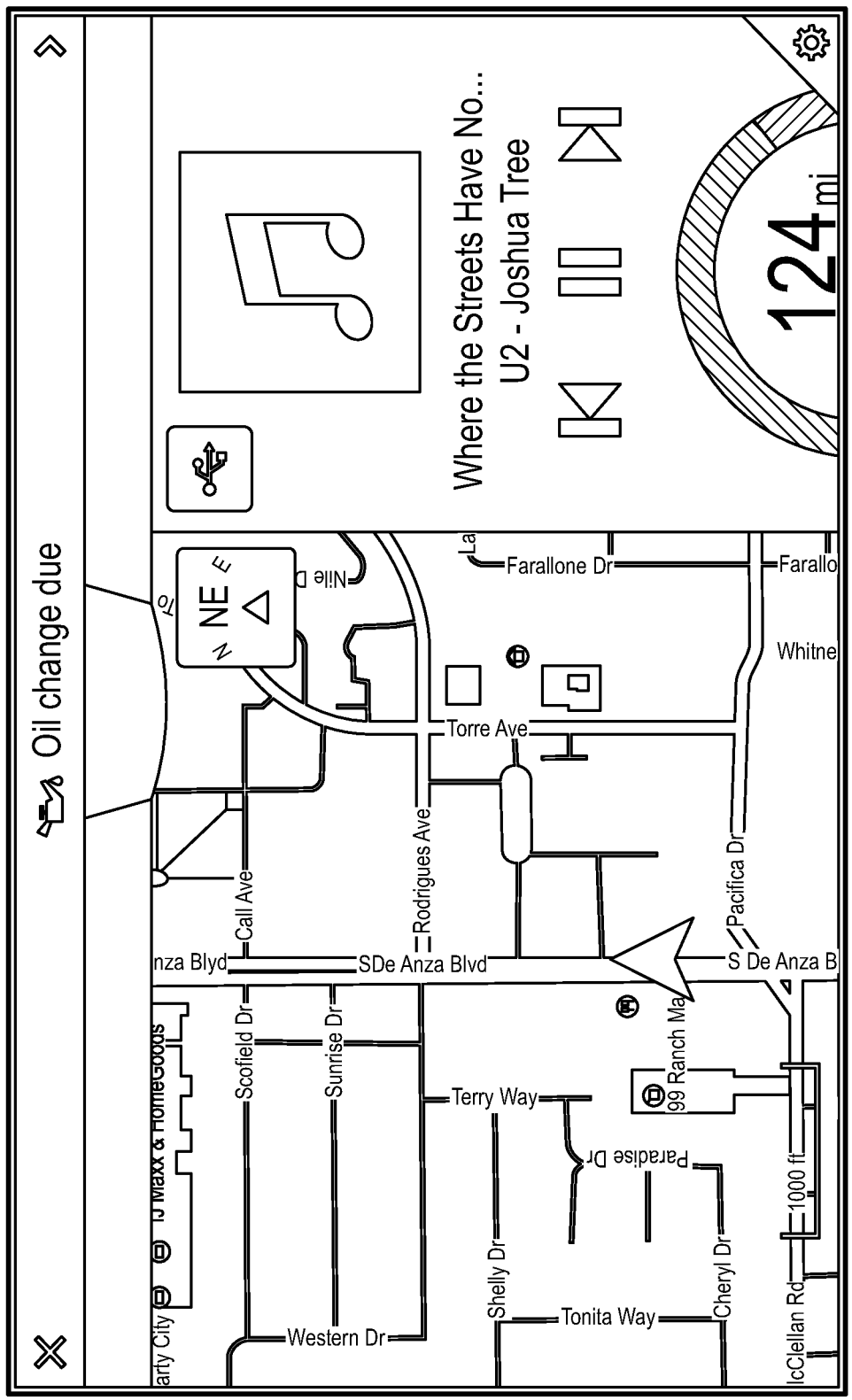

Referring to FIG. 15, an exemplary processing sequence for vehicle 100 related to predictive maintenance is illustrated. As illustrated, vehicle data may be gathered (e.g., by dongle or TCU) in response to an event or according to a predetermined interval, such that it may be transmitted to a remote computing device, such as a cloud or a vehicle platform, among other examples. The vehicle data may be processed according to a set of rules, for example as may be associated with a specific vehicle model, geographic region, season, and/or type of use (e.g., extended use at high or low speed, in dusty or adverse conditions, or routine operation in weather that is below freezing) associated with the vehicle. If a rule is met, a notification may be provided for display to a user, for example using a mobile phone or a website. Accordingly, the user can view the notification and a description regarding what rule was met. In examples, a recommended action is provided to the user, for example to contact a dealer or other service provider, to purchase a replacement part or other product, or advice on how to operate the vehicle in a specific context. Exemplary user interfaces communicating predictive maintenance information are provided in FIGS. 16-19.

The disclosed systems may detect anomalies in vehicles (failure modes) and recommend early mitigation steps to riders—based on usage patterns in specific geo areas with specific riding characteristics, etc. For example, an X number of hard acceleration/deceleration events in desert sand areas wears on belts in a disproportionate fashion—detect this condition and recommend earlier belt change—or advise on proper throttle control while airborne.

The disclosed systems may analyze the telematics information to provide maintenance and use recommendations for the vehicle. Notifications may be delivered to a display of the vehicle, to remote devices, to storage for later retrieval on a remote device, and/or sent by known communication methods such as e-mail, text messages, push notifications. In embodiments, reminders and recommendations are provided. Exemplary reminders or recommendations include

- Error code recommended follow-up
- Recalls and service alerts
- Countdown to next service
- Fuel age recommendation
- Terrain-specific riding or vehicle care recommendations
- Reminders based on time of year—i.e. it's fall—consider doing x, y, z to your unit.
- Reminder to ride based on days since last usage
- Link to video/tutorial content, or option to schedule service.

With the vehicle reporting telematics to the cloud, the vehicle (shown on display), app (shown on remote mobile phone devices) and website garage (web data for retrieval by a browser) should all have: a vehicle-specific maintenance schedule, with miles/engine hours remaining to next service and oil change or a perceived belt life remaining indicator; notifications of upcoming service with link to do-it-yourself tutorial or to schedule service; notifications of service bulletins and recalls with link to schedule service; and recommendations for early service based on DTC codes.

In some instances, an indication of an anomaly may be provided to a dealer or other vehicle service provider. For example, a preferred service provider may be identified from an operator profile or based on a proximity of the service provider to the vehicle, an operator device, and/or an address associated with the operator profile. The indication may comprise vehicle history, operator information, and/or information associated with the anomaly. Accordingly, the service provider may contact the operator to schedule an appointment or to follow up regarding the anomaly or, as another example, the operator may receive a suggestion or reminder (e.g., via the vehicle, an operator device, an electronic communication, or a website associated with the vehicle manufacturer) to schedule an appointment with the service provider.

As another example, a recommendation of a part to purchase may be provided as a result of a triggered alert, a diagnostic trouble code, or other information associated with the vehicle. The recommendation may enable an operator to purchase the recommended part via the vehicle (e.g., using the IVI), via an operator computing device, or using the vehicle manufacturer's website, among other examples.

Additional examples of such aspects are described in U.S. patent application Ser. No. 16/689,212, filed Nov. 20, 2019, titled VEHICLE SERVICE SCHEDULING, the entire disclosure of which is expressly incorporated by reference herein.

Remote Vehicle Locator (See FIGS. 20-25)

Figure 20:
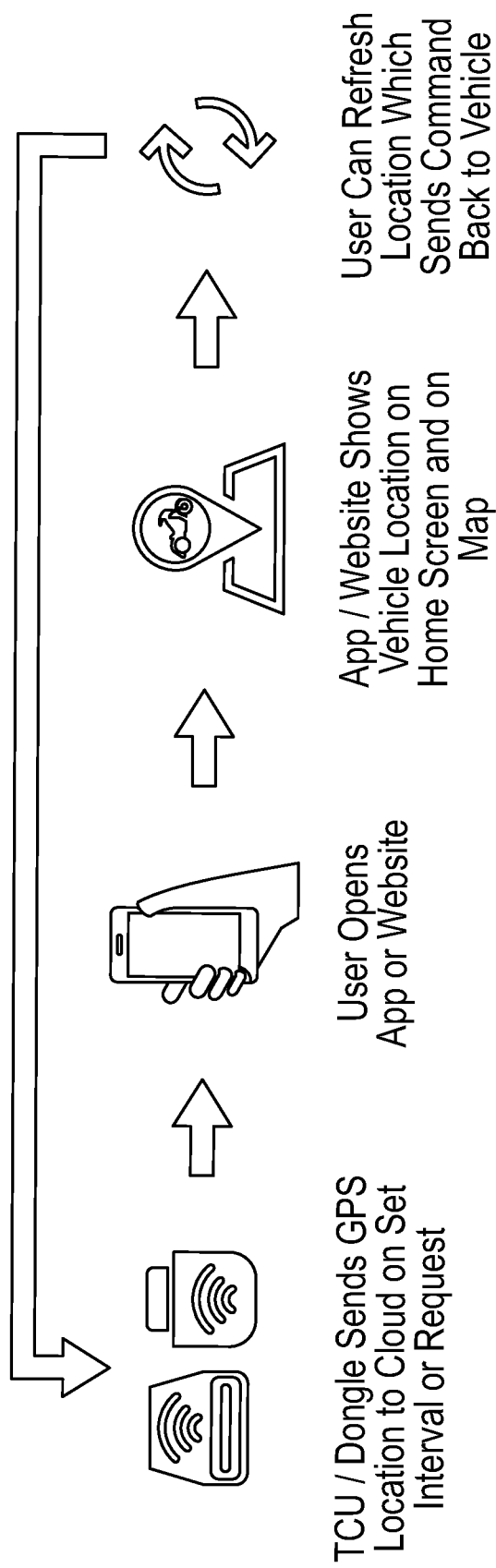
FIG. 20 illustrates an exemplary processing sequence for vehicle 100 related to remote vehicle location.
Figure 21:
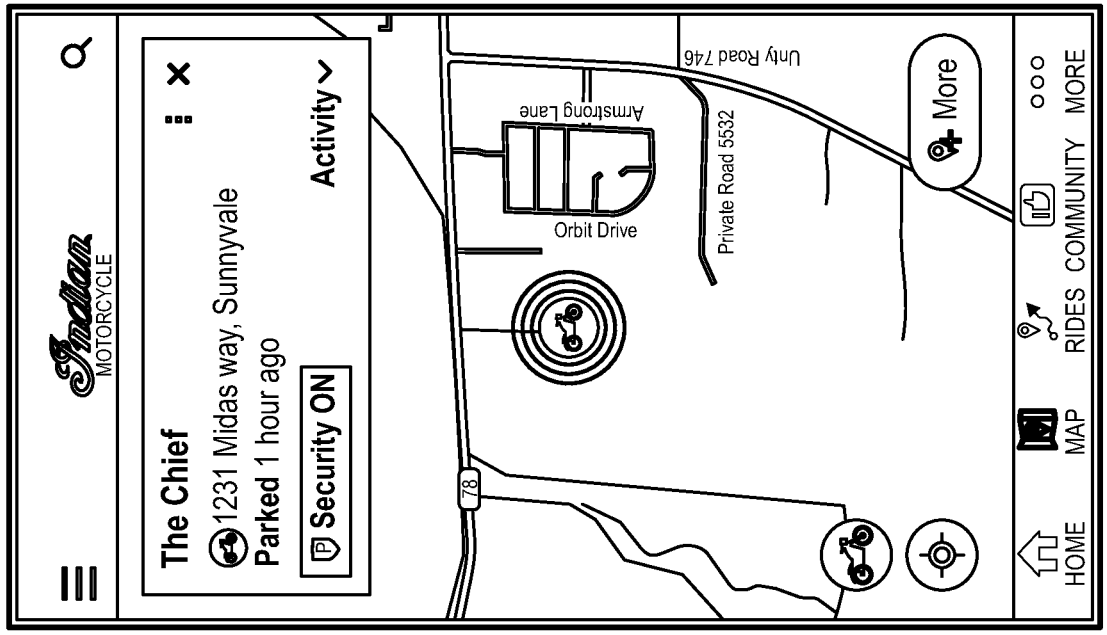
FIGS. 21-25 illustrate exemplary user interfaces communicating remote vehicle location information.
Figure 22:
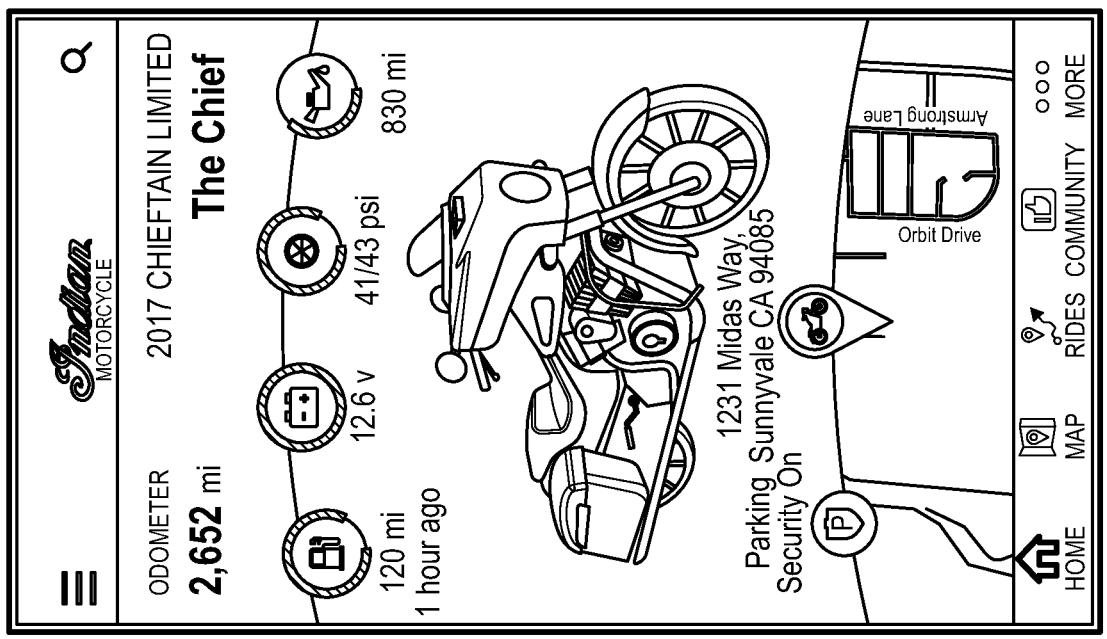
Figure 23:
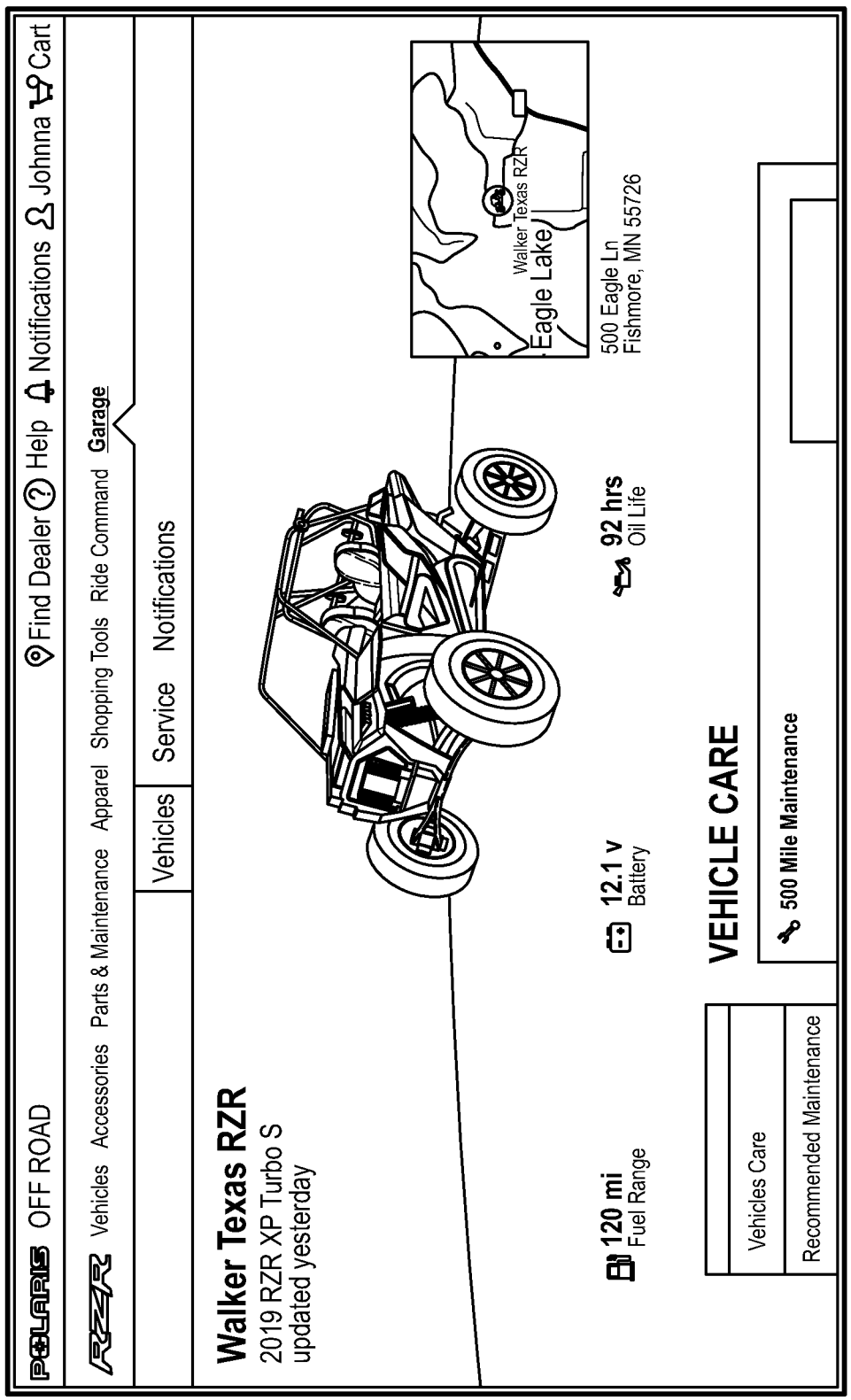
Figure 25:
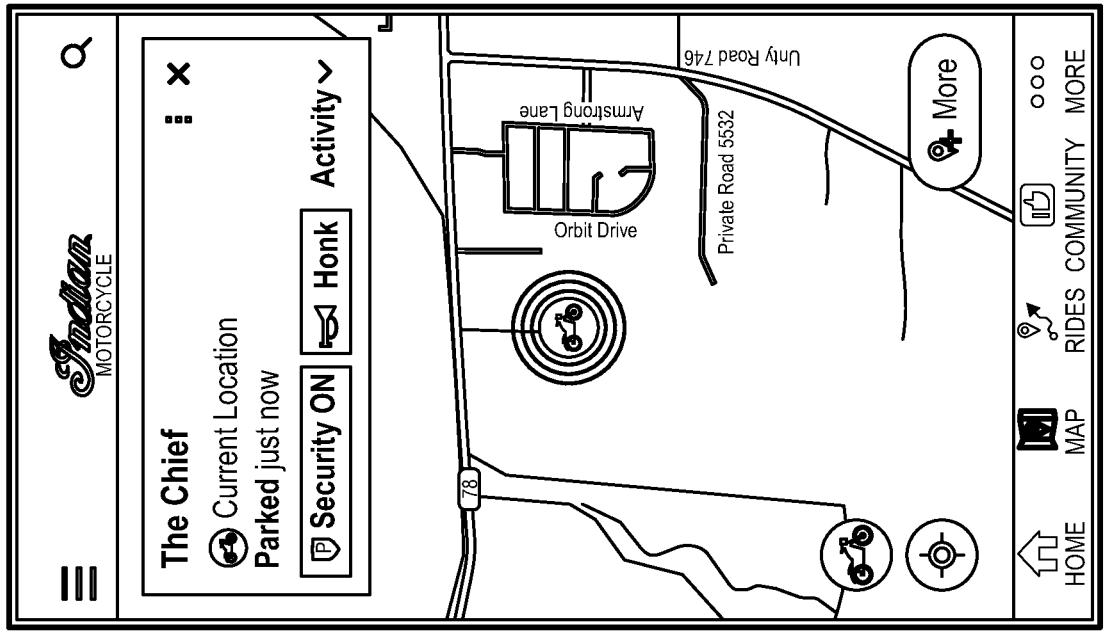
Figure 24:
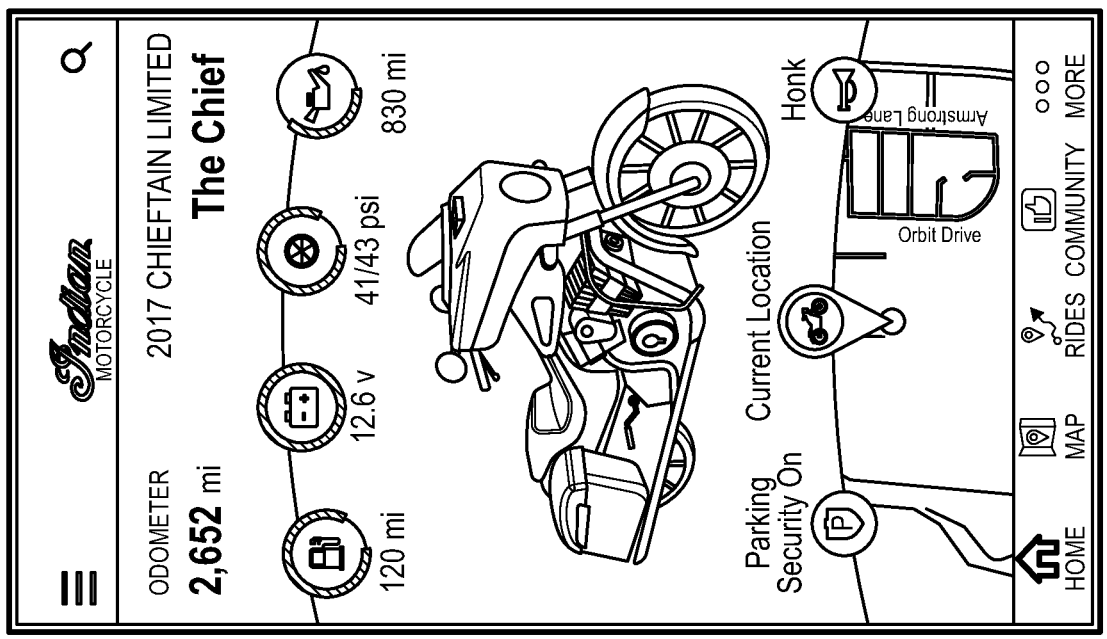
Figure 27:
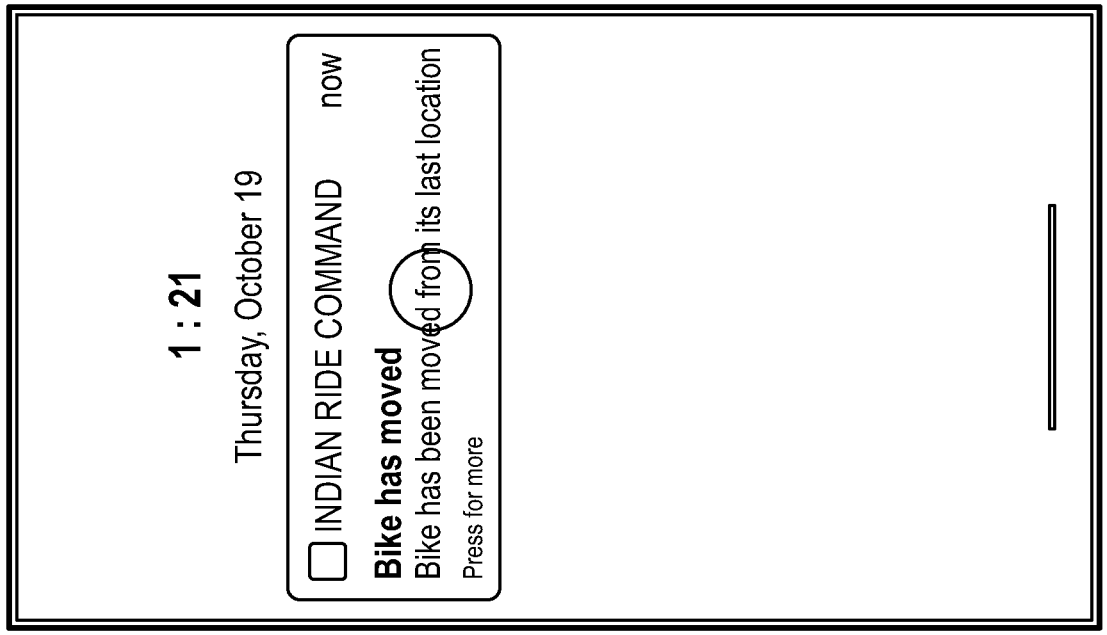
FIGS. 27-31 illustrate exemplary user interfaces communicating vehicle location information.

Referring to FIG. 20, an exemplary processing sequence for vehicle 100 related to remote vehicle location is illustrated. As illustrated, an indication of a geographical location is transmitted (e.g., by dongle or TCU) to a remote computing device, such as a cloud or a vehicle platform, among other examples. The geographic location may be presented via an application of an operator's mobile phone or a website. In examples, the geographic location is transmitted according to a predetermined interval (e.g., according to battery voltage or vehicle model) or, as another example, a request to update the location of the vehicle may be received from an operator, at which point a command may be provided (e.g., to the dongle or TCU) to transmit an updated geographic location accordingly. Thus, an operator may be able to view the current or last known location of the vehicle. Exemplary user interfaces communicating remote vehicle location information are provided in FIGS. 21-25.

The disclosed systems may provide an indication where a vehicle is currently or where it was last detected (based on timestamp of telematics data and available connectivity hardware). In embodiments, based on sensor data (such as an accelerometer or conductive ball and socket) a bump alert may be provided when the vehicle is bumped, which may include an indication of where the bump alert occurred and/or where the vehicle was last powered on. Further, the disclosed systems may track a location of the vehicle and report when the vehicle leaves a geofence area or otherwise travels a predetermined distance from where a security protocol or park function was put in place. It is also contemplated that the user might have the ability to have the vehicle remotely make an audible noise in response to a user input in an effort to signal a security event or otherwise locate the vehicle. Exemplary audio systems are disclosed in U.S. patent application Ser. No. 16/522,957, filed Jul. 26, 2019, titled AUDIO SYSTEM FOR A UTILITY VEHICLE, the entire disclosure of which is expressly incorporated by reference herein.

Theft Alert (see FIGS. 26-32)

Figure 26:
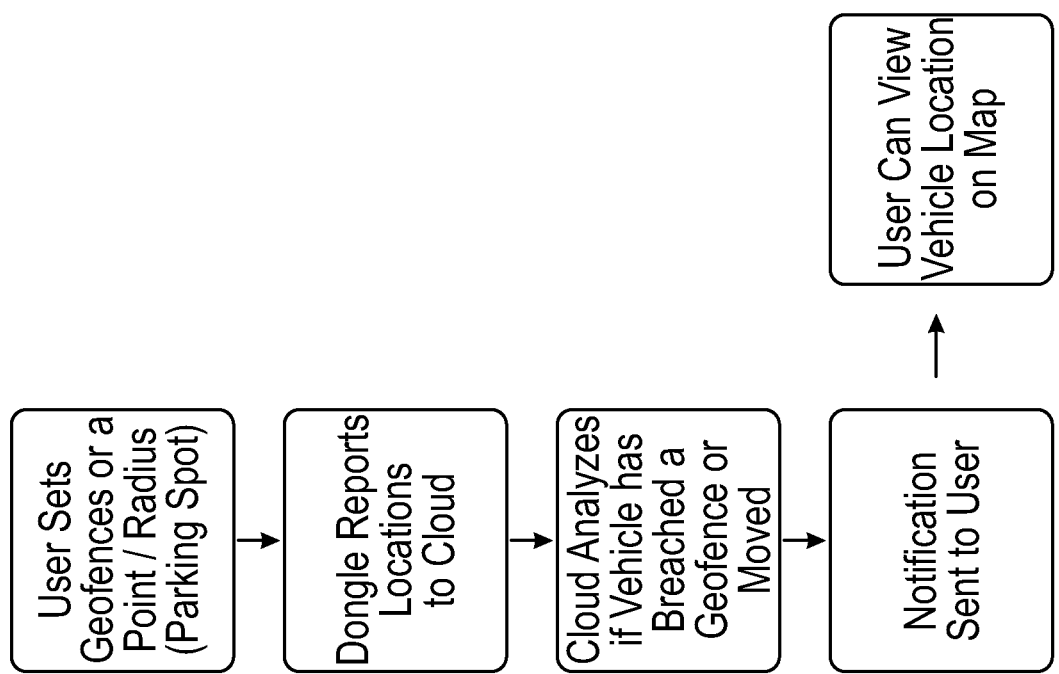
FIG. 26 illustrates an exemplary processing sequence for vehicle 100 related to vehicle theft alert.
Figure 29:
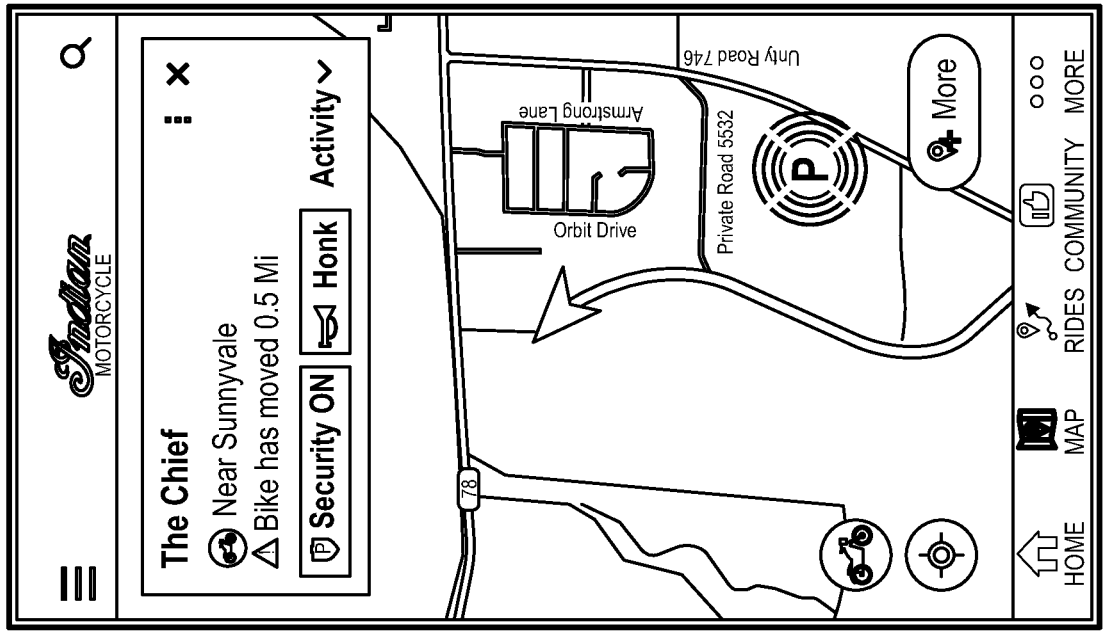
Figure 28:
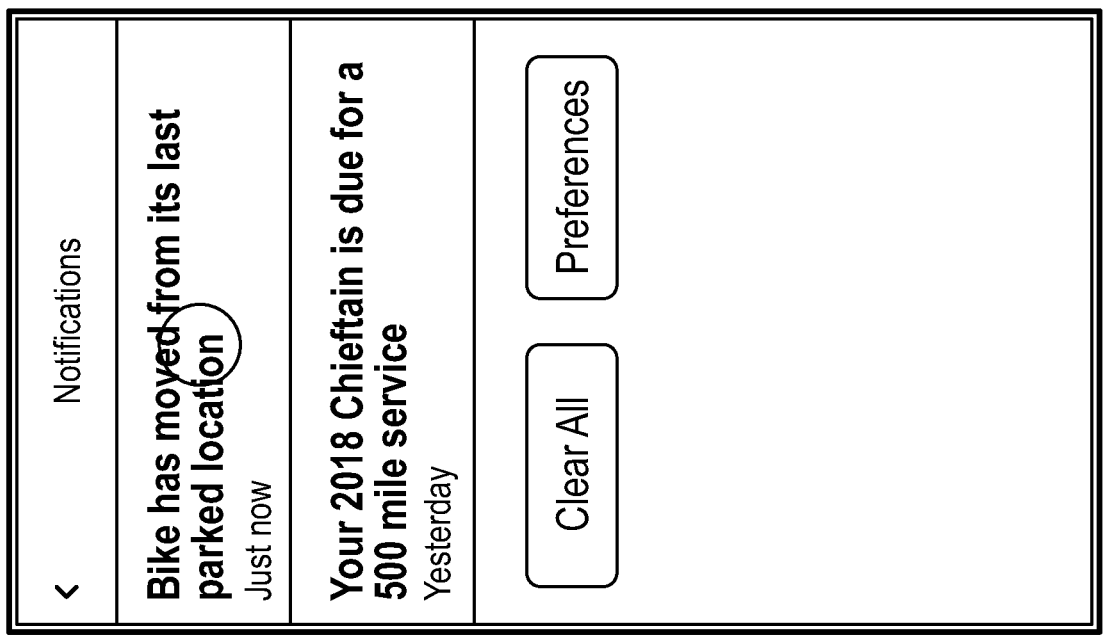
Figure 31:
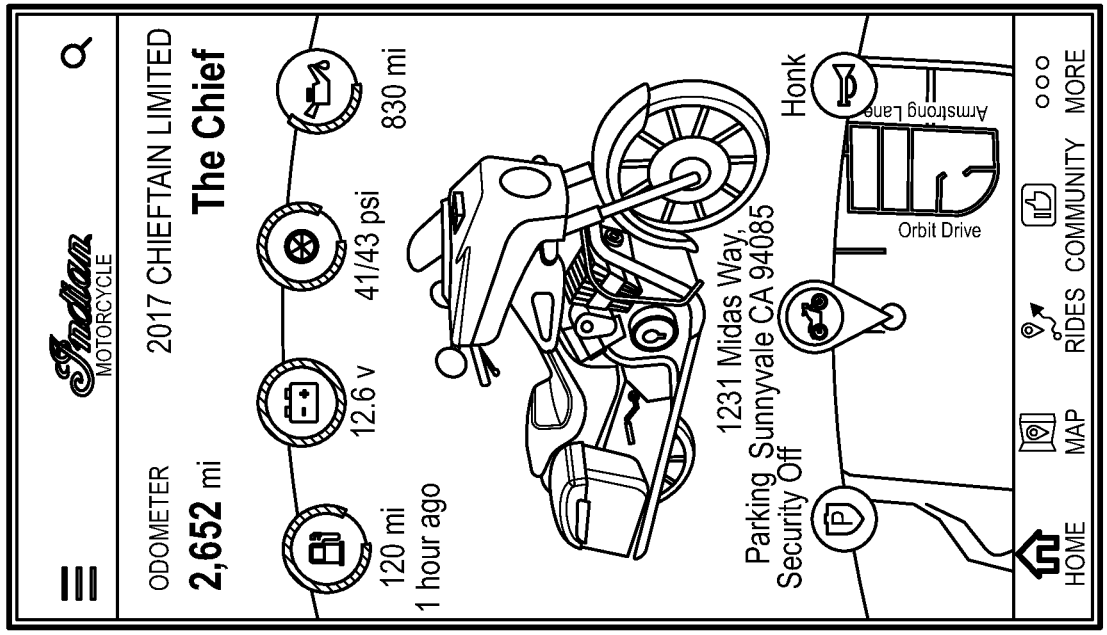
Figure 30:
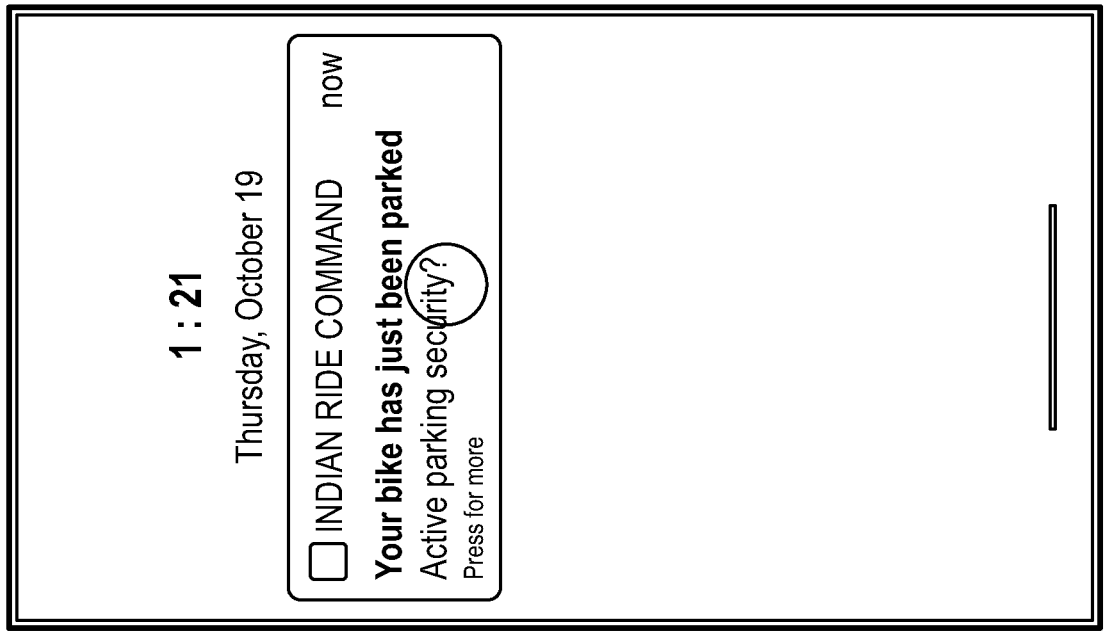

Referring to FIG. 26, an exemplary processing sequence for vehicle 100 related to vehicle theft alert is illustrated. As illustrated, a user indication to set a geofence or a point/radius is received, for example by a remote computing device such as a cloud or vehicle platform. A vehicle location is also received (e.g., from a dongle or TCU), such that it is analyzed with respect to the geofence or point/radius. A notification is generated accordingly if it is determined that the vehicle has breached the geofence, such that the user is able to view the location on a map. Exemplary user interfaces communicating vehicle location information are provided in FIGS. 27-31. FIG. 32 provides a representation of vehicle 100 being towed.

The disclosed systems include setting a parking trigger (manual or automatic) that puts the vehicle in a secure mode to pay attention to bumps and/or movement. This parking trigger could include a Park functionality in the transmission actuated by a pawl, a set of brakes actuated to prevent the wheels from turning, or a mode entered by the ECU based upon a signal from a mobile device, input on the vehicle, key fob, or other representative signal providing device. This could also include engine disable, power limiting, etc.

Parking Security—Lock the vehicle using the vehicle display or mobile app or a key fob. The vehicle will send alerts to the user when the vehicle is bumped or an unauthorized start or start attempt is detected when vehicle is locked.

Parking Security with Mobile Phone Proximity as a Key—When the rider walks away from the bike or off road vehicle, the app detects and prompts the user with a notification to activate parking security. Similarly, when the rider walks away from the bike or off road vehicle, a key fob may provide some notification—audible, tactile, visual, or otherwise—to remind the user to activate parking security.

Geofence Location Security—The Geofence feature allows an owner to define a geographical area on a map to control the behavior of the vehicle. Send notifications to the mobile phone when the vehicle passes a geofence boundary. Additionally, the mobile phone may have the opportunity to communicate a message—textually/visually or audibly—with either the rider, via a display or other mobile phone, or even further limit the functionality of the vehicle.

Automatic Trailer Theft Detection Alert Mute—In embodiments, if theft detection is activated for a vehicle, the disclosed systems ignore movement of the vehicle if the connected vehicle is determined to be being towed by the owner, or other authorized user (see FIG. 32). The system will use location of the connected vehicle and compare it to the location of the owner (or other authorized users) phone. If they are within a first threshold distance of each other, any triggered theft alert based on the location of the vehicle or sensed bumps is ignored or the alert is muted. In embodiments, additional system inputs may be utilized to further increase confidence that the vehicle is being towed. Exemplary additional system inputs include evaluating a vehicle and/or user's speed (to determine if a vehicle is being used), evaluating if the user's phone is connected to a car's IVI (to determine if a vehicle is being used), and evaluating if the vehicle and user's phone is on a track which is a road or highway.

In examples, at least some of the aspects described above may be performed even in instances where bump alerts aren't enabled. For example, if bump alerts are disabled, the vehicle (e.g., a dongle or TCU) may wake as a result of detecting a bump, however an alert may not be sent. Accordingly, if movement is detected (e.g., according to a location determiner) within a predetermined amount of time after the detected bump, location updates may be sent more frequently than they otherwise would be in an instance where a bump was not detected. Such aspects may be performed in addition to the geofence alerts described above. Once movement is no longer determined, the vehicle may return to less frequent location updates. In instances where the vehicle is in operation, location updates may be provided at a greater frequency (e.g., as compared to when the vehicle is in an off state and/or when a bump has been detected).

Figure 33:
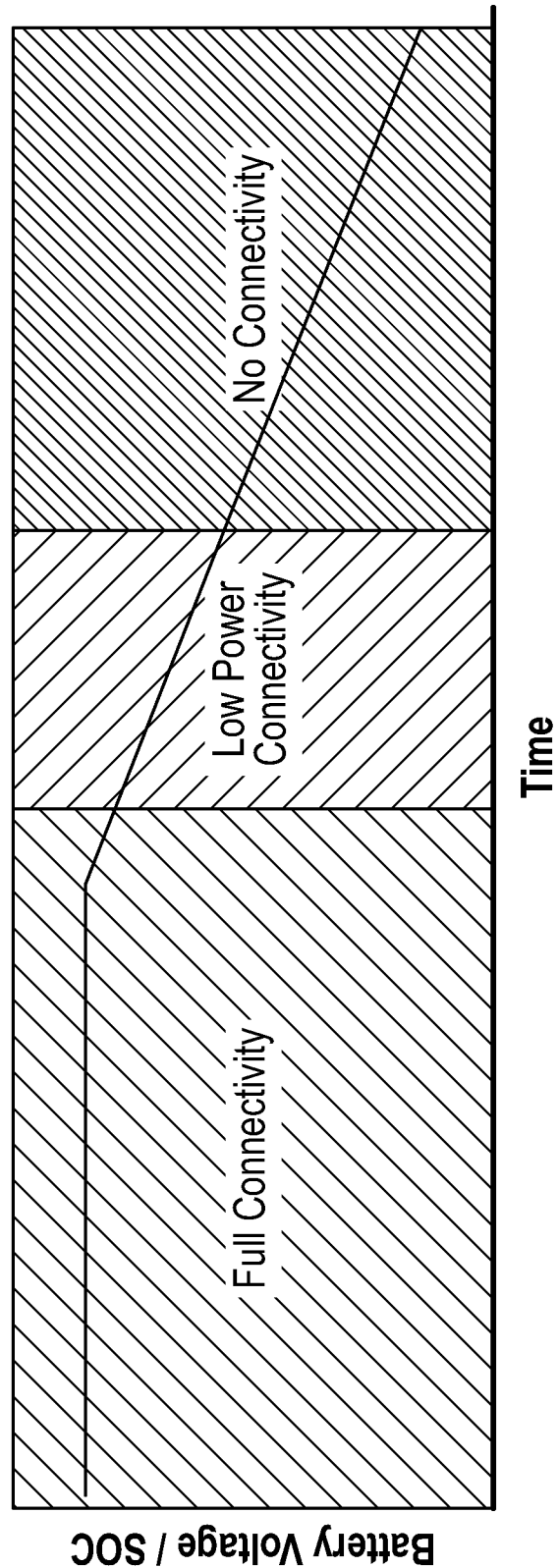
FIG. 33 illustrates an overview of power management according to aspects of the present disclosure.

Power Management (See FIG. 33)

In embodiments, the disclosed systems control the state of a connectivity circuit (such as the telematics control unit) against battery State of Charge and/or Voltage. The need to manage the power draw for power sports vehicles, is due to their batteries being relatively limited compared to other vehicles and due to power sports vehicle's duty-cycles being relatively low (used once every few weeks).

In embodiments, a battery voltage and/or SOC (from a battery SOC health module) are used to control connectivity circuit state. Referring to FIG. 33, three levels of connectivity of the connectivity circuit are illustrated based on a monitored battery voltage and/or SOC.

Full Connectivity: cell modem of connectivity circuit is active and provides full connectivity to cloud and user. In this mode, the cell modem is active and able to be reached in an adhoc basis by remote devices. The vehicle will remain in full connectivity mode when the battery voltage, or battery SOC, is above a predefined setpoint for a predefined period of time. This is envisioned to cover the use-case where the user has plugged their vehicle into a battery tender or is otherwise being powered by the vehicles on-status.

Low Power Connectivity: cell modem is generally off, but awaken periodically (once a day, twice a day, etc.) to provide a heart-beat or status update, and then defaulting back to an off state to save battery energy. The vehicle will transition from the full connectivity mode to low power connectivity mode when the battery voltage, or battery SOC reaches a second predefined threshold after a predefined time the connectivity circuit will move to a low power mode. The transition from the full connectivity to low power connectivity may include a notification to the user's app/web/cloud announcing this change. In embodiments, it is conceived that the low power connectivity mode may simply be used when a vehicle is turned off and not connected to a battery tender No Connectivity: the connectivity circuit is off, so as to not drain the battery further. After a lower, predefined voltage or SOC charge threshold after a predefined time, the device will move to no connectivity with an announcement to the user.

The transitions between states (Full Connectivity, Low Power Connectivity, and No Connectivity) are not unidirectional, and the states (i.e. level of connectivity) could move back up if the battery voltage increases (such as when the user plugs the vehicle into a battery tender).

In embodiments, if a battery tender is not detected on vehicle or if a battery power is not sufficient to send updates to the vehicle over the air, a notification may be sent through the cloud to the customer on the app to let them know that there is an update available for the vehicle but there is insufficient battery power and to go connect a battery tender.

Post Ride Report (see FIGS. 48-51)

Figure 48:
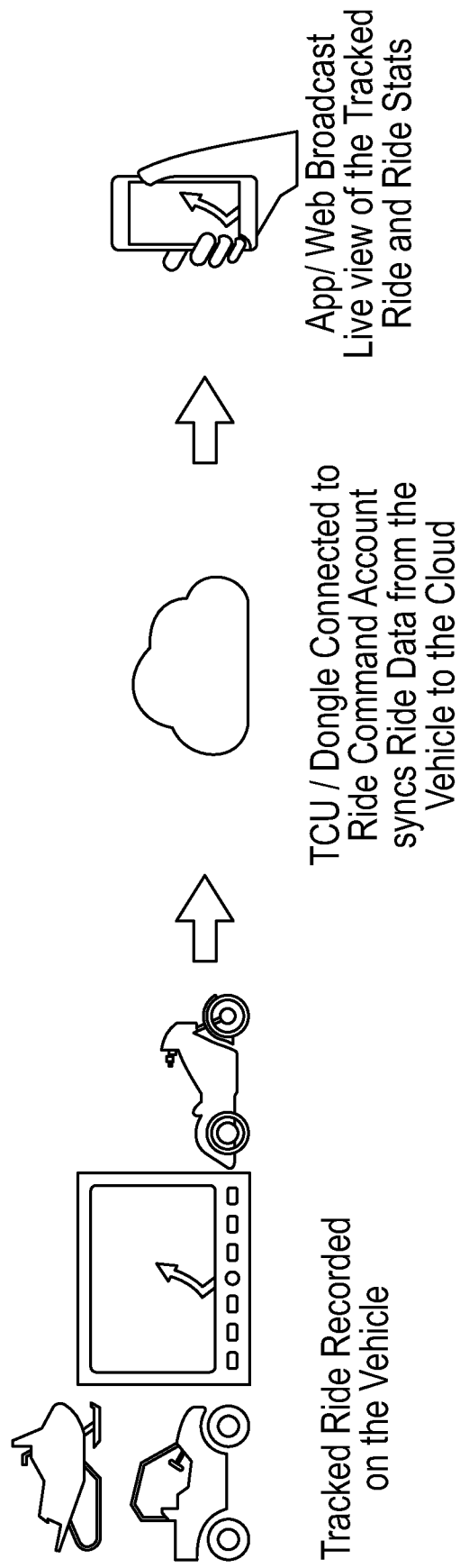
FIG. 48 illustrates an exemplary processing sequence for vehicle 100 related to providing post ride report functionality.
Figure 50:
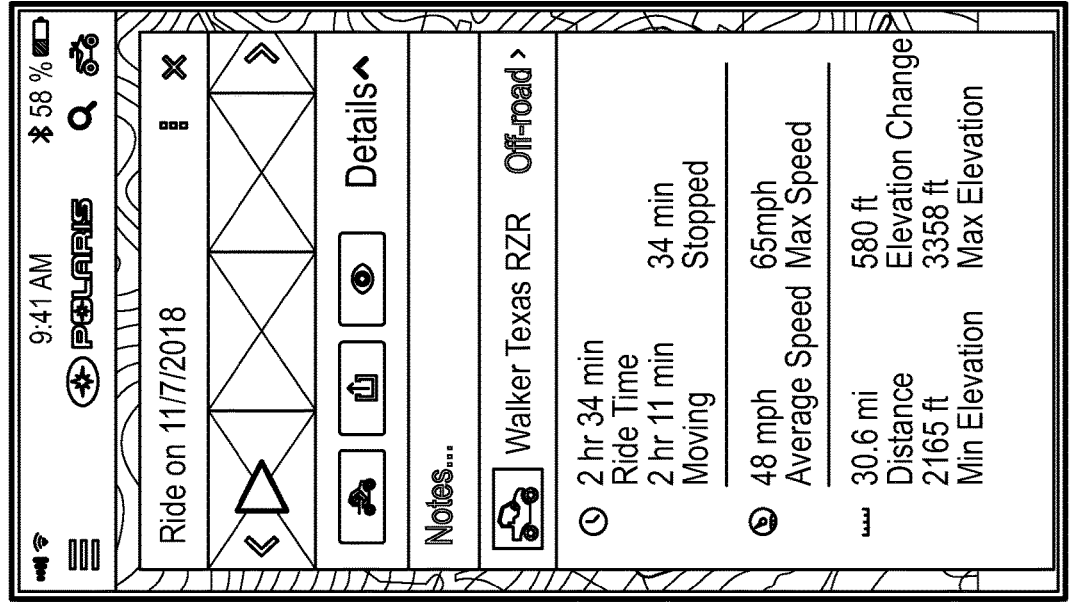
FIGS. 49-51 illustrate exemplary user interfaces communicating ride report information.
Figure 49:
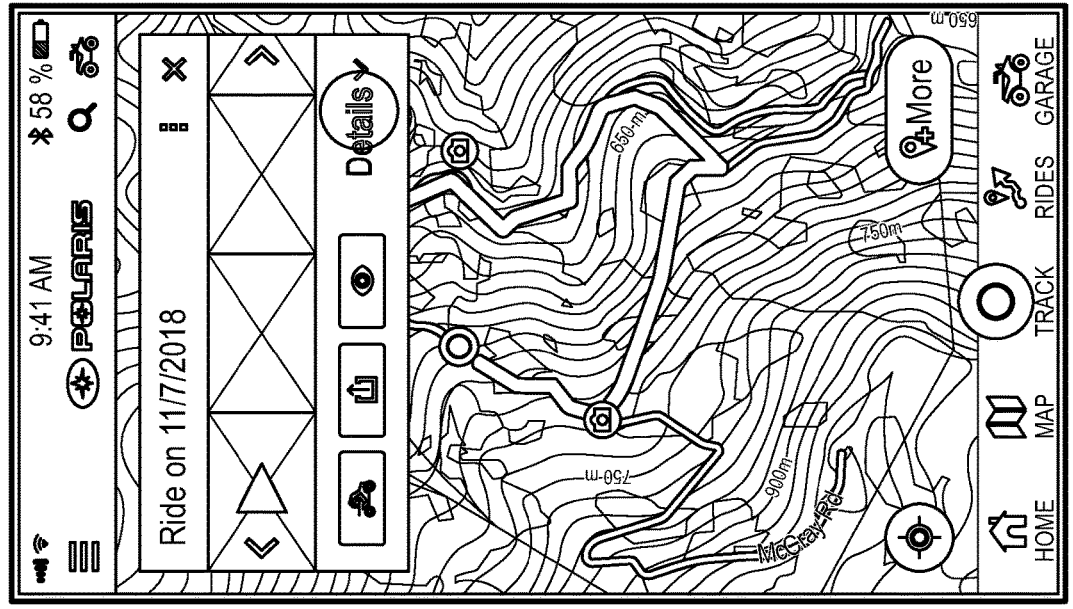

Referring to FIG. 48, an exemplary processing sequence for vehicle 100 related to post ride report information is illustrated. As illustrated, vehicle 100 may record information associated with a tracked ride (e.g., on-road and/or off-road), which may then be provided (e.g., by a dongle or TCU) to a remote computing device such as a cloud or vehicle platform. A user may then view the recorded ride information in real time or once a ride has been completed, for example via a mobile application or a website (e.g., as illustrated in FIGS. 49 and 50). For example, as a vehicle starts and is on a ride, with a cloud connection, a live version of the ride may be displayed as it happens. In examples, photos taken during the ride may be added in context. Thus, the user need not manually start tracking in some instances. In some examples, one or more onboard cameras may be used to capture photos or, as another example, to automatically create a post ride highlight video (e.g., which may further include vehicle performance data).

Figure 51:
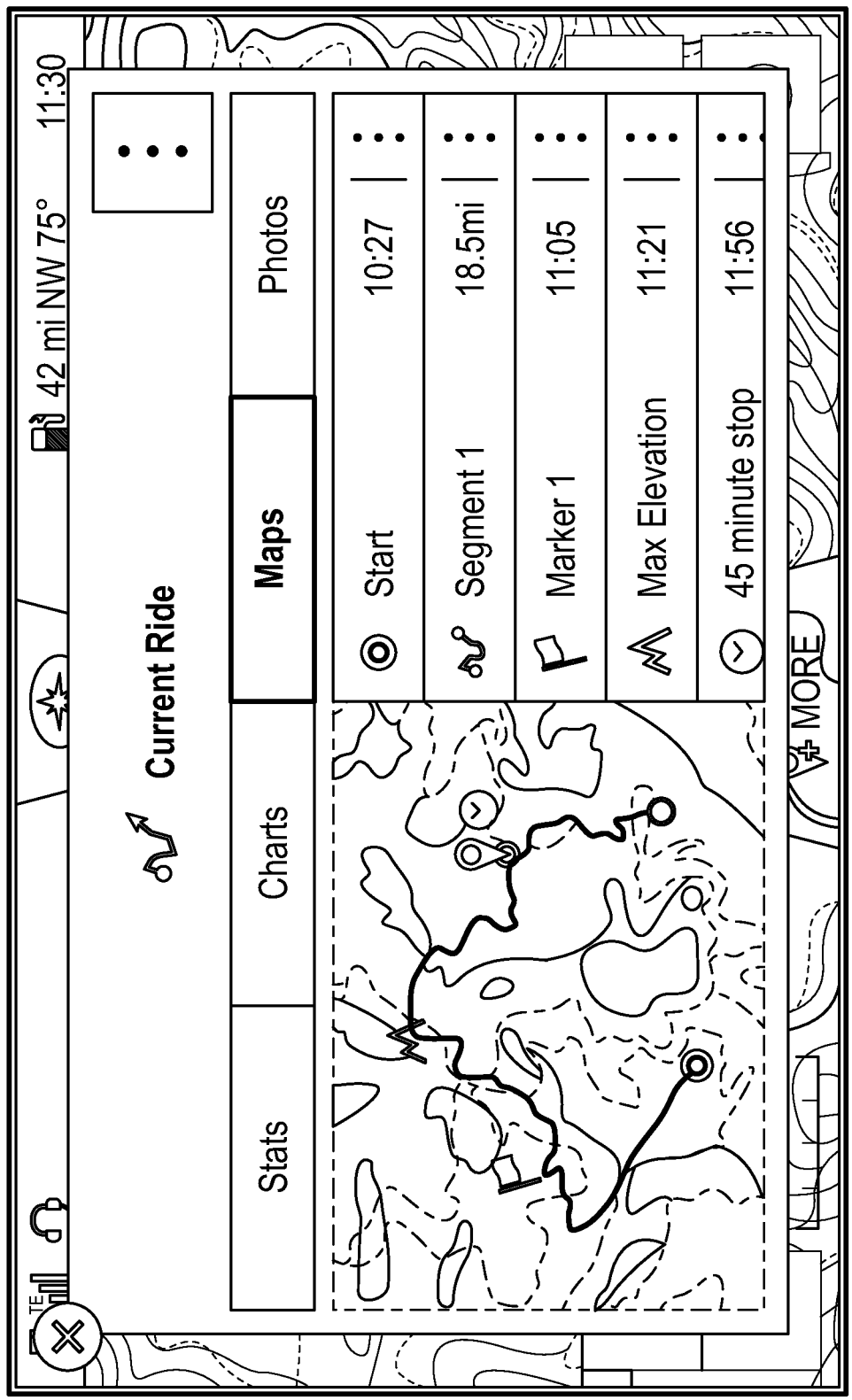

Additionally, the vehicle may display information about the current ride and present options to pause the ride recording, save the current ride, and/or start a new one. In some instances, an on-vehicle ride summary may be generated or, as another example, a trip meter may be presented. On-vehicle and cloud-generated ride reports may thus include ride markers for photos, stops, and/or vehicle-reported events like stops and jumps, among other examples. An example of an on-vehicle display is depicted in FIG. 51.

A recorded ride may be shared with a community and/or used to generate a post-ride reports which, in some example, may have a 3D-flyover representation. Further, such aspects may be applicable even in instances where a vehicle does not have an IVI. As another example, rides can be viewed from the rides/places tab in addition to directly from a map. In some instances, the rides/places layout may have a layout that includes a 3D track (e.g., which may automatically be loaded and/or play when the page is loaded). Similarly, a map of the ride can be viewed by clicking a map segment of a 3D Track/Map toggle.

Group Ride Tracking (FIGS. 52-55)

Figure 52:
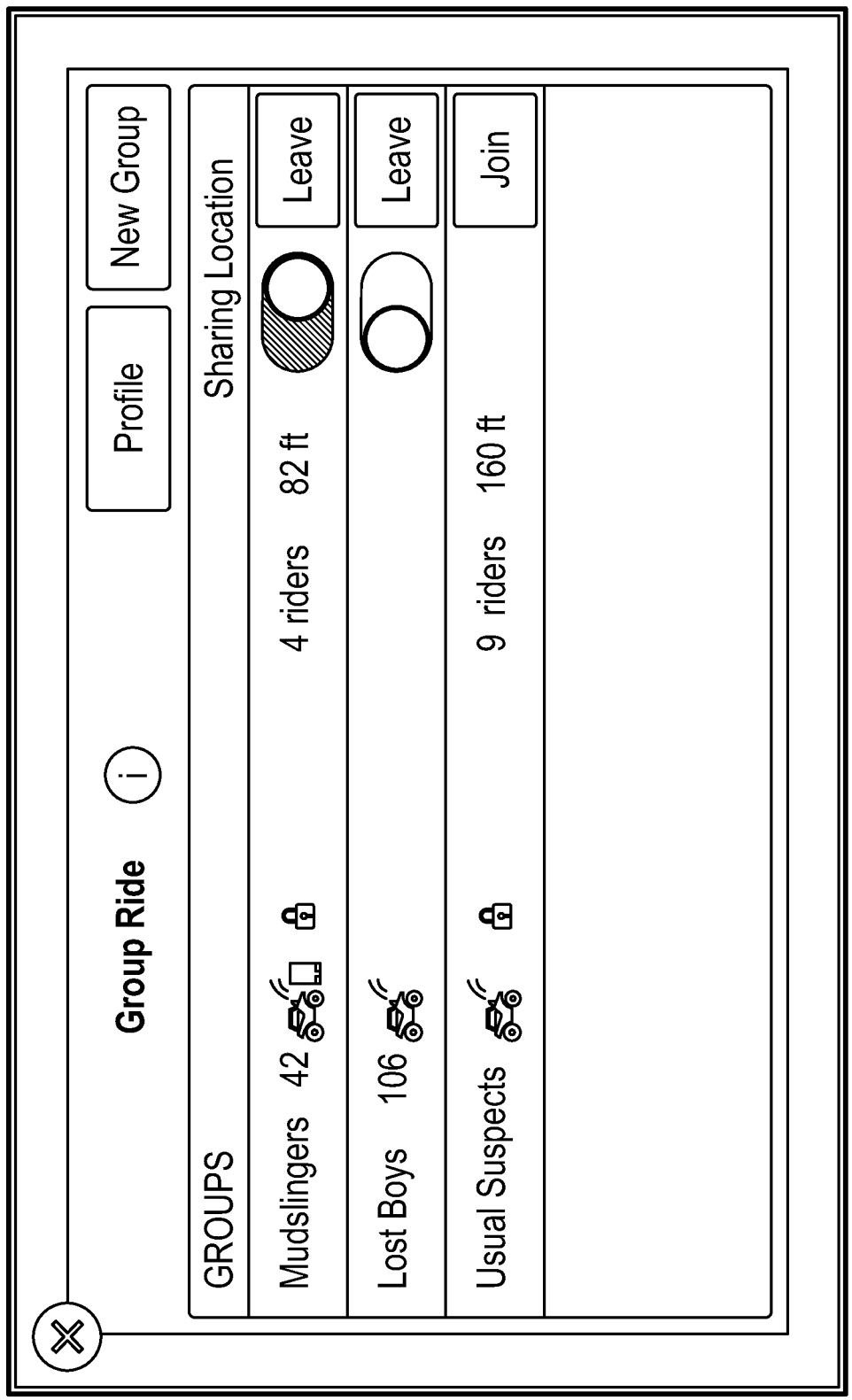
FIGS. 52-55 illustrate exemplary user interfaces for group ride tracking.
Figure 53:
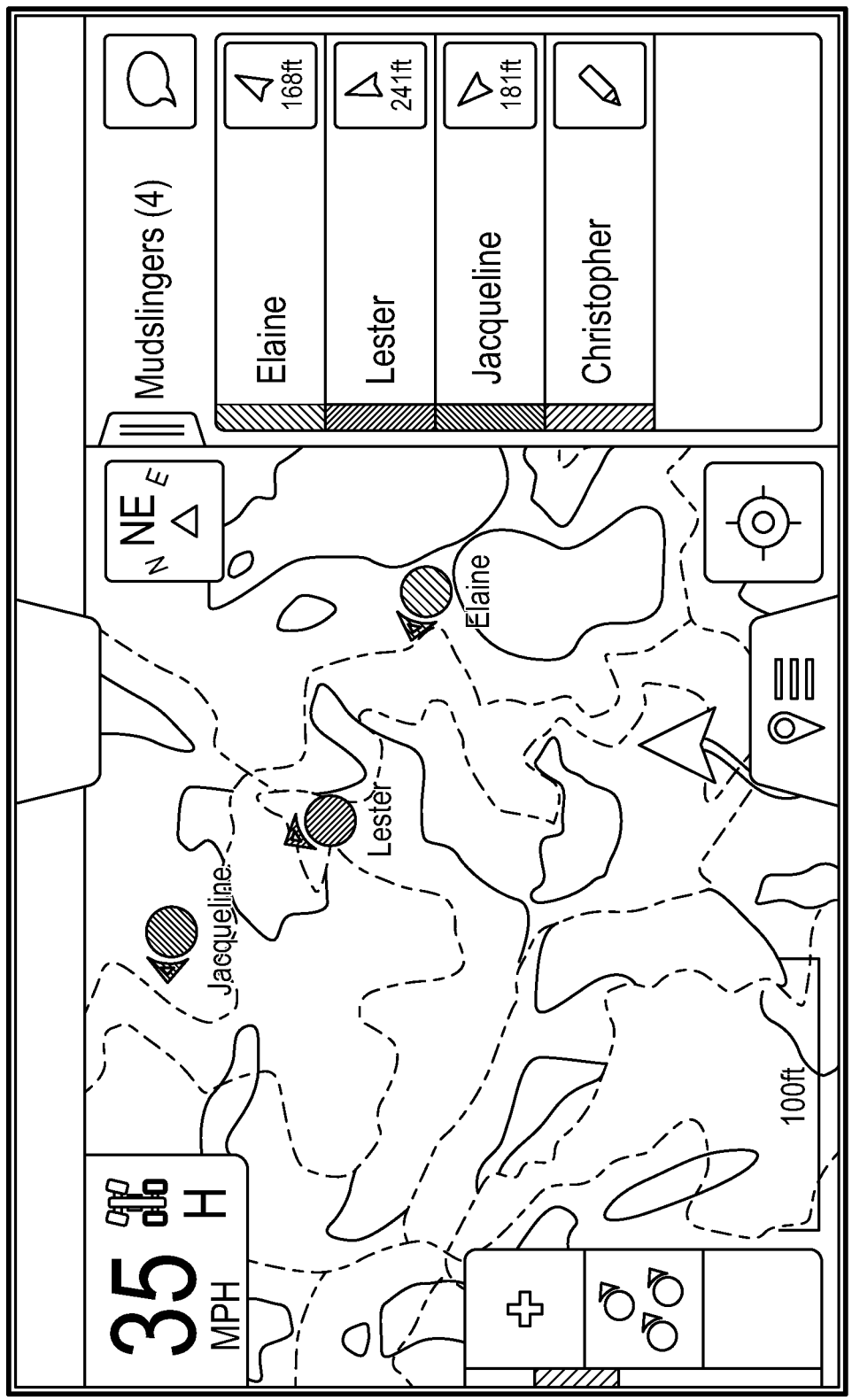
Figure 54:
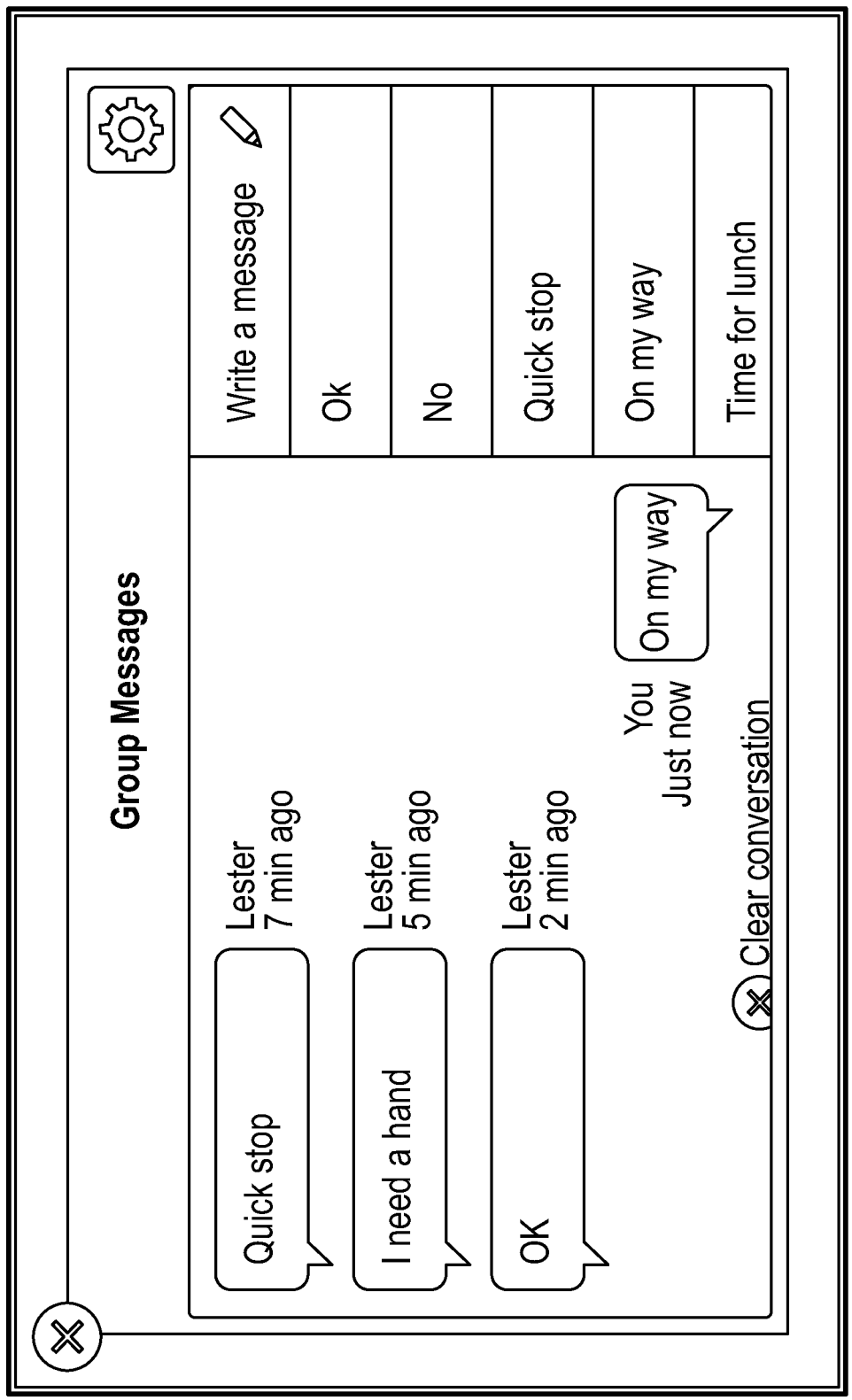
Figure 55:
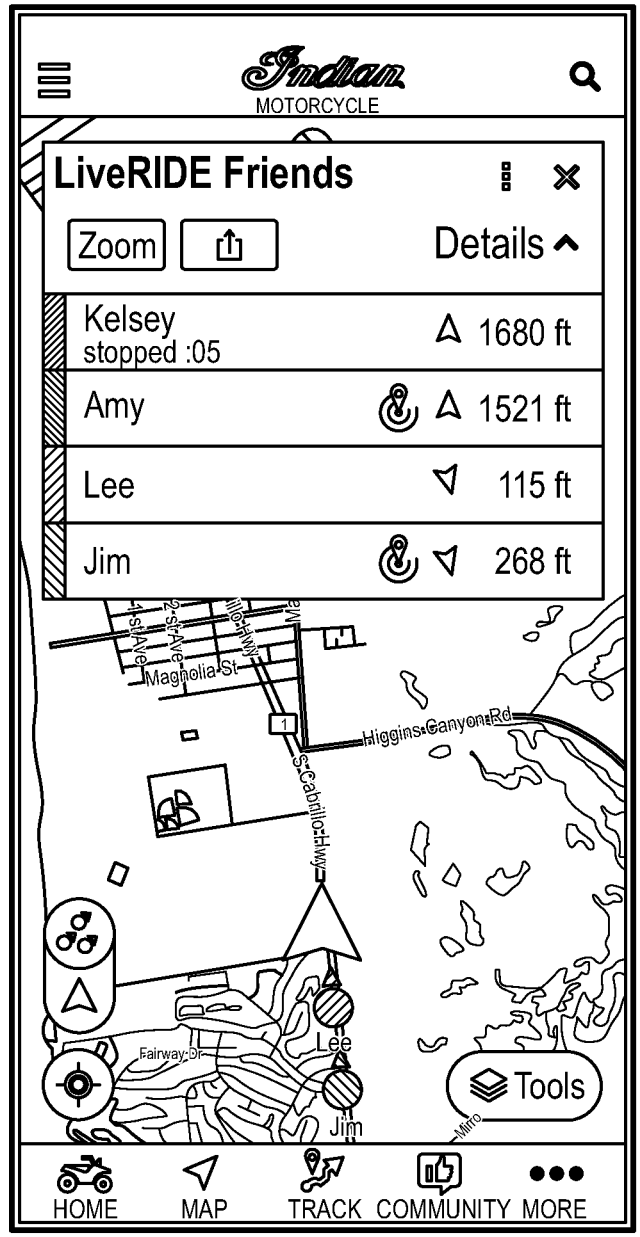

Similar to the remote vehicle locator and/or post ride report aspects described above, a vehicle location may be shared with a set of other vehicles (which together may form a group of vehicles, as shown in FIG. 52), for example using a cellular or vehicle-to-vehicle connection. In examples, a vehicle may display its location and the locations of other vehicles on a map (see FIG. 53). In another example, a similar display may be presented by a mobile device of an operator, as shown in FIG. 55 (e.g., as may be the case when an operator's vehicle does not have the software and/or hardware capabilities to provide such a display). In some instances, a notification may be generated when a group is spread out too far (e.g., according to a predetermined distance threshold and/or distance from a specific vehicle, among other examples). In another instance, route information, spots, waypoints, and/or other collections of map data may be distributed among the group, for example such that directions may be provided to operators accordingly. Members of a group may exchange messages with one another, for example as text messages, audio messages, and/or video messages, examples of which are shown in FIG. 54. Such group ride functionality may be initiated manually (e.g., remotely using a mobile device or by providing an indication via an operator interface of a vehicle) or automatically, among other examples.

Send Trip Plan to Vehicle

In examples, a trip plan is communicated to a vehicle, for example via a cloud or vehicle platform. As an example, the trip plan may be associated with a profile of the vehicle platform, such that it may be synchronized with the vehicle accordingly (e.g., as a result of a similar association with the profile of the vehicle platform). In other examples, the trip plan may be communicated more directly to the vehicle, for example via Bluetooth tethering to a user's mobile device. In some examples, a trip plan may be communicated to a plurality of vehicles associated with a predetermined ride group, such as two or more vehicles, to facilitate a group ride. A trip plan may be created using a mobile application or via a website, among other examples. The trip plan may be presented on a display of the vehicle, such that an operator can view turn-by-turn directions along a planned route. For example, a basic trip plan may include point-to-point tracks along the desired route. As a result, routes are presented on a display of the vehicle as tracks on the map. An operator may also get navigation guidance (e.g., distance and bearing) to a single waypoint destination. While examples are described with respect to a trip plan, it will be appreciated that similar techniques may be used for routes, rides, and waypoints, among other examples.

Figure 56:
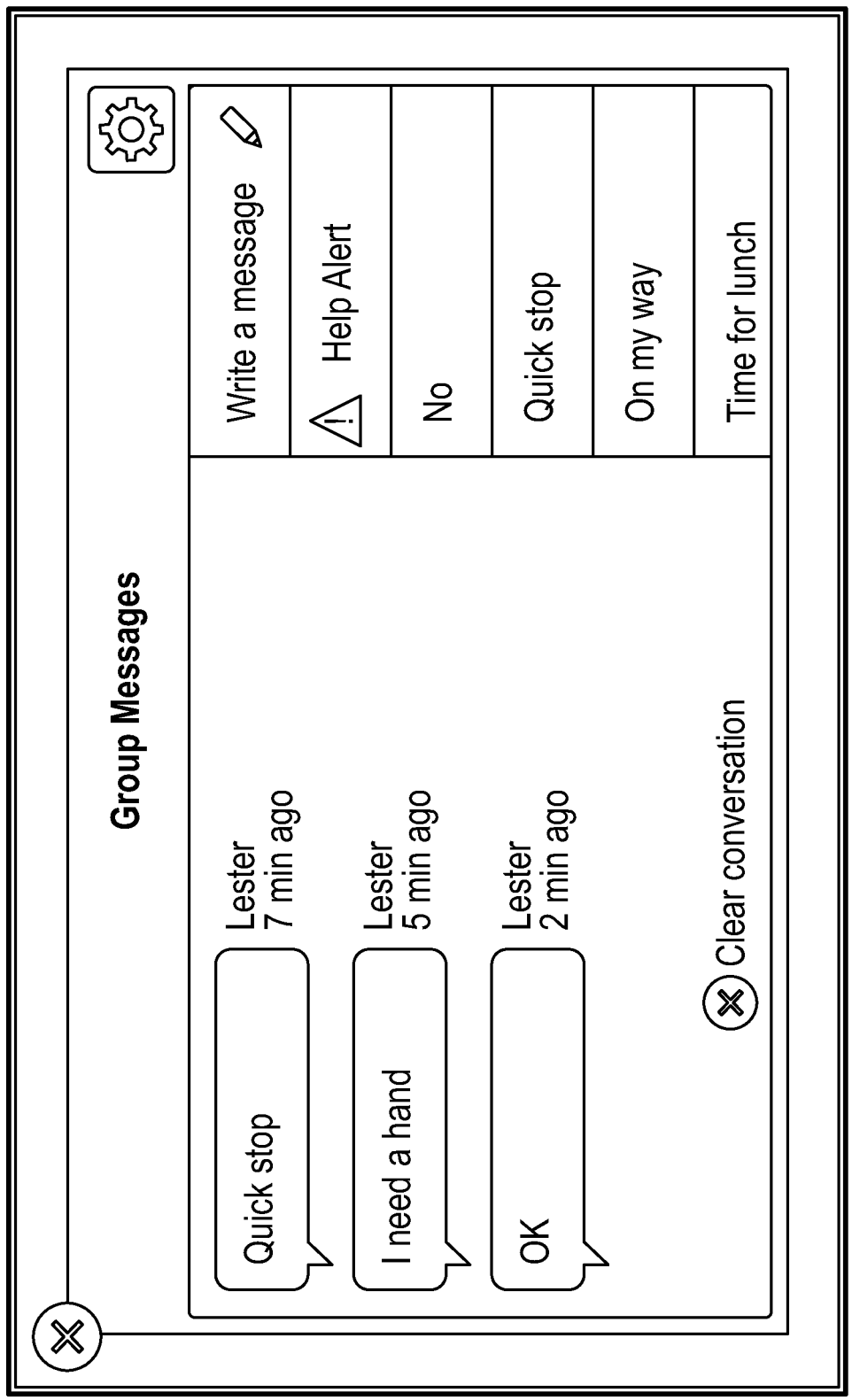
FIGS. 56 and 57 illustrate exemplary user interfaces associated with SOS alert functionality.
Figure 57:
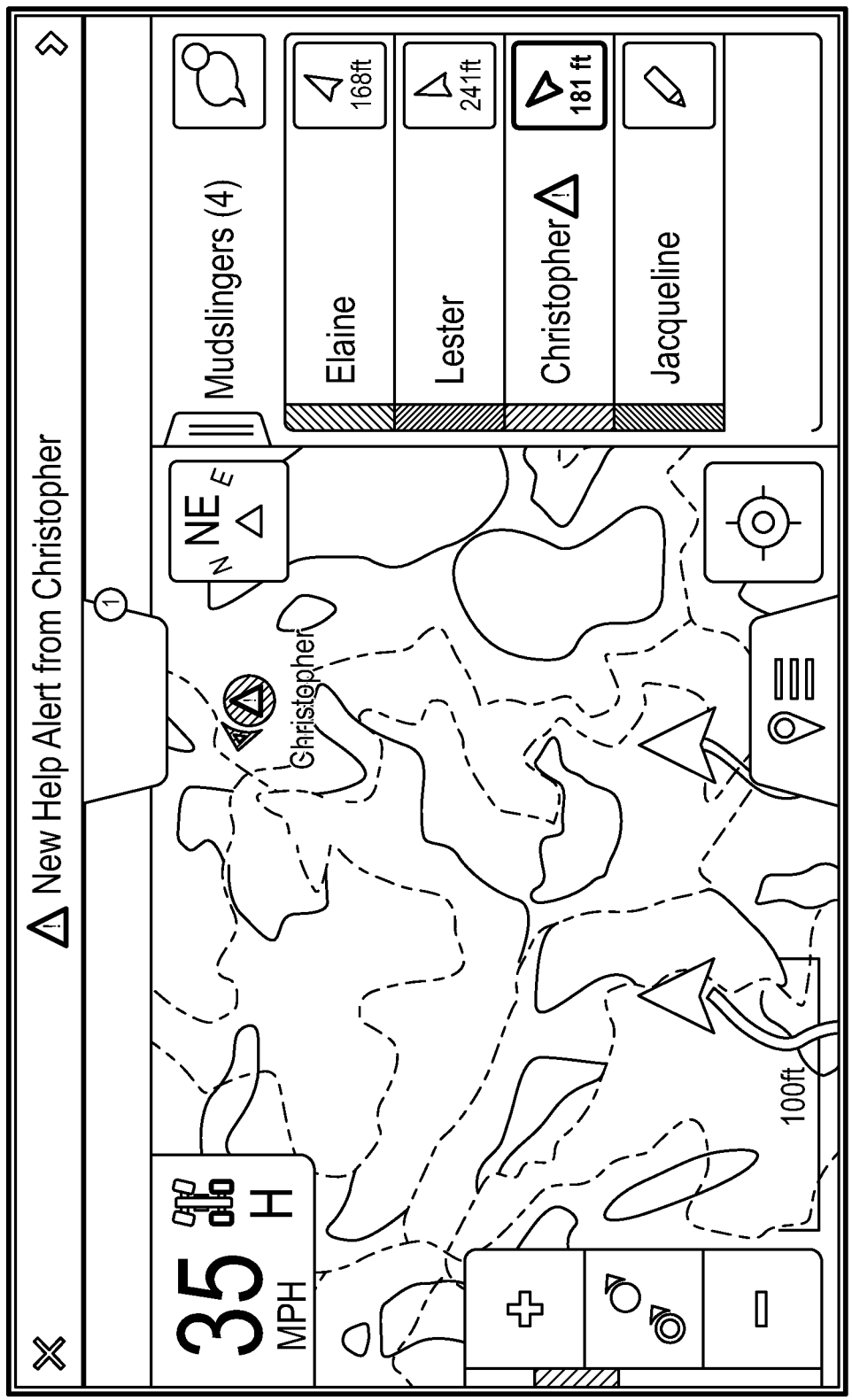
Figure 58:
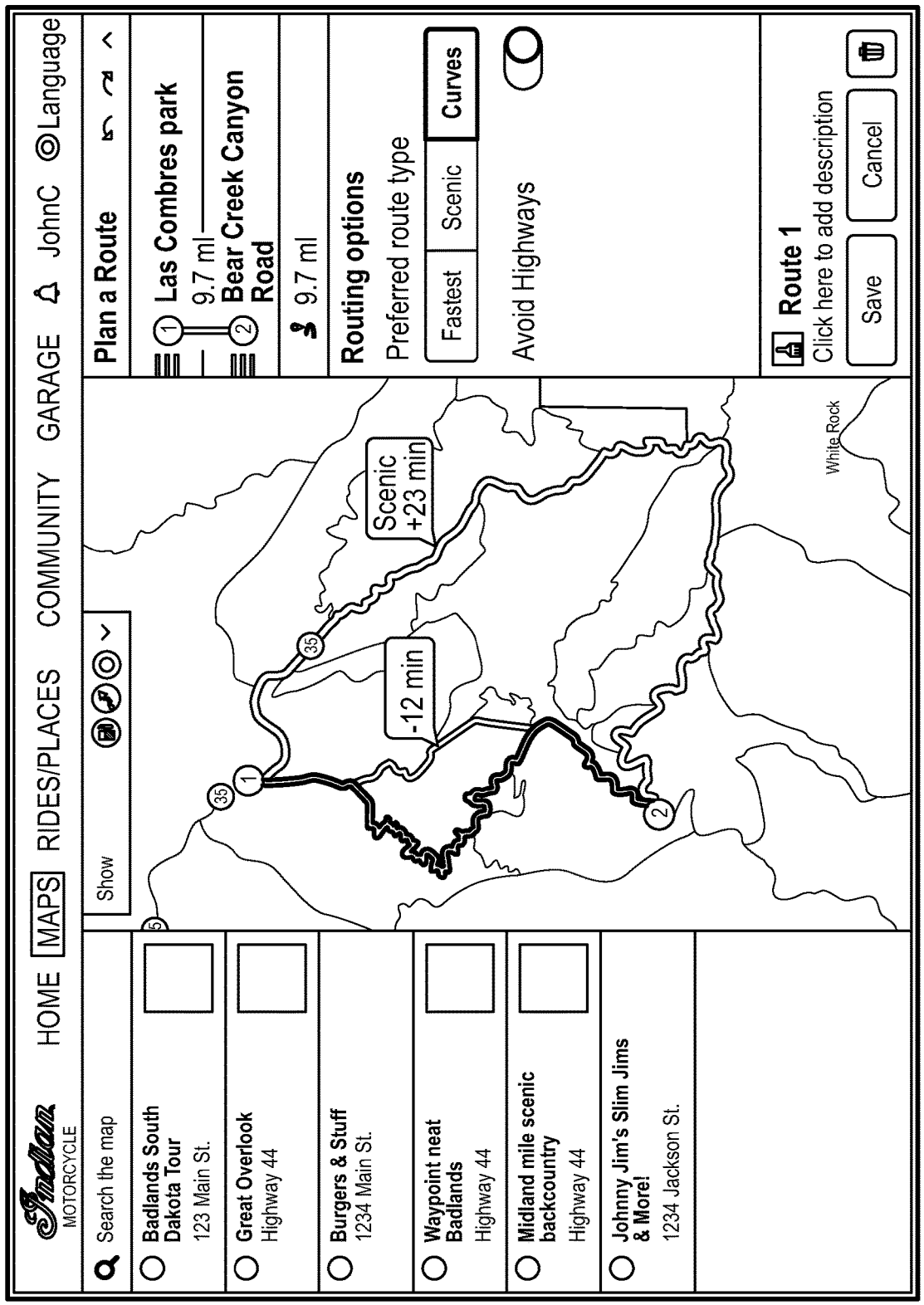
FIGS. 58-61 illustrate exemplary user interfaces associated with personalized route planning.
Figure 59:
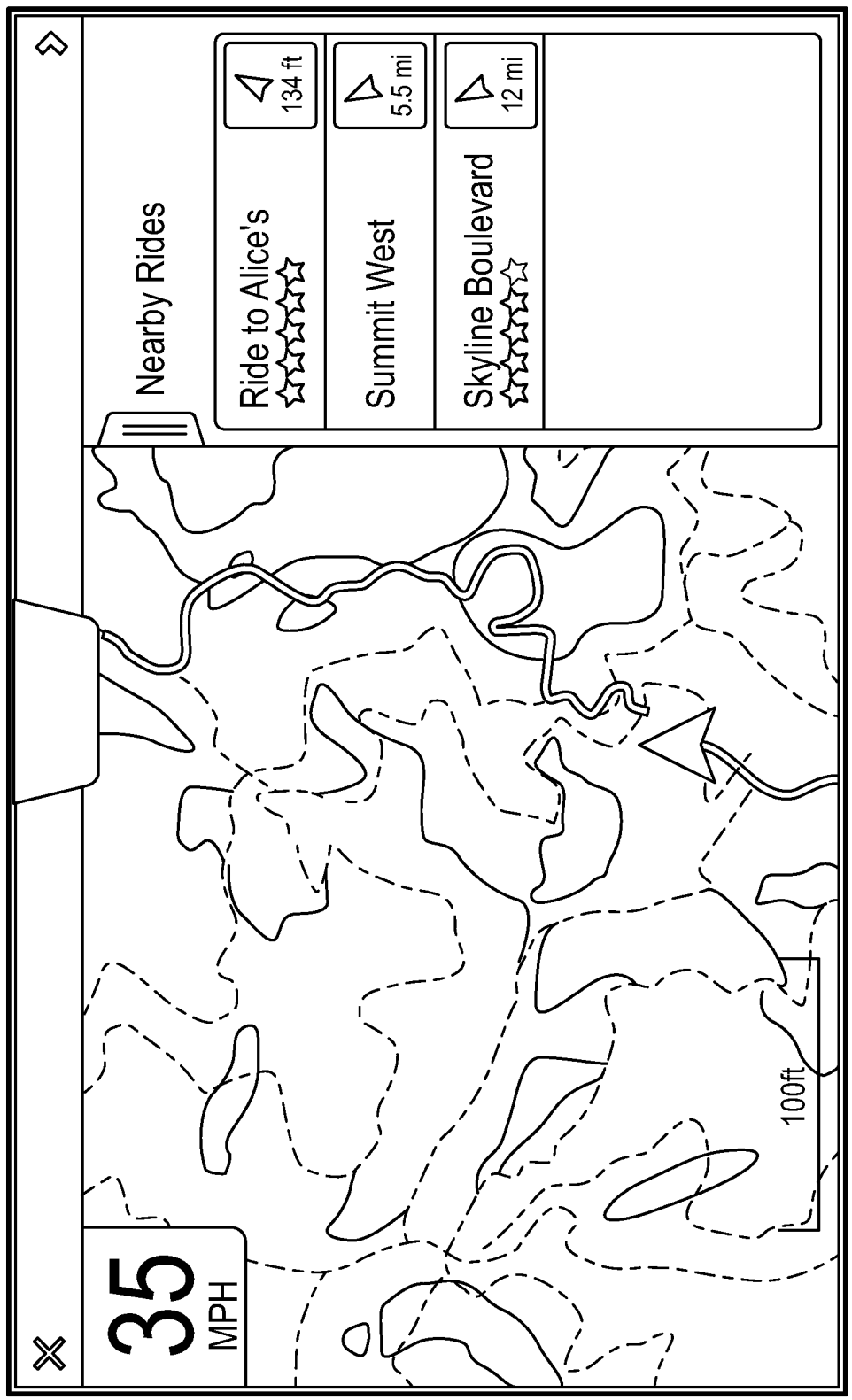
Figure 61:
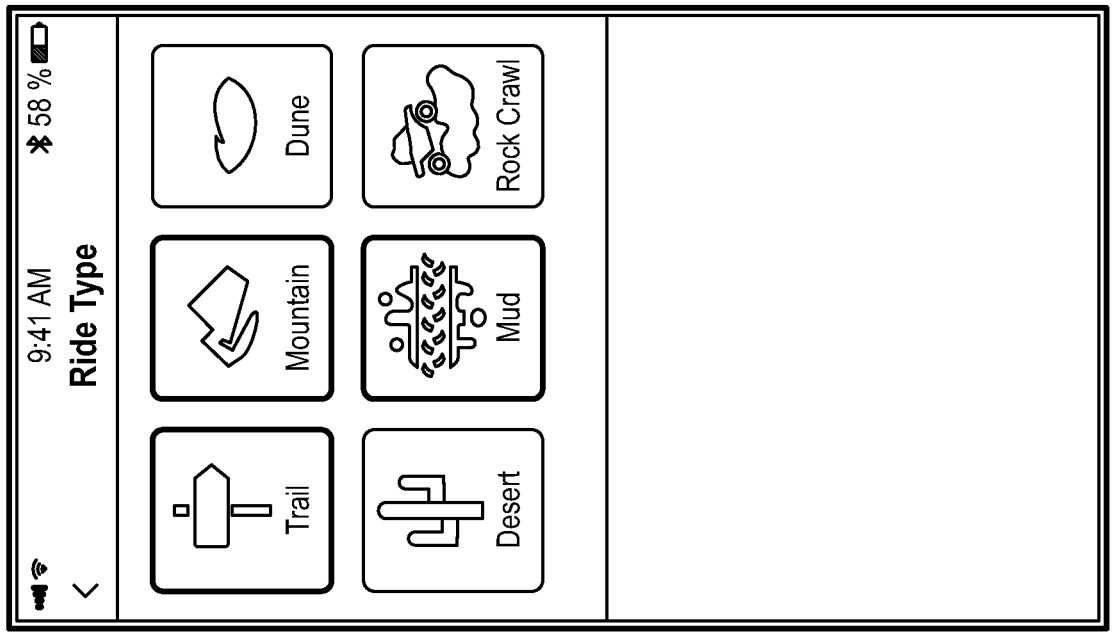
Figure 60:
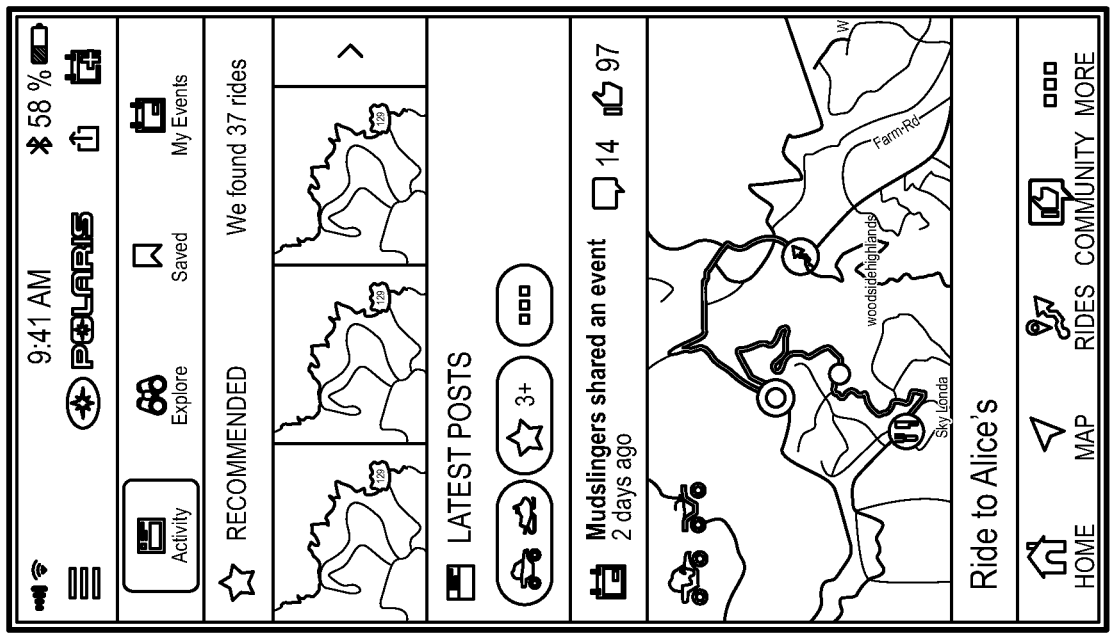

SOS Alerts (see FIGS. 56-57)

The disclosed systems may provide the ability to send an SOS alert to a ride group, specific devices associated with predetermined emergency contacts (e.g., one or more persons located near a group ride or back home), and/or possibly emergency services up to and including a Helicopter Life-Flight. SOS alerts may be manually triggered, or automatically triggered by vehicle sensors. For example, it may be detected that a vehicle has rolled over, tipped over, or experienced a thermal event. As another example, user input may be received to generate an SOS alert.

The alerts may be sent to members in the same group as the vehicle needing assistance, to vehicles within a given proximity of the vehicle needing assistance, or other identified devices, such as contacts or friends even if not part of ride group. For example, an alert may be sent using an Internet connection (e.g., via a cellular network) and/or a local connection (e.g., via Bluetooth, Wi-Fi, and/or vehicle-to-vehicle communication).

In examples, a help alert message may be entered in advance and stored at a vehicle platform. An indication may be received from the vehicle to send the help alert message, thereby causing the vehicle platform to send the help alert message in response. In some instances, the indication includes a recipient or, as another example, the intended recipient is similarly pre-stored in association with the help alert message. In some instances, an acknowledgment may be provided to the vehicle that indicates the help alert message was successfully sent.

Exemplary user interfaces communicating vehicle location information and assistance alerts are provided in FIGS. 56 and 57. While example SOS alerts are described, it will be appreciated that similar functionality may be provided using any of a variety of other techniques, for example via an integration with a third party service or device. Further, while examples are described in the context of alerts or messages, it will be appreciated that similar techniques may be used to enable SOS alerts using audio and/or video communication.

Personalized Route Planning (see FIGS. 58-61)

Community content can be leveraged to alert riders of nearby recommended rides based on riding style and preferences. The disclosed systems may suggest community shared rides based on riding style and other preferences. Suggested rides can come from community shared rides. These community shared rides and/or other suggested rides may be displayed on the vehicle on the home screen, or on a mobile device, on a map. This would let riders browse nearby routes, choose the route they would like to ride/drive, and further have the display or mobile device create that route. Potential classification of rides for recommendation include:

Rides that are nearby
    Where the vehicle has been driven, in the past
    Personal likes/ratings of community rides
    High community rating
    Preferences set on the app or vehicle
    Ride type—Potential categories include Rock Crawling, Mudding, Dunes, Desert, Mountains, Trail
    Road type—Curved/Winding, Scenic, Long-Way, Fastest-Way, Speed based, Fuel Economy based, Fewest turns, Road type (gravel, paved, etc.)

Exemplary user interfaces communicating potential rides and selection of ride type are provided in FIGS. 58-61.

Remote Vehicle Lock

In examples, vehicle 100 may have a setting to prompt an operator for a passcode before operation of the vehicle or, as another example, before allowing access to higher power operation of the vehicle, among other examples. An operator may set a passcode of the vehicle using a mobile application of an operator's mobile device, via a vehicle platform, or at the vehicle itself. Similarly, a passcode may be provided to unlock the vehicle using a mobile application of an operator's mobile device, via a vehicle platform, or at the vehicle itself.

In such examples, an indication of the current lock/unlock status may be presented and an operator may enable, update, or disable a remote vehicle lock accordingly, for example to restrict an engine control module and/or other functionality of the vehicle. In examples where a lock or unlock command is provided to the vehicle remotely (e.g., via a vehicle platform or a mobile device), a success or failure indication may be received in response to the indication. Accordingly, an indication may be presented as to whether the vehicle was successfully locked or unlocked. In some instances, a vehicle platform may enable passcode recovery, for example by storing a passcode in association with an account of the vehicle platform or by requesting the passcode from the vehicle, among other examples.

Figure 34:
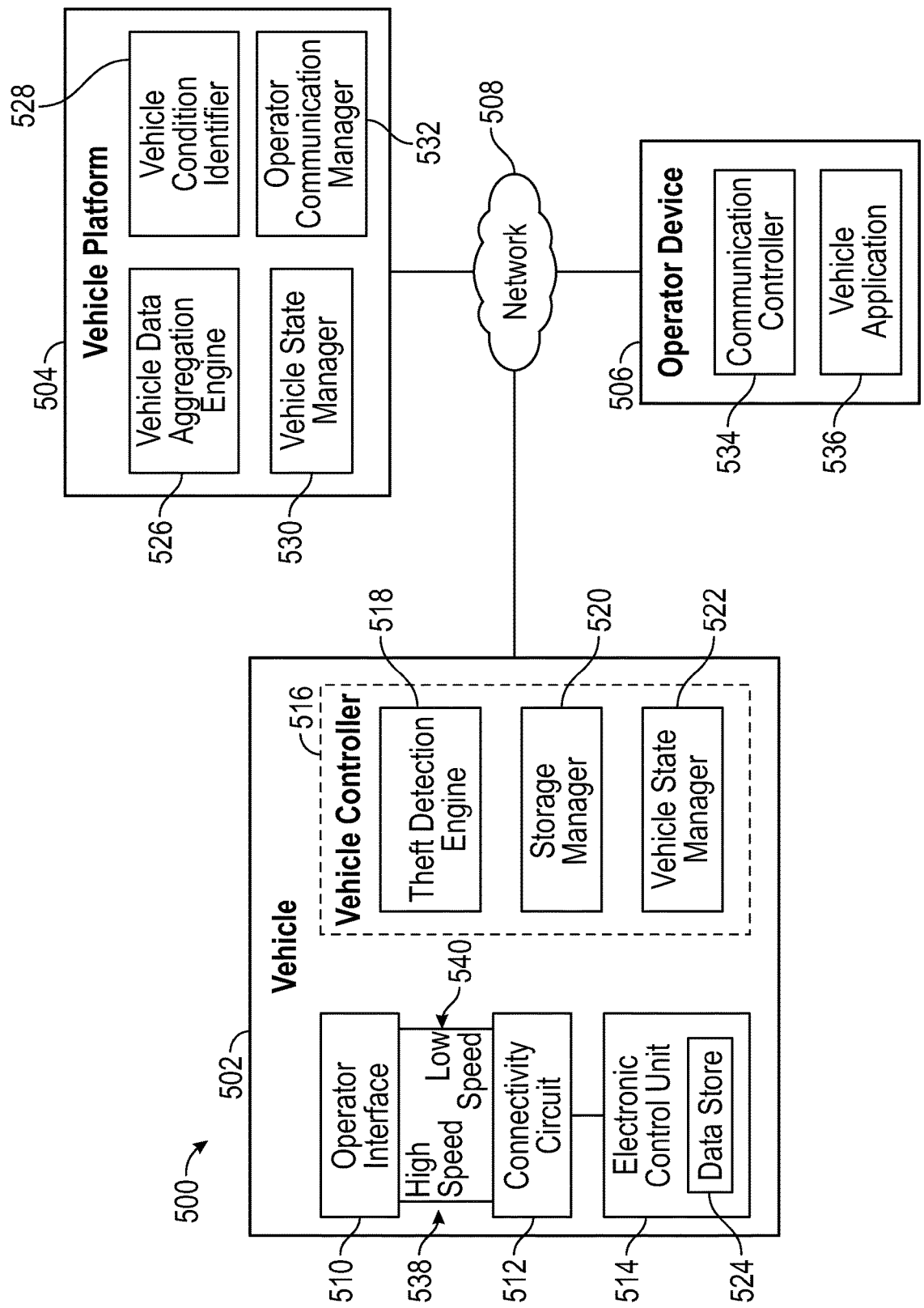
FIG. 34 illustrates an example system in which vehicle connectivity functionality according to aspects of the present disclosure may be used.

FIG. 34 illustrates an example system 500 in which vehicle connectivity functionality according to aspects of the present disclosure may be used. As illustrated, system 500 comprises vehicle 502 (e.g., vehicles 100 and/or 200), vehicle platform 504 (e.g., cloud 180), operator device 506 (e.g., remote devices 182), and network 508. In examples, vehicle 502, vehicle platform 504, and/or operator device 506 communicate via network 508, which may comprise a local area network, a peer-to-peer network, the Internet, or any of a variety of other networks. In examples, communication among vehicle 502, vehicle platform 504, and/or operator device 506 may occur using packets, via an application programming interface (API), and/or using any of a variety of electronic communications (e.g., as short message service (SMS) messages or email messages), or any combination thereof, among other examples. For example, connectivity circuit 512 may have an associated telephone number, such that vehicle platform 504 and/or operator device 506 may send SMS messages to vehicle 502 and vice versa.

For example, vehicle 502 may communicate via network 508 using connectivity circuit 512, which may be a dongle (e.g., dongle 170) or a TCU (e.g., TCU 250), among other examples. It will be appreciated that connectivity circuit 512 may be implemented as hardware, software, or any combination thereof. As illustrated, connectivity circuit 512 is connected to operator interface 510 using both high-speed connection 538 and low-speed connection 540. For example, high-speed connection 538 may be, but is not limited to, an Ethernet or BroadR-Reach connection, a fiber connection, a universal serial bus (USB) connection, and/or a wireless connection. Low-speed connection 540 may be a connection via a controller area network (CAN) bus and/or a local interconnect network (LIN), among other examples. In examples, connections 538 and/or 540 may utilize any of a variety of communication techniques, such as IP-based networking.

Connectivity circuit 512 may receive commands for remote vehicle control via network 508 (e.g., from vehicle platform 504 and/or operator device 506), such that connectivity circuit 512 may process such commands or relay commands via high-speed connection 538 and/or low-speed connection 540. For example, connectivity circuit 512 may issue a CAN command to lock or unlock vehicle 502, honk a horn of vehicle 502, and/or turn on or off lights of vehicle 502, among other examples. In some instances, connectivity circuit 512 may queue commands, such that one or more commands are handled after a vehicle enters a given operating mode.

In some examples, operator interface 510 and connectivity circuit 512 may use low-speed connection 540 for low-speed functionality, including controlling and/or obtaining vehicle control system information (e.g., engine speed, coolant temperature, and/or other vehicle health data) and/or for controller reprogramming, among other examples. For instance, connectivity circuit 512 may obtain diagnostic trouble codes associated with components of vehicle 502 via low-speed connection 540. In examples, diagnostic trouble codes may be obtained synchronously and/or asynchronously. For example, connectivity circuit 512 may determine a number of components of vehicle 502 that are accessible via low-speed connection 540. Accordingly, connectivity circuit 512 may request associated diagnostic trouble codes for each identified component, which may be provided to vehicle platform 504 according to aspects described herein (e.g., the Issue Diagnosis aspects described above with respect to FIGS. 11-14 and Appendix A). In a further example, connectivity circuit 512 may monitor for changes via low-speed connection 540 (e.g., a new active, historical, or removed diagnostic trouble code), such that an indication may be provided to vehicle platform 504 accordingly. In some instances, connectivity circuit 512 may receive an indication (e.g., via network 508) to clear active and/or historic trouble codes, such that connectivity circuit 512 may take action via connection 538 and/or 540 in response to the received indication.

High-speed connection 538 may be used for high-speed functionality, including obtaining live traffic data, streaming music, obtaining album artwork, and/or other cloud communications. For example, connectivity circuit 512 may operate as a modem or gateway for operator interface 510, whereby the connection of connectivity circuit 512 to network 508 is shared with operator interface 510 via high-speed connection 538. In examples, operator interface 510 may be configured with a passcode, for example to restrict certain functionality of operator interface 510. Accordingly, connectivity circuit 512 may obtain the passcode of operator interface 510, such that the passcode may be stored by connectivity circuit 512 and/or provided to vehicle platform 504 (e.g., where it may be associated with an operator profile). Thus, connectivity circuit 512 may synchronize a passcode of operator interface 510 with vehicle platform 504.

For example, operator interface 510 may access network 508 for mapping functionality (e.g., to search for an address, provide turn-by-turn directions, or access traffic data) or to synchronize ride or track information, among other examples. In other instances, high-speed connection 538 may be used for low-speed functionality, where, for example, operator device 506 may act as a bridge or relay to enable access of low-speed functionality via high-speed connection 538. Connectivity circuit 512 may provide an indication of wireless network information (e.g., modem transceiver status, type of service, antenna status, and/or calculated signal strength) via high-speed connection 538 and/or low-speed connection 540, such that other components of vehicle 502 may determine connectivity status of vehicle 502.

As a further example, connectivity circuit 512 may comprise a location determiner such as GPS, such that location information of vehicle 502 may similarly be provided to other components of vehicle 502 via high-speed connection 538 and/or low-speed connection 540. In examples, the frequency with which the location of vehicle 502 is determined and/or provided (e.g., via connections 538 and/or 540, to vehicle platform 504, and/or to operator device 506) may be manually configurable via vehicle 502, vehicle platform 504, and/or operator device 506. As another example, the frequency may be configurable according to other functionality of vehicle 502 and/or vehicle platform 504. For example, higher frequency location updates (referred to herein as "GPS verbose mode") may be used in instances where the location of vehicle 502 is being monitored (e.g., according to the remote vehicle locator aspects described herein) or shared with other operators, or when a theft alert has been generated, among other examples. Further, connectivity circuit 512 may maintain a set of geofences associated with vehicle 502, where an indication may be provided (e.g., to vehicle platform 504) whether a given geofence is enabled, whether vehicle 502 has entered a geofence, and whether vehicle 502 has exited a geofence, among other examples.

While system 500 is illustrated as comprising high-speed connection 538 and low-speed connection 540 between operator interface 510 and connectivity circuit 512, it will be appreciated that any of a variety of alternative or additional components may communicate using similar high-speed and/or low-speed connections. Further, connectivity circuit 512 may monitor utilization of high-speed connection 538 and/or low-speed connection 540, such that it may throttle or otherwise reduce its usage and/or usage of other components of vehicle 502 accordingly if it is determined that utilization exceeds a predetermined threshold. The predetermined threshold may be configurable by vehicle platform 504.

Vehicle 502 is further illustrated as comprising electronic control unit (ECU) 514, which includes data store 524. ECU as provided as an example component of vehicle 502 and any of a variety of ECUs may comprise a data store similar to data store 524. For example, while ECU 514 is illustrated as a separate component of vehicle 502, it will be appreciated that aspects described herein with respect to ECU 514 may be similarly applicable to operator interface 510 and/or connectivity circuit 512, among other examples. For instance, operator interface 510 may include a data store for storing maps, streaming media, vehicle and/or operator-provided media, among other examples.

ECU 514 uses data store 524 to store any of a variety of data, including, but not limited to, vehicle control system information, maps, cloud information (e.g., as may be received from vehicle platform 504) and/or operator-provided data (e.g., photos and music). Vehicle control system information that is obtained and/or stored may be configurable. For example, vehicle platform 504 may provide an indication as to what information to collect, how often the information should be collected, and/or processing that should be performed at vehicle 502 prior to transmitting information to vehicle platform 504 (e.g., as diagnostic information). For example, telematics data may be obtained or vehicle platform 504 may request specific vehicle control system information to perform an analysis of a specific vehicle, among other examples. Example information that may be provided to vehicle platform 504 includes, but is not limited to, ambient air temperature, battery voltage, fuel level, a VIN, a predicted maintenance schedule, theft alert or SOS status, cell signal strength, GPS accuracy, total number of key-on hours, and/or total number of key-on events, among other vehicle health data. In some instances, vehicle control system information may be obtained by placing one or more components of vehicle 502 into a diagnostic mode and obtaining information accordingly.

In examples, at least a part of data store 524 may be in the form of removable storage, such as a flash drive or micro-SD card, among other examples. In some instances, at least a part of data store 524 may be unused. For example, a manufacturer may select storage media having a capacity that exceeds that of the software requirements of ECU 514 and/or other components of vehicle 502 or, as another example, an operator may connect storage having unused capacity.

Accordingly, other components of vehicle 502 may utilize available space of data store 524, thereby reducing or eliminating the need for such components to include a data store. For example, connectivity circuit 512 may utilize data store 524 to store data prior to transmission to vehicle platform 504 or to cache data received from vehicle platform 504. As an example, data may be batched in data store 524 (e.g., in a rolling buffer or as one or more log files), after which the data may be transmitted to vehicle platform 504. The data may be transmitted in response to a trigger (e.g., as may be identified by connectivity circuit 512), which may be remotely configurable by vehicle platform 504. For instance, when a trigger is identified, a predetermined amount of data prior to trigger identification and/or a predetermined amount of data after trigger identification may be transmitted to vehicle platform 504.

In some instances, at least a part of the data may be processed prior to transmission to vehicle platform 504, for example using compression techniques, to generate a histogram, or to perform any of a variety of statistical analyses (e.g., determining a last, first, counter, min, max, average, or median value). In examples, a trigger may be dependent on such analyses, for example based on identification of a signal value, a minimum value, a maximum value, an average value, the presence of a diagnostic trouble code, and/or a specific SPN/FMI/SA combination of a fault, among other examples.

Vehicle controller 516, which may be similar to vehicle controller 140 discussed above with respect to FIGS. 1-5, is illustrated as comprising storage manager 520, which may identify available space of data store 524 and enable other components of vehicle 502 to store data using the available space of data store 524 accordingly.

For example, storage manager 520 may receive an indication of data to store, in response to which it may determine whether there is available space in data store 524. As used herein, available space need not be unused capacity, but may include capacity that is currently used by data that can be moved, compressed, purged, or otherwise processed to make at least a part of the capacity of data store 524 available to store additional data. For example, cached data of data store 524 may be removed or map data of data store 524 may be compressed (e.g., based on determining vehicle 502 is not proximate to a geographic location associated with the map data or based on determining the map data has not been used recently). Accordingly, if there is available space, storage manager 520 may cause the data to be stored by data store 524.

As another example, data store 524 may comprise a rolling buffer in which a predetermined amount of data is stored (e.g., having a predetermined size or associated with a predetermined amount of time). Thus, the rolling buffer may be determined to have available storage, such that, for example, the oldest data may be overwritten or otherwise deleted and replaced with more recent data. As a further example, data may be stored using a variable amount of granularity, such that redundant information or information having greater verbosity is omitted (e.g., from new data or data that is already stored) in instances where available storage space is below a predetermined threshold.

However, in instances where there is not available space in data store 524, the data may be stored elsewhere. For example, connectivity circuit 512 may prefer to store data in data store 524 but can use a data store of connectivity circuit 512 (not pictured) if storage is not available in data store 524. In other examples, the data may not be stored. For example, connectivity circuit 512 may obtain vehicle control system information and may store the vehicle control system information as diagnostic information in data store 524 if storage is available. If storage is not available, none of or only a part of such diagnostic information may be available.

As another example, an operator profile may be obtained (e.g., from vehicle platform 504 or operator device 506) and stored according to aspects described herein. Accordingly, at least a part of the operator profile may be purged as needed in order to make additional space available. For example, at least a part of the operator profile may be replaced with a reference to remotely stored data. In instances where the operator profile is not in use (e.g., another operator profile is in use), the operator profile may be deleted such that it may be re-downloaded at a later time if necessary.

While system 500 is described in an example where storage manager 520 is part of vehicle controller 516, it will be appreciated that similar aspects may be implemented additionally or alternatively by any of a variety of other components of vehicle 502. For example, connectivity circuit 512 may implement such aspects for utilizing available storage of operator interface 510. Further, while examples herein are described with respect to a single data store, it will be appreciated that any number of data stores may be used and a data store with which to store data may be selected according to any of a variety of criteria (e.g., based on available space, latency, and/or usage patterns).

Vehicle controller 516 is illustrated as further comprising theft detection engine 518. In examples, theft detection engine 518 evaluates any of a variety of information to determine whether theft of vehicle 502 is occurring. For example, theft detection engine 518 may process data from one or more sensors of vehicle 502 (e.g., sensors 126 discussed above with respect to FIGS. 1-4), data associated with operator device 506 (e.g., proximity of operator device 506 to vehicle 502 or whether an operator of operator device 506 is authorized to use or tow vehicle 502), and/or data associated with vehicle platform 504. In some instances, theft detection engine 518 may determine whether operator device 506 is connected to vehicle 502 and/or a signal strength associated with the connection (e.g., communication controller 534 and connectivity circuit 512 may be directly or indirectly connected). As another example, theft detection engine 518 may provide information to vehicle platform 504 (e.g., via connectivity circuit 512) and may receive condition information in response, for example to configure the sensitivity of theft detection engine 518 or to suppress a theft alert that would otherwise be a false positive. Such aspects are discussed in more detail below with respect to vehicle platform 504.

While theft detection engine 518 is described in the context of vehicle theft, it will be appreciated that, in other examples, theft detection engine 518 may identify any of a variety of additional or alternative conditions, such as a vehicle break-in, theft of a vehicle component (e.g., removal of connectivity circuit 512), instances of vehicle tampering (e.g., wheel removal, keying of body work, someone sitting in a vehicle seat), an accident, or a fire. For example, the above-described aspect may be similar to those illustrated in FIG. 26, where a location of a vehicle is analyzed with respect to a geofence to determine whether the vehicle has breached the geofence, such that a notification may be generated and provided to an operator device accordingly.

For example, when theft detection engine 518 identifies a condition, alerts are disabled, vehicle location monitoring is enabled, and vehicle 502 is located within a geofence, an updated location of vehicle 502 may be provided to vehicle platform 504. In instances where theft detection engine 518 identifies a condition, alerts are enabled, vehicle location monitoring is enabled, and vehicle 502 is located outside of a geofence, an alert may be generated as described herein, an updated location may be provided to vehicle platform 504, and the location of vehicle 502 may be updated in accordance with the GPS verbose mode described above. Finally, if, while in GPS verbose mode, it is determined that the location of vehicle 502 is within the geofence and/or alerts have been disabled, location updating may return to normal (e.g., rather than GPS verbose mode). It will be appreciated that the above conditions and associated actions are provided as examples and, in other examples, additional, fewer, or alternative conditions and/or actions may be used.

Vehicle state manager 522 of vehicle controller 516 may manage the state of vehicle 502, thereby providing various operating modes. Example operating modes include, but are not limited to, a full connectivity operating mode, a limited connectivity operating mode, and a no connectivity operating mode. For example, in the full connectivity operating mode, vehicle state manager 522 may configure vehicle 502 to maintain a connection to network 508 (e.g., via connectivity circuit 512) and to engage in communication with vehicle platform 504. Accordingly, vehicle 502 may be reachable on an adhoc basis by operator device 506 and/or any of a variety of other remote devices.

By contrast, in the limited connectivity operating mode, vehicle 502 may be configured to periodically operate a connection with network 508, for example according to a predetermined schedule, or based on current and/or historical interactions between vehicle 502 and operator device 506. Finally, in the no connectivity operating mode, vehicle 502 may be configured to remain disconnected (e.g., connectivity circuit 512 may be disabled) and one or more other components of vehicle 502 may similarly be disabled.

In examples, vehicle 502 transitions between operating modes depending on a state of charge of one or more batteries of vehicle 502 (e.g., battery 128 in FIGS. 1-4). For example, there may be a need to manage battery power draw of power sports vehicles, due to their batteries being relatively limited as compared to other vehicles. Further, duty cycles for power sports vehicles may be relatively low (e.g., a vehicle may be used once every few weeks).

Vehicle state manager 522 may determine a state of charge according to a voltage of the battery or any of a variety of other techniques may alternatively or additionally be used. In some instances, the determined state of charge may be made available to any of a variety of vehicle components, for example via a connection similar to connection 538 and/or 540 discussed above. Accordingly, if the state of charge is below a first predetermined threshold, vehicle 502 may transition from the full connectivity operating mode to the limited connectivity operating mode. Similarly, if the state of charge is below a second predetermined threshold, vehicle 502 may transition from the limited connectivity operating mode to the no connectivity operating mode. Such transitions may similarly occur in reverse as a result of an increasing state of charge of the battery or, as another example, a first set of thresholds may be used for battery discharging while a second set of thresholds may be used for battery charging. An example of such operating modes and associated thresholds based on a vehicle's state of charge is illustrated in FIG. 33.

Transitions may occur based on any of a variety of other events or conditions. For example, vehicle 502 may transition to a different operating state in response to an indication received from vehicle platform 504. As another example, a condition identified by theft detection engine 518 may cause vehicle 502 to be configured according to a limited or full connectivity operating mode from a no connectivity operating mode, thereby enabling communication with vehicle platform 504 and/or operator device 506. Notifications may be presented to an operator of vehicle 502 (e.g., via operator interface 510 and/or operator device 5060) when vehicle 502 transitions between operating modes. In such instances, vehicle 502 may deactivate the connection if a subsequent condition is not determined within a predetermined amount of time. As another example, connectivity may be reestablished after a predetermined amount of time in the limited connectivity or no connectivity operating state, such that the sensitivity of theft detection engine 518 may be periodically reconfigured by vehicle platform 504 or other condition information may be received, among other examples.

Accordingly, vehicle state manager 522 may configure vehicle 502 to balance functionality and state of charge. For example, vehicle 502 may have a minimum threshold below which a prime mover (e.g., prime mover 112 in FIGS. 1-4) is inoperable (e.g., the battery may not have enough current to crank an engine or to enable an electric motor to generate sufficient torque). Such operating modes may conserve the state of charge of the battery such that vehicle 502 does not reach the threshold or reaches the threshold more slowly. Such transition points may be vehicle-specific, based on battery capacity, and/or alternator capability, among other examples. It will be appreciated that the above operating modes and associated functionality are provided as examples and, in other examples, any of a variety of additional and/or alternative functionalities may be associated with such operating modes. As a further example, conservation need not be limited to state of charge and any of a variety of alternative or additional resources may be conserved according to aspects described herein. For example, full connectivity, limited connectivity, and no connectivity operating modes may be used according to a signal strength of connectivity circuit 512.

Further, vehicle state manager 522 may configure vehicle 502 according to additional or alternative operating modes. In examples, the full, limited, and no connectivity operating modes may form a start guarantee operating mode, whereby resources of vehicle 502 are conserved so as to ensure vehicle 502 is able to start at a later time. As another example, a shipping operating mode may enable periodic connectivity via connectivity circuit 512 and communication with vehicle platform 504, for example to provide a location update and other shipping information. An operator connectivity mode may configure vehicle 502 to enable communication with operator devices, such as a fob or operator device 506 (e.g., to lock doors or to open a trunk). The operator connectivity mode may further enable visual or audio feedback of vehicle 502, for example flashing lights and/or via a horn. An off-season storage mode may configure vehicle 502 to conserve state of charge (e.g., similar to the low connectivity or no connectivity operating modes) and/or operate various components according to weather or other conditions. An accessory operating mode may enable use of various accessories (not pictured) of vehicle 502, for example as may be built-in or as may be connected to vehicle 502.

An over-the-air (OTA) operating mode may configure vehicle 502 to periodically contact vehicle platform 504 to check for updates associated with one or more components of vehicle 502 (e.g., operator interface 510, connectivity circuit 512, electronic control unit 514, or vehicle controller 516). As another example, the OTA operating mode may be used to restore software of vehicle 502, for example when a software issue has been encountered by vehicle controller 516. In examples, software updates to components of vehicle 502 may occur using a cellular communication device or a Wi-Fi connection (e.g., as may be provided by a connectivity circuit), or via a wired connection (e.g., via a CAN bus connection, a serial connection, or an Ethernet connection). Further, updates to some components (e.g., to an IVI or an operator interface) may occur via a high-speed connection, while other updates (e.g., to an engine control module or a vehicle control module) may occur via a low-speed connection. Connectivity circuit 512 may receive update files and/or other information from vehicle platform 504, which may be stored and used to flash components of vehicle 502 according to update urgency and/or operator permissions, among other examples. For example, an operator may indicate that only critical updates should be installed automatically or an update may have an urgency indicating that the update should be installed as soon as possible or within a given time period, among other examples.

A warehouse operating mode may configure vehicle 502 to operate in a state of reduced functionality, for example where vehicle 502 can start and drive. Speed and/or energy output of a prime mover may be limited (e.g., below a predetermined RPM threshold or a predetermined torque threshold). In the warehouse operating mode, accessories (e.g., an IVI or media playback associated therewith) may be disabled. As another examples, one or more lights of vehicle 502 may be disabled or may operate at reduced brightness.

Vehicle state manager 522 may configure vehicle 502 according to a lockout operating mode. For example, vehicle state manager 522 may enable anti-theft functionality (e.g., as described herein with respect to theft detection engine 518) when the lockout operating mode is in an "enabled" state. The lockout operating mode may further have a "disabled" state, where such anti-theft functionality is disabled. As a further example, the lockout operating mode may have an "unlocked" state, where anti-theft functionality is temporarily unlocked (e.g., for a predetermined amount of time or until a key-off event).

While example modes and associated functionality are described herein, it will be appreciated that any of a variety of other operating modes may be implemented by vehicle state manager 522 and alternative or additional functionality may be associated therewith. Other example functionalities include, but are not limited to, control of a heating, ventilation, and air conditioning (HVAC) system, heated seats, and/or configuring various features of other vehicle components. In some instances, vehicle state manager 522 receive an indication of a subscription status from vehicle platform 504, such that operating modes and/or associated functionality of vehicle 502 may be configured accordingly. For example, the set of available operating modes may change based on an operator's subscription status (e.g., subscription tier and/or whether the subscription is current).

Operating modes of vehicle 502 may be pre-configured and/or may be configured by vehicle platform 504, among other examples. For example, vehicle platform 504 may add, remove, or update operating modes of vehicle 502 based on historical state of charge data for vehicle 502 and/or a set of other vehicles, based on a make or model, or based on a geographic location, among other information. In some instances, operator device 506 may be used to configure operating modes of vehicle 502 (e.g., via vehicle platform 504 or based on communication with vehicle 502). For example, configuring an operating mode may comprise specifying a threshold or alternative or additional conditions (e.g., relating to any of a variety of health data) under which vehicle state manager 522 may configure vehicle 502 according to the operating mode. As another example, configuring an operating mode may comprise specifying functionality that is available under the operating mode, such as which components are active or a frequency with which such components are active, among other examples. It will be appreciated that operating modes need not be mutually exclusive. For example a vehicle may be in both an operator connectivity mode and a start guarantee operating mode.

As illustrated, vehicle platform 504 comprises vehicle data aggregation engine 526, vehicle condition identifier 528, vehicle state manager 530, and operator communication manager 532. In examples, vehicle data aggregation engine 526 obtains sensor data from vehicle 502 (e.g., as may be generated by theft detection engine 518 based on sensors of vehicle 502). As another example, vehicle data aggregation engine 526 obtains state of charge data from vehicle 502 (e.g., as may be generated by vehicle state manager 522). Such data may be communicated by vehicle 502 using connectivity circuit 512 and may be stored by any of a variety of components of vehicle 502, for example using the techniques described above with respect to storage manager 520 and data store 524. Vehicle data aggregation engine 526 may obtain and aggregated data from any number of vehicles. For example, vehicle data aggregation engine 526 may categorize obtained data according to a make or model of the vehicle or based on a geographic location, among other examples.

In examples, vehicle condition identifier 528 processes sensor data obtained by vehicle data aggregation engine 526 to identify one or more conditions associated with a set of vehicles. For example, vehicle condition identifier 528 may process sensor data from a set of vehicles having a similar geographic location or the same operator to determine whether the set of vehicles is experiencing a condition or whether a condition is confined to only an individual vehicle of the set of vehicles. As another example, a predetermined threshold (e.g., a number or percentage of affected vehicles) may be used, where a condition above the predetermined threshold is determined to be a group condition, while a condition below the predetermined threshold is determined to be an individual condition. The processing may incorporate additional data in addition to the aggregated vehicle data, for example based on weather data, map data (e.g., proximity to geological and/or man-made features), traffic data, or news data.

Vehicle condition identifier 528 may perform one or more actions based on an identified condition. For example, vehicle condition identifier 528 may provide an indication to vehicle 502 (e.g., for processing by theft detection engine 518) and/or to operator device 506 (e.g., via operator communication manager 532, to cause vehicle application 536 to present a notification to an operator accordingly). As an example, vehicle condition identifier 528 may configure a sensitivity of theft detection engine 518 to reduce the likelihood of a false positive theft alarm. As another example, vehicle condition identifier 528 may indicate to theft detection engine 518 that a theft alarm should be generated.

In some instances, an action may be performed if a group condition is identified (e.g., that sensor data of multiple vehicles has increased, which may indicate a fire) or if an individual condition is identified (e.g., only one vehicle is moving or experiencing vibrations, based on ambient sound, and/or based on ambient temperature). As a further example, a group condition indicating vibration (e.g., as a result of proximity to train tracks or resulting from weather conditions) may be used to decrease the sensitivity of the theft detection engines of multiple vehicles (e.g., exhibiting the group condition and/or associated with a geographic location), at least temporarily.

In examples, vehicle condition identifier 528 may process data associated with operator device 506 when identifying a condition (e.g., as may be obtained by operator communication manager 532). For example, a geographic location of operator device 506 may be obtained from operator device 506. The geographic location may be compared to a geographic location of vehicle 502 to determine whether operator device 506 is proximate to vehicle 502. If it is determined that vehicle 502 is moving while operator device 506 is not proximate, theft detection engine 518 may generate a theft alarm accordingly. In some instances, vehicle condition identifier 528 may process a geographic location (e.g., of vehicle 502 and/or operator device 506) to determine whether the geographic location is associated with a road, highway, or trail. As another example, a speed for vehicle 502 and/or operator device 506 may be determined. In some instances, another operator device may be evaluated, as may be the case when an operator of vehicle 502 designates another operator (and an associated operator device, not pictured) as an allowed operator. Thus, it will be appreciated that any of a variety of information associated with vehicle 502 and/or operator device 506 may be used to identify a condition and generate an action accordingly.

Vehicle platform 504 further comprises vehicle state manager 530, which may manage operating modes of vehicle 502 (e.g., as described above with respect to vehicle state manager 522). In examples, vehicle state manager 530 may process state of charge data from vehicle 502 and/or other vehicles to configure one or more operating modes accordingly. For instance, a vehicle state manager 530 may change one or more thresholds of a start guarantee operating mode according to the make or model of vehicle 502, or based on an analysis of the vehicle's state of charge in relation to an aggregated state of charge (e.g., as may be aggregated by vehicle data aggregation engine 526). For example, a model may be used to determine that the battery of vehicle 502 has aged or is underperforming, such that one or more different thresholds may be set to compensate accordingly.

As another example, vehicle state manager 530 may receive an indication from vehicle 502 that vehicle 502 has transitioned from one state to another, such that an indication may be generated for presentation to an operator by vehicle application 536 (e.g., via operator communication manager 532). Thus, operator communication manager 532 of vehicle platform 504 may communicate with vehicle application 536 of operator device 506 and/or relay communications between vehicle 502 and operator device 506 accordingly.

Operator device 506 is illustrated as comprising communication controller 534 and vehicle application 536. In examples, communication controller 534 communicates with vehicle 502 and/or vehicle platform 504 via network 508, for example using one or more wired and/or wireless communication technologies. As another example, communications need not be via network 508, but may instead be direct. For instances, communication controller 534 may comprise a Bluetooth and/or Wi-Fi radio that communicates directly with a corresponding radio of vehicle 502 (e.g., connectivity circuit 512). In examples, rather than using a connection to network 508 of operator device 506, aspects described herein enable components of vehicle 502 to use connectivity circuit 512 to communicate via network 508 accordingly. Thus, operator device 506 need not operate as a modem or gateway for vehicle 502. Further, a connection to network 508 of connectivity circuit 512 may be shared with operator device 506. As another example, a Wi-Fi network provided by connectivity circuit 512 may enable cross-device communication among a set of operator devices. It will be appreciated that communication controller 534 and connectivity circuit 512 may each implement any of a variety of additional or alternative communication technologies, including, but not limited to, an ultra-wideband (UWB) or near field communication (NFC), among other examples.

Vehicle application 536 may generate notifications (e.g., associated with vehicle state changes and/or theft alerts) and may provide an indication as to a geographic location (e.g., based on GPS and/or A-GPS) to vehicle 502 and/or vehicle platform 504. As another example, vehicle application 536 may be used to indicate another operator and an associated operator device that is an allowed operator of vehicle 502. In some instances, vehicle application 536 may be used by an operator of vehicle 502 to configure operating modes of vehicle 502, for example configuring one or more predetermined thresholds, conditions, and/or associated functionality, among other examples.

Figure 35A:
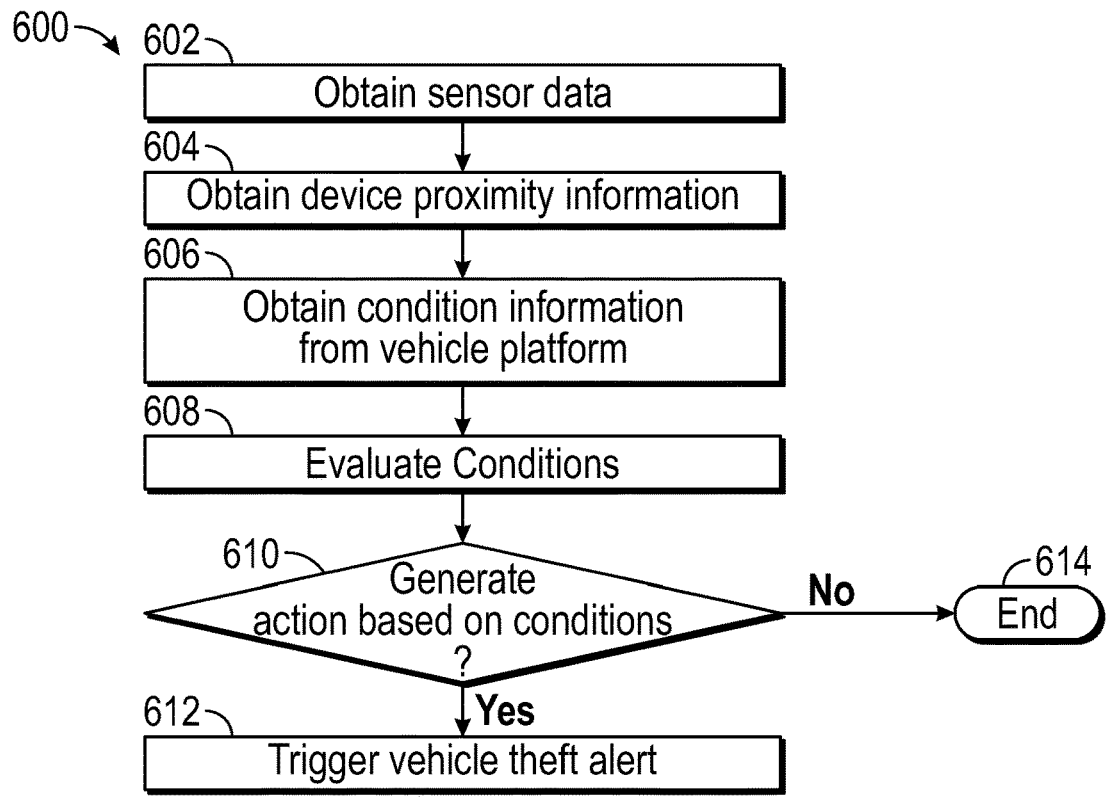
FIG. 35A illustrates an overview of an example method for processing condition information from a vehicle platform for vehicle theft alerts according to aspects described herein.

FIG. 35A illustrates an overview of an example method 600 for processing condition information from a vehicle platform for vehicle theft alerts according to aspects described herein. In examples, aspects of method 600 may be performed by a vehicle theft detection engine, such as vehicle theft detection engine 518 of vehicle 502 discussed above with respect to FIG. 34.

Method 600 starts at operation 602, where sensor data is obtained. For example, the sensor data may be obtained from one or more sensors of the vehicle, such as sensors 126 discussed above with respect to FIGS. 1-4.

At operation 604, device proximity information is obtained. The device proximity information may be associated with an operator device, such as operator device 506 discussed above with respect to FIG. 34. For example, the device proximity information may comprise one or more signal strengths associated with the device, such as a signal strength associated with a Wi-Fi and/or Bluetooth connection. As another example, the device proximity information may comprise a position of the device. In some instances, the device proximity information may be obtained from the device or, as another example, may be obtained from a vehicle platform, such as vehicle platform 504.

Flow progresses to operation 606, where condition information is obtained from a vehicle platform. In examples, the condition information may comprise an indication of an identified group condition or individual condition, a configuration for sensitivity of the vehicle theft detection engine, and/or an indication of an action (e.g., as may be generated by a vehicle condition identifier, such as vehicle condition identifier 528 in FIG. 34). In examples where the proximity information discussed above with respect to operation 604 is obtained from a vehicle platform, the proximity information may be obtained as part of the condition information that is obtained at operation 606. Thus, it will be appreciated that any of a variety of condition information may be obtained from the vehicle platform at operation 606.

Flow progresses to operation 608, where conditions are evaluated. For example, the sensor data may be evaluated in view of one or more thresholds (e.g., the sensitivity of which may have been configured based on the condition information received at operation 606). In other examples, the evaluation may comprise evaluating a condition indicated by the vehicle platform in relation to sensor data to determine whether the sensor data is indicative of the condition or should be ignored as the result of the condition, or whether an alert should be generated even in view of the condition. In some instances, operation 608 comprises evaluating device proximity information, for example a geographic location of the device in relation to a geographic location of the vehicle or determining whether a signal strength associated with the device indicates the operator associated with the device is operating the vehicle. Operation 608 may alternatively or additionally comprise evaluating a geographic location of the vehicle with respect to map and/or terrain information to determine whether the vehicle is on a road or highway.

Thus, the evaluation at operation 608 may determine that sensor data is indicative of vehicle theft or a break-in, that sensor data is associated with a geographic location, an individual condition, and/or a group condition (such that it may be ignored or acted upon accordingly), whether a device (e.g., associated with an owner or an authorized operator) is proximate, and whether the vehicle is on a road or highway, among other examples. In some instances, conditions evaluated at operation 608 may be weighted. For example, proximity of an operator device based on signal strength or received from a vehicle platform may receive a high ranking, while a determining that the vehicle is on a road or highway may receive a low ranking depending on GPS location accuracy. Thus, additional system inputs may be utilized to further increase confidence that an alarm should not be generated (e.g., as may be the case when the vehicle is being towed, as shown in FIG. 32). Other such system inputs include evaluating a vehicle and/or user's speed (to determine if a vehicle is being used), evaluating if the operator device is connected to a car's operator interface (to determine if a vehicle is being used), and evaluating if the vehicle and user's phone is on a track which is a road or highway.

It will be appreciated that an operator device may be any of a variety of devices, such as a mobile computing device or a wearable computing device, including a smartwatch or a helmet. Additional examples of such aspects are described in disclosed in U.S. patent application Ser. No. 16/668,980, filed Oct. 30, 2019, titled CONNECTED HELMET SYSTEM AND METHOD OF OPERATING THE SAME, the entire disclosure of which is expressly incorporated by reference herein.

The systems and methods disclosed herein may be incorporated with or supplemented by the systems and methods of any one of the following applications or patents: US Published Patent Application No. US20200198467A1, titled MANAGING RECREATIONAL VEHICLES AND ACCESSORIES; US Published Patent Application No. US20200145815A1, titled CONNECTED HELMET SYSTEM AND METHOD OF OPERATING THE SAME; U.S. patent application Ser. No. 17/234,501, titled SYSTEMS AND METHODS FOR COMMUNICATING INFORMATION; U.S. patent application Ser. No. 16/234,162, titled RECREATIONAL VEHICLE INTERACTIVE TELEMETRY, MAPPING AND TRIP PLANNING SYSTEM; U.S. patent application Ser. No. 17/325,062, titled SYSTEMS AND METHODS OF ADJUSTABLE SUSPENSIONS FOR OFF-ROAD RECREATIONAL VEHICLES; U.S. patent application Ser. No. 16/401,933, titled OPERATING MODES USING A BRAKING SYSTEM FOR AN ALL TERRAIN VEHICLE; U.S. patent application Ser. No. 17/235,322, titled SYSTEMS AND METHODS FOR OPERATING AN ALL-TERRAIN VEHICLE; U.S. patent application Ser. No. 16/838,602, titled DIAGNOSTIC SYSTEMS AND METHODS OF A CONTINUOUSLY VARIABLE TRANSMISSION; U.S. patent application Ser. No. 17/241,559, titled SYSTEM AND METHOD FOR DYNAMIC ROUTING; U.S. patent application Ser. No. 15/836,223, titled DEVICE AND METHOD FOR SUPERVISING AND MODIFYING VEHICLE OPERATION; U.S. patent application Ser. No. 17/158,539, titled ADJUSTABLE PERFORMANCE FOR A VEHICLE; U.S. patent application Ser. No. 17/175,888, titled VEHICLE HAVING ADJUSTABLE COMPRESSION AND REBOUND DAMPING; U.S. patent application Ser. No. 17/100,451, titled VEHICLE HAVING SUSPENSION WITH CONTINUOUS DAMPING CONTROL; U.S. patent application Ser. No. 17/176,110, titled ADJUSTABLE VEHICLE SUSPENSION SYSTEM; and U.S. patent application Ser. No. 15/816,368, titled VEHICLE HAVING ADJUSTABLE SUSPENSION.

At determination 610, it is determined whether to generate an action based on the evaluation performed at operation 608. If it is determined not to perform an action, flow branches "NO" and ends at operation 614. If, however, it is determined to perform an action, flow instead branches "YES" to operation 612, where a vehicle theft alert is triggered. In examples, operation 612 comprises activating lights and/or a horn of the vehicle, providing an indication to the vehicle platform, and/or providing an indication to an operator device, among other examples.

While method 600 is described in the context of a vehicle theft alert, it will be appreciated that similar techniques may be used to provide any of a variety of additional or alternative alerts, including a break-in alert or a fire alert, among other examples. Similarly, it will be appreciated that one or more operations may be omitted in some instances. For example, operation 606 need not be performed at each iteration of method 600, such that operation 606 may be performed to periodically configure vehicle sensitivity or may be performed depending on obtained sensor data, such that it is determined whether a group condition is present when sensor data indicates a condition at the vehicle. Method 600 terminates at operation 612. Further, a vehicle platform need not be used in other examples. For example, the above aspects be performed by a vehicle based on information received from an operator device and/or information received from one or more other vehicles.

Figure 35B:
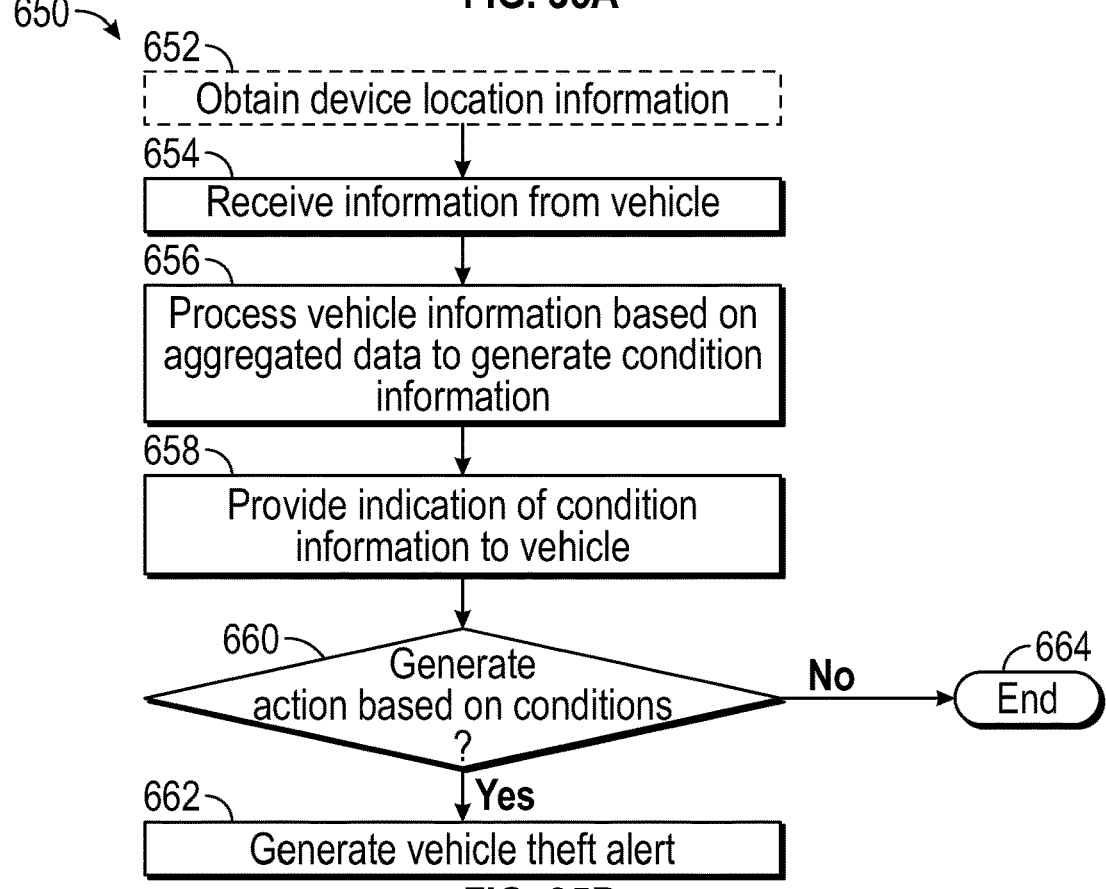
FIG. 35B illustrates an overview of an example method for aggregating information for vehicle condition processing according to aspects described herein.

FIG. 35B illustrates an overview of an example method 650 for aggregating information for vehicle condition processing according to aspects described herein. In examples, aspects of method 650 may be performed by a vehicle condition identifier of a vehicle platform, such as vehicle condition identifier 528 of vehicle platform 504 in FIG. 34.

Method 650 may begin at operation 652, where device location information is obtained. For example, device information may be received from a vehicle application of an operator device, such as vehicle application 536 of operator device 506. The device location information may comprise a geographic location of the device. While examples are described herein with respect to geographic location (e.g., of a device and vehicle), it will be appreciated that other device location information may be used to determine such geographic locations or relative proximity, such as Wi-Fi or cellular signal strengths, among other examples. Operation 652 is illustrated using a dashed box to indicate that, in some examples, operation 652 may be omitted such that method 650 starts at operation 654. For example, a vehicle may determine device location information or may obtain device location information by communicating with the device, such that it need not be obtained be a vehicle platform.

At operation 654, information is received from a vehicle. For example, the information comprises sensor data and/or vehicle control system information, as may be generated by one or more vibration sensors, temperature sensors, and/or microphones of a vehicle (e.g., vehicle 100 or 200 in FIGS. 1-4 or vehicle 502 in FIG. 34). The information may be received by a vehicle data aggregation engine, such as vehicle data aggregation engine 526.

Flow progresses to operation 656, where the received vehicle information is processed based on aggregated data to generate condition information. For example, the aggregated data may have been received by the vehicle data aggregation engine contemporaneously or at an earlier point in time. In some instances, the aggregated data may be obtained from a data store of a vehicle platform. The vehicle information may be processed using one or more models associated with the aggregated data, for example a statistical model and/or a machine learning model. In examples, the aggregated data or a model based thereon may be associated with one or more characteristics the same as or similar to the vehicle from which the vehicle information was received. For example, aggregated data for a make, model, or geographic location may be used to generate a model with which the received vehicle information is processed. The processing may incorporate additional data in addition to the aggregated vehicle data, for example based on weather data, map data (e.g., proximity to geological and/or man-made features), traffic data, or news data. Further, in addition or as an alternative to the above-discussed models, a set of rules or any of a variety of other processing techniques may be used.

In examples where a statistical model is used, the vehicle information and/or a model processing result may be evaluated according to any of a variety of descriptive statistics, such as a mean or standard deviation associated with the vehicle information as compared to that of the aggregated data. If the vehicle information is different from the aggregated data with respect to a predetermined threshold or outside of a predetermined range, for example, a condition may be identified. As another example, a trained classifier (e.g., as may have been trained according to the aggregated data) may be used to process the vehicle information and classify an condition associated therewith.

Accordingly, at operation 658, an indication of the generated condition information may be provided to the vehicle. In examples, the indication comprises an indication of an individual condition, a group condition, or an indication to configure the sensitivity of a vehicle theft detection engine, among other examples.

Flow progresses to determination 660, where it is determined whether to generate an action based on the condition information generated at operation 656. For example, if a descriptive statistic is determined to exceed a predetermined threshold or is outside of a predetermined range, it may be determined to generate an action. As another example, if a trained classifier identifies a condition, an action may be generated. In examples, aspects of determination 660 are operator-configurable or may similarly be associated with a make, model, or geographic location, among other examples.

If it is determined not to generate an action, flow branches "NO" and ends at operation 664. If, however, it is determined to generate an action, flow instead branches "YES" to operation 662, where a vehicle theft alert is generated. For example, an indication may be provided to an operator device, such that the operator device may generate a notification for presentation to an operator. In other examples, authorities may be notified or other vehicles associated with the vehicle from which the vehicle information was received may receive an indication of the identified condition. Method 650 terminates at operation 662.

Figure 36A:
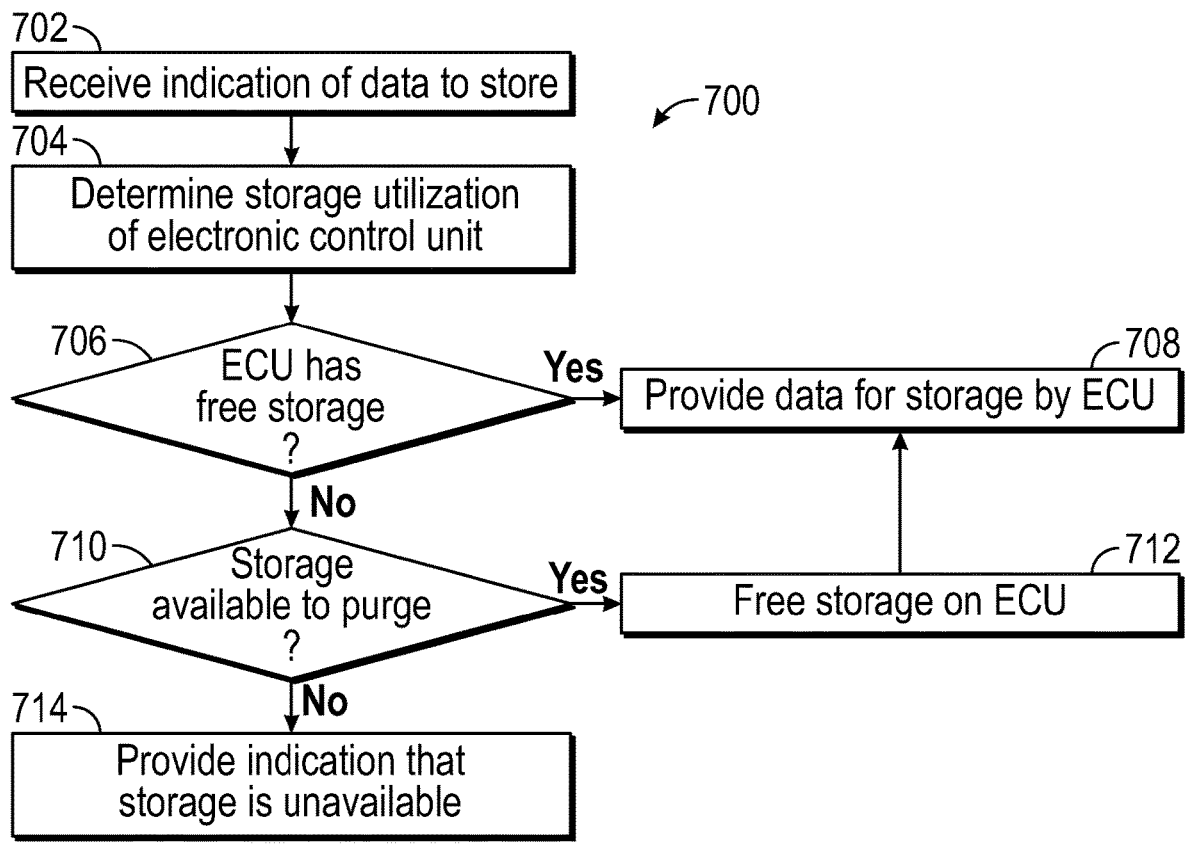
FIG. 36A illustrates an overview of an example method for utilizing available storage space of an electronic control unit of a vehicle.

FIG. 36A illustrates an overview of an example method 700 for utilizing available storage space of an electronic control unit of a vehicle. In examples, aspects of method 700 are performed by a storage manager, such as storage manager 520 discussed above with respect to FIG. 34.

Method 700 begins at operation 702, where an indication is received of data to store. In examples, the indication comprises the data to store or may comprise an amount and/or type of data (e.g., operator data or diagnostic data) to store, among other examples. The indication may be received from another ECU (e.g., connectivity circuit 512) or such aspects may be performed by a control unit itself (e.g., vehicle controller 516).

At operation 704, the storage utilization of an ECU is determined. For example, operation 704 may comprise accessing a data store of the ECU (e.g., data store 524) to determine the storage utilization or requesting available capacity from the ECU, among other examples. In some instances, operation 704 comprises selecting an ECU from a set of available ECUs of a vehicle. For example, available ECUs may be ranked according to available storage, latency, or variability in storage availability, or an ECU may be selected based on a type of data to be stored, among other examples.

At determination 706, it is determined whether the ECU has sufficient free capacity with which to store the data. Accordingly, if it is determined that the ECU has sufficient capacity, flow branches "YES" to operation 708, where the data is provided for storage by the ECU. In examples where the indication received at operation 702 comprises the data to store, operation 708 may comprise storing the data in the ECU. As another example, operation 708 may comprise providing an indication in response to the indication that was received at operation 702, such that the ECU from which the indication was received may transmit data for storage to the ECU at which the storage was identified. Thus, it will be appreciated that any of a variety of techniques may be used to store data at an ECU having free or otherwise available storage.

If, however, it is determined that the ECU does not have sufficient free capacity with which to store the data, flow progresses to operation 710, where it is determined whether the ECU has storage available, for example if data is moved, compressed, purged, or otherwise processed to make at least a part of the capacity available to store additional data. In examples, the utilization determined at operation 704 may indicate storage utilization according to various types of utilization (e.g., un-purgable, purgable, and/or compressible). In other examples, determination 710 may comprise evaluating the data store or requesting additional information from the ECU associated with the data store, among other examples.

If it is determined that there is storage available to purge (or otherwise process according to aspects described herein), flow branches "YES" to operation 712, where storage is freed on the ECU, for example performing one or more of the processing operations described herein. Accordingly, flow progresses to operation 708 where data is stored by the ECU as described above and flow terminates.

If, however, it is determined that there is not storage available to purge, flow instead branches "NO" to operation 714, where an indication is provided that storage is unavailable. In some instances, another iteration of method 700 may be performed with respect to another ECU and/or another data store (e.g., in instances where an ECU has multiple data stores), such that a different location to store the data may be identified. In some instances, the indication may cause the data to not be stored as described above, for example as may be the case with diagnostic information. Method 700 terminates at operation 714.

Figure 36B:
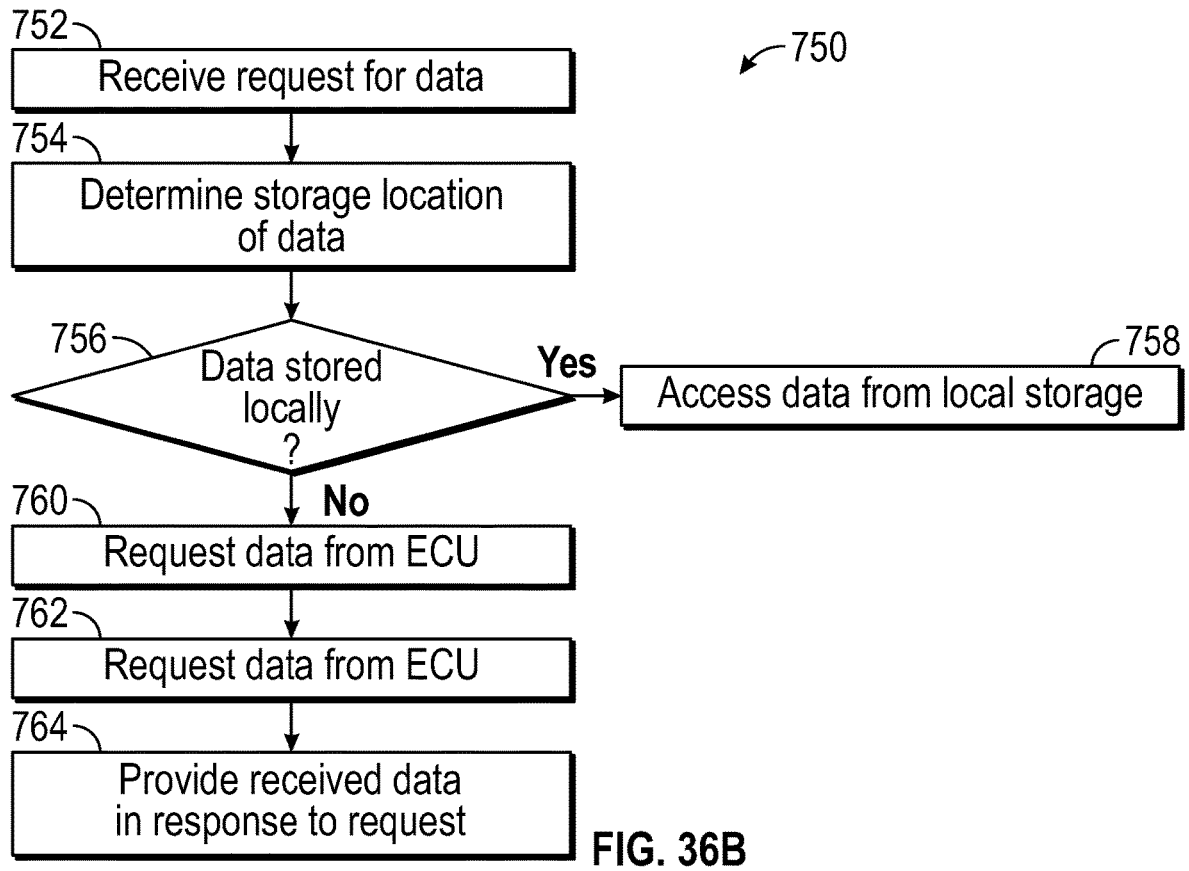
FIG. 36B illustrates an overview of an example method for accessing data stored by an electronic control unit of a vehicle.

FIG. 36B illustrates an overview of an example method 750 for accessing data stored by an electronic control unit of a vehicle. In examples, aspects of method 750 are performed by a storage manager, such as storage manager 520 discussed above with respect to FIG. 34.

Method 750 begins at operation 752, where a request is received for data. The request may comprise an identifier, such as a file name, a path, and/or a unique identifier, among other examples. For example, the request may be received from an ECU (e.g., an ECU implementing a storage manager or another ECU) as a result of the ECU attempting to access data stored according to aspects of the present disclosure.

At operation 754, a location of the stored data is determined. For example, a mapping may exist between an identifier of the received request and either local storage or a data store of a remote ECU. As another example, the identifier may be associated with either a placeholder (e.g., comprising a reference to the remotely stored data) or the data itself (e.g., as may be stored locally).

Flow progresses to determination 756, where it is determined whether the data is stored locally. In instances where the data is stored locally, flow branches "YES" to operation 758, where the data is accessed from local storage. While method 750 is illustrated as accessing the data from local storage or a data store of a remote ECU, it will be appreciated that, in other examples, at least a part of the data may be cached locally, such that data is accessed from both local storage and a remote data store. Method 750 terminates at operation 758.

If, however, it is determined that the data is not stored locally, flow instead branches "NO" to operation 760, where the data is requested from the ECU. In some instances, operation 760 comprises providing an indication of the identifier received at operation 752. In other instances, the request may be specific to the ECU that was determined to store the data. Thus, it will be appreciated that different ECUs may store data differently. As a further example, the request may be made via a high-speed connection (e.g., high-speed connection 538 in FIG. 34) or a low-speed connection (e.g., low-speed connection 540).

Accordingly, the data is received at operation 762, such that it is provided in response to the request for data that was received at operation 752. While method 750 is illustrated as an example where data is retrieved from the ECU and provided accordingly, it will be appreciated that other techniques may be used. For example, a reference may instead be provided, such that the requestor may access the data from the ECU itself. Method 750 terminates at operation 764.

Figure 37A:
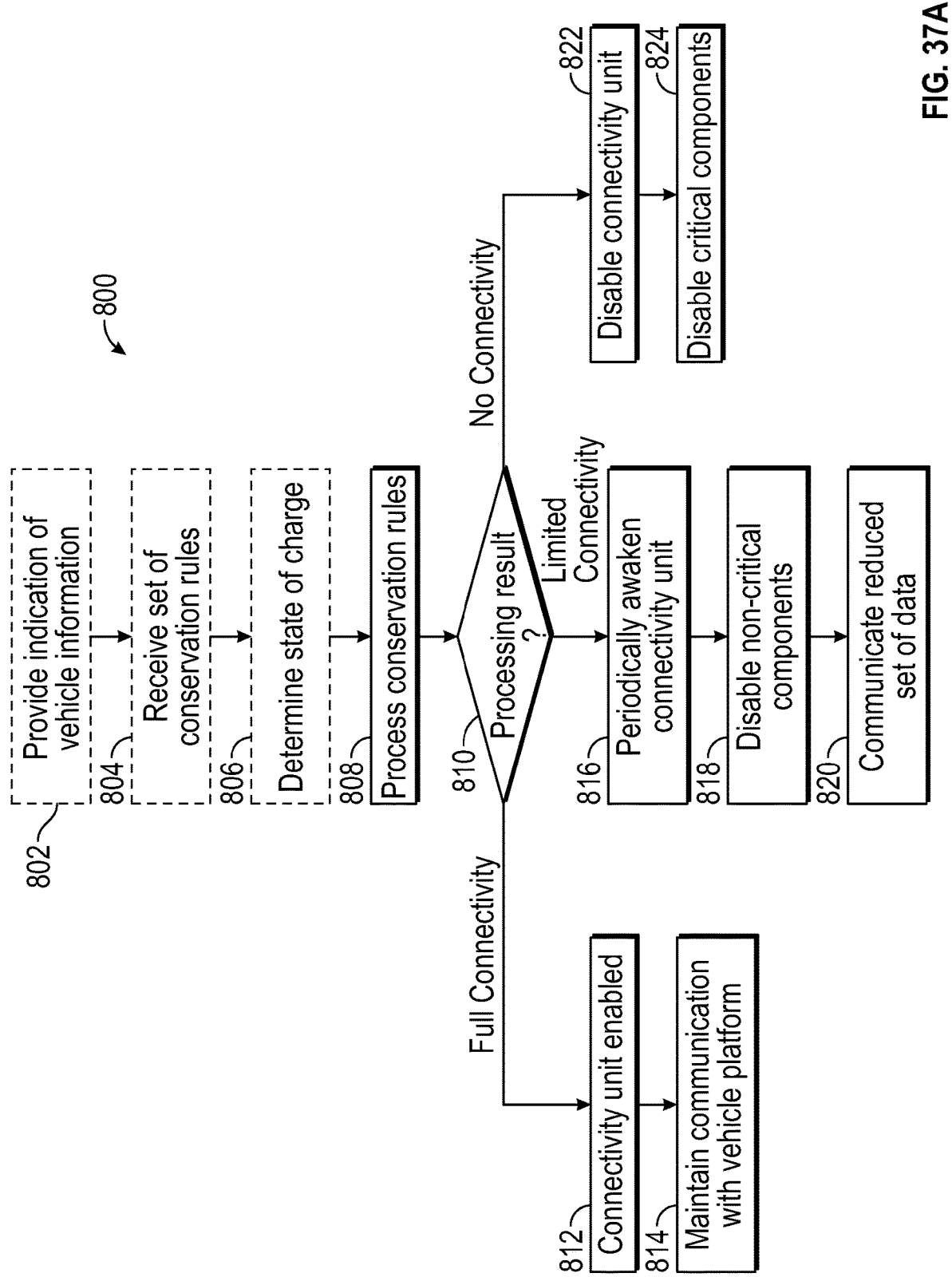
FIG. 37A illustrates an overview of an example method for controlling vehicle state according to the state of charge of the vehicle.

FIG. 37A illustrates an overview of an example method 800 for controlling vehicle state according to the state of charge of the vehicle. In examples, aspects of method 800 are performed by a vehicle state manager, such as vehicle state manager 522 discussed above with respect to FIG. 34.

Method 800 may begin at operation 802, where an indication of vehicle information is provided, for example to a vehicle platform (e.g., vehicle platform 504 in FIG. 34). Example vehicle information includes, but is not limited to, a vehicle make, a vehicle model, a vehicle identification number (VIN), and/or any of a variety of vehicle control system information.

Accordingly, at operation 804, a set of conservation rules may be received. For example, the set of conservation rules may have been generated based at least in part on the vehicle information that was provided at operation 802. As discussed above, a vehicle platform (e.g., vehicle state manager 530 of vehicle platform 504) may generate conservation rules based on information associated with a vehicle. In some examples, an update to a conservation rule may be received, for example to change a condition under which the vehicle is configured for a given operating mode or changing functionality of the operating mode. Operations 802 and 804 are illustrated using dashed boxes to indicate that, in other examples, operations 802 and 804 may be omitted, such that method 800 begins at operation 806. For example, a vehicle may have a pre-configured set of conservation rules, which may be periodically updated by a vehicle platform as a result of operations 802 and 804.

At operation 806, a state of charge is determined for the vehicle. For example, the state of charge may be determined according to a voltage of a battery of the vehicle (e.g., battery 128) or any of a variety of other techniques may alternatively or additionally be used. While method 800 is described in instances where a state of charge is evaluated to configure the vehicle according to an operating mode associated therewith based on a set of conservation rules, it will be appreciated that similar techniques may be used to process any of a variety of other vehicle control system information and associated operating modes.

Flow progresses to operation 808, where conservation rules are processed. In some instances, conservation rules may be interdependent or hierarchical, such that rules may be evaluated sequentially and/or based on a processing result of one or more previous conservation rules. For example, a first conservation rule may be satisfied when the state of charge is at or above a first predetermined threshold. However, if the state of charge is below the first predetermined threshold, a second conservation rule may be evaluated associated with a second predetermined threshold that is less than the first predetermined threshold. Similarly, if the second conservation rule is not satisfied, a third conservation rule having a third predetermined threshold that is below both the first and second predetermined thresholds may be evaluated.

Each of conservation rules may have an associated operating mode (e.g., a full connectivity operating mode, a limited connectivity operating mode, and a no connectivity operating mode, respectively). Any of a variety of rules may be used and, as another example, rules may evaluate external information. For example, an ambient temperature sensor of a vehicle may be used or weather data may be obtained (e.g., via a connectivity circuit) if the vehicle is not equipped with an ambient temperature sensor.

Flow branches a determination 810 according to the processing result of operation 808. For example, if it is determined that the vehicle should be configured according to a full connectivity operating mode, flow branches to operation 812, where a connectivity unit (e.g., dongle 170 in FIGS. 1-2, TCU 250 in FIGS. 3-4, or connectivity circuit 512 in FIG. 34) is configured to be enabled at operation 812 and the vehicle is configured to maintain communication with the vehicle platform at operation 814. For example, such an operating mode may enable a full set of connectivity features of the vehicle to be available, thereby enabling communication with the vehicle platform and/or an operator to interact with the vehicle using an operator device (e.g., operator device 506). Thus, an ongoing communication session may be maintained with the vehicle platform.

If it is instead determined that the vehicle should be configured according to a limited connectivity mode, flow branches to operation 816, where the connectivity unit is configured to periodically awake at operation 816, non-critical components are disabled at operation 818, and a reduced set of data is communicated at operation 820. Thus, as compared to the full connectivity operating mode, a reduced set of functionality features may be available. Further, certain components of the vehicle may be disabled or may be polled at a reduced rate, thereby conserving the state of charge of the vehicle.

Finally, if it is determined that the vehicle should be configured according to a no connectivity mode, flow branches to operation 822, where the connectivity unit is disabled at operation 822 and critical components are disabled at operation 824. In examples, operating modes may be implemented sequentially, such that non-critical components may have already been disabled as a result of performing aspects of operation 818 to place the vehicle in the above-described limited connectivity operating mode. Thus, it will be appreciated that, in other examples (e.g., when transitioning from a full connectivity operating mode to a no connectivity operating mode), configuring the vehicle according to the no connectivity operating mode may further comprise disabling non-critical components.

Further, method 800 is described as an example where the state of charge of a vehicle is decreasing, such that vehicle functionality is reduced and components of a vehicle are disabled. It will be appreciated that similar techniques maybe utilized in instances where the state of charge of a vehicle is increasing (e.g., as a result of battery charging or changing environmental conditions). In such instances, critical components may be enabled as a result of shifting from the no connectivity operating mode to the limited connectivity operating mode and, similarly, non-critical components may be enabled when shifting from the limited connectivity operating mode to the full connectivity operating mode. Method 800 terminates at operation 814, 820, or 824.

Figure 37B:
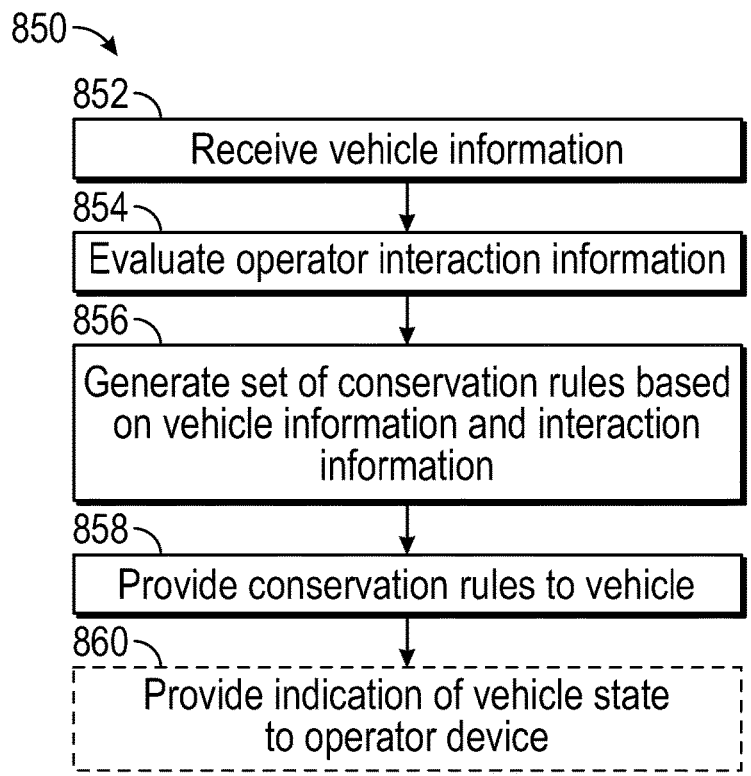
FIG. 37B illustrates an overview of another example method for controlling vehicle state according to the state of charge of the vehicle.

FIG. 37B illustrates an overview of another example method 850 for controlling vehicle state according to the state of charge of the vehicle. In examples, aspects of method 850 are performed by a vehicle platform, such as vehicle platform 504 (e.g., vehicle state manager 530) in FIG. 34.

Method 850 begins at operation 852, where vehicle information is received. For example, the vehicle information may be received from a vehicle performing aspects of operation 802 discussed above with respect to FIG. 37A.

Example vehicle information includes, but is not limited to, a vehicle make, a vehicle model, a vehicle identification number (VIN), and/or any of a variety of vehicle control system information.

At operation 854, operator interaction information is evaluated. For example, an operator communication manager (e.g., operator communication manager 532 in FIG. 34) may maintain interaction information (e.g., in instances where an operator has opted in), such as whether certain functionality has been used by an operator device and/or the frequency with which such functionality is used. In some instances, a geographic location may be received from an operator device (e.g., as may be provided by a vehicle application such as vehicle application 536), which may be used to determine whether an operator is likely to use the vehicle. For example, the determination may be based on proximity or based on a direction of travel. As another example, an indication may be received from the vehicle application that the operator device has crossed a geofence (e.g., a geographic region surrounding the vehicle). Accordingly, such interaction information may be evaluated at operation 854 to determine a set of functionality used by an operator or to forecast function usage by the operator, among other examples.

Flow progresses to operation 856, where a set of conservation rules is generated based on vehicle information and interaction information. For example, a conservation rule (e.g., a threshold, information that is evaluated by the rule, and/or aspects of an associated operating mode) may be based on a make, model, or information associated with a VIN of the vehicle. As another example, a conservation rule may be adapted according to an operator's usage of functionality associated therewith. For example, in instances where an operator does not utilize connected functionality of the vehicle, a vehicle may communicate at a reduced frequency with the vehicle platform as compared to instances where the operator utilized connected functionality. As another example, a vehicle component may be determined to be non-critical or may be disabled prior to other vehicle components based on a determination that functionality utilized by an operator does not typically utilize the component.

In some instances, it may be determined that an operator is likely to use the vehicle soon, such that the operating mode of the vehicle may be adapted accordingly. As an example, a conservation rule may cause the vehicle to be configured in a full connectivity operating mode based on such a determination, even though the vehicle may otherwise have been in a limited connectivity operating mode. Such a conservation rule may ultimately timeout if it is determined that the operator is not in fact using the vehicle within a predetermined amount of time or, as another example, an indication may be received from an operator device to revert to the limited connectivity operating mode.

Flow progresses to operation 858, where the conservation rules are provided to the vehicle. In some instances, an indication to update a set of conservation rules is provided, for example to reconfigure a conservation rule, remove a conservation rule, or add a conservation rule. In examples, an indication of a vehicle state may be communicated to an operator device, for example to indicate to the operator that the vehicle has transitioned between states. For example, an indication may be provided to an operator device, such that the operator device generates a notification that the vehicle has transitioned to a full connectivity operating mode, a limited connectivity operating mode, or a no connectivity operating mode. The indication may comprise a state of charge or other vehicle control system information that may be presented to the user.

For example, the operator device may generate an alert that the battery of the vehicle has dropped below a predetermined threshold and that the vehicle has changed to a different operating mode as a result. In some instances, the alert may instruct the operator to plug in, start, or otherwise charge the battery, and that the vehicle will be configured according to a subsequent operating mode if the state of charge decreases to another predetermined threshold. As another example, an alert may indicate that the battery has risen above a predetermined threshold, such that additional vehicle functionality is enabled. In a further example, an indication may be provided that the vehicle has been placed in an operating mode based on a determination that the operator is likely to use the vehicle (e.g., according to a geographic location of the operator device). Operation 860 is illustrated using a dashed box to indicate that it may be omitted in some examples. Accordingly, method 850 terminates at operation 860 or, in other examples, operation 858.

Figure 37C:
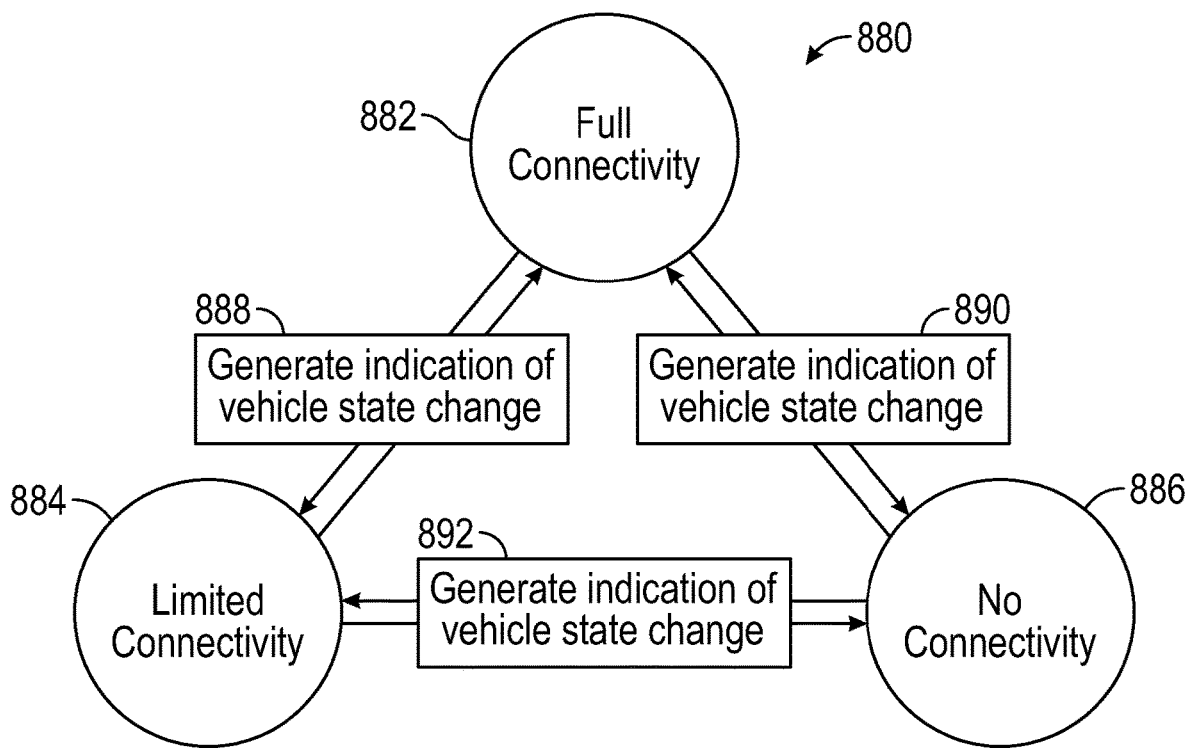
FIG. 37C illustrates an overview of an example set of vehicle states and associated transitions according to aspects of the present disclosure.

FIG. 37C illustrates an overview of an example set 880 of vehicle states and associated transitions according to aspects of the present disclosure. As discussed above, a vehicle may be configured according to full connectivity operating mode 882, limited connectivity operating mode 884, and no connectivity operating mode 886. Arrows are illustrated between states 882, 884, and 886 to illustrate that the vehicle may transition between states 882, 884, and 886 according to any of a variety of conditions, as described above. For example, as a state of charge decreases, a vehicle may begin at state 882, transition to state 884 at a predetermined threshold, and ultimately arrive at state 886 after reaching another predetermined threshold. However, at any point during such a progression, the vehicle may return to state 882 as a result of being powered on, being connected to a charger, or based on determining an operator is proximate to the vehicle, among other examples.

Operations 888, 890, and 892 are illustrated to provide an example action that may be performed when a vehicle transitions between states. As illustrated, an indication may be generated which may be provided to a vehicle platform and/or an operator device. For example, the vehicle platform may take any of a variety of actions in response to the indication, such as updating data on the vehicle or relaying the indication to an operator device. As another example, the operator device may generate an alert to the operator.

Figure 38:
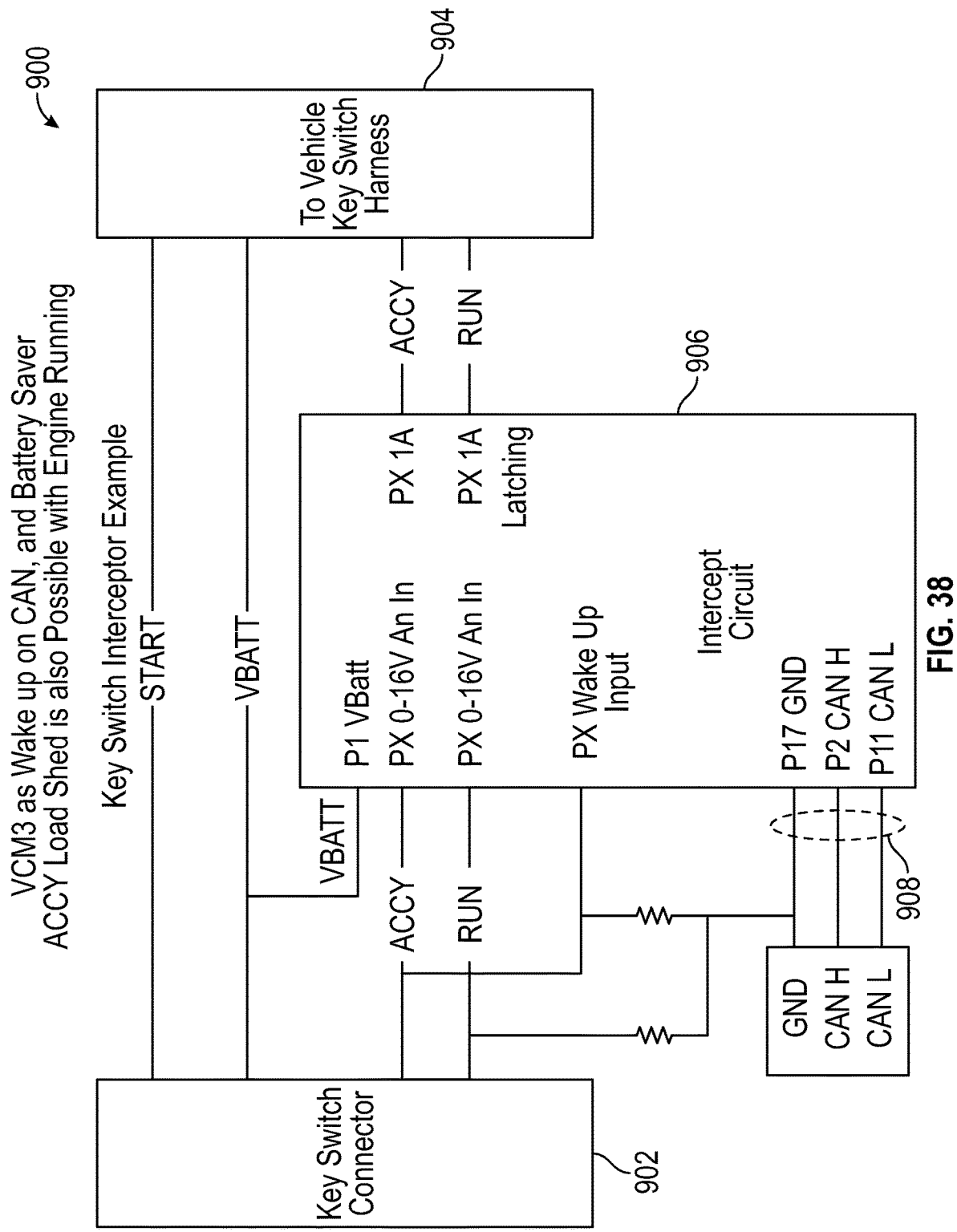
FIG. 38 illustrates an overview of a schematic in which an intercept circuit may be used according to aspects of the present disclosure.

FIG. 38 illustrates an overview of a schematic 900 for in which an intercept circuit may be used according to aspects of the present disclosure. As illustrated, schematic 900 comprises key switch connector 902, key switch harness 904, and intercept circuit 906. In examples, intercept circuit 906 may comprise hardware, software, or any combination thereof. Intercept circuit 906 is connected to the ACCY and RUN connections from key switch connector 902 and is also connected to the ACCY and RUN connections to key switch harness 904. In some instances, intercept circuit 906 may pass through the ACCY and/or RUN signal from key switch connector 902 to key switch harness 904, thereby enabling expected behavior in a first operating mode. For example, when operator input is received via key switch connector 902 (thereby resulting in a signal via the ACCY and/or RUN connections), accessories of the vehicle may be enabled and the vehicle may be started. However, intercept circuit 906 may interrupt or otherwise disconnect such a signal provided by key switch connector 902 in a second operating mode, thereby affecting operation of the vehicle accordingly.

Intercept circuit 906 is further illustrated as having connection 908 to a CAN bus of the vehicle. It will be appreciated that any of a variety of alternative or additional connections may be used, for example one or more low-speed and/or high-speed connections described above.

Intercept circuit 906 may determine that the vehicle has been in operation for a predetermined amount of time, at which point the ACCY signal may be disconnected, thereby disabling accessories of the vehicle. In some instances, intercept circuit 906 may evaluate or otherwise obtain data via connection 908, for example to determine whether an operator is interacting with the vehicle. If it is determined that an interaction has been received, a timer may be reset or the ACCY signal may not be disconnected. As another example, an indication to turn off the vehicle may be received (e.g., from a vehicle platform or an operator device), such that both the ACCY and RUN signals are no longer provided via intercept circuit 906 to key switch harness 904. In some instances, intercept circuit 906 may include a connectivity circuit or may communicate with a connectivity circuit (e.g., via connection 908) to receive such an indication.

As another example, a warning may be generated prior to such actions by intercept circuit 906. For example, an indication may be provided via an operator interface of the vehicle (e.g., operator interface 150 in FIGS. 1-4 or operator interface 510 in FIG. 34). In some instances, an indication may be provided to an operator device (e.g., via a connectivity circuit). The indication may comprise a counter, after which the ACCY and/or RUN signals may be interrupted. Operator input may be received, such that an operator may override such behavior or provide an input to accelerate such behavior, among other examples.

While example behavior of intercept circuit 906 is described, it will be appreciated that intercept circuit 906 may implement any of a variety of other operating states, for example similar to those described above with respect to vehicle state manager 522 in FIG. 34. For example, intercept circuit 906 may provide a signal to a module associated with a given operating mode. In other examples, a single module may configure the vehicle according to multiple operating modes. In some instances, key switch connector 902 may comprise an associated connection, thereby enabling an operator to similarly select such an operating mode using a key switch accordingly.

In addition to disconnecting or interrupting an ACCY and/or RUN signal, intercept circuit 906 may provide such a signal, thereby enabling accessories and/or turning on the vehicle (e.g., absent operator input via key switch connector 902). For example, an indication may be received via a connectivity circuit (e.g., from an operator device or a vehicle platform). As another example, an indication may be received from an ECU of the vehicle via connection 908. Intercept circuit 906 may evaluate a state of charge of the vehicle (e.g., via VBATT as illustrated in schematic 900) to determine whether to provide such a signal or to conserve vehicle resources. In instances where it is determined to conserve vehicle resources, an indication of such a determination may be provided in response.

While intercept circuit 906 is illustrated as intercepting ACCY and RUN connections, it will be appreciated that any number of additional or alternative connections may be used. For example, multiple accessory connections may be implemented, where a first accessory connection is associated with critical accessories and a second accessory connection is associated with non-critical accessories. Accordingly, providing a signal via the first accessory connection may enable the critical accessories and providing a signal via the second accessory connection may enable the non-critical accessories. Such accessory connections may be operated independently, such that the critical and/or non-critical accessories may be controlled as a result of operator input at key switch connector 902 and/or by intercept circuit 906 according to aspects described herein. Example critical accessories may include GPS, vehicle-to-vehicle communication functionality, and at least some functionality provided by an IVI (e.g., maps and vehicle control). Example non-critical accessories may include a pulse bar, off-road lights, an amplifier, and/or media playback functionality of the IVI.

Behavior of the intercept circuit may be operator-configurable. For example, an operator may disable a timeout or specify a timeout after which the above-described aspects are performed. Such configurability may be on a key-cycle basis, such that it resets between uses of the vehicle or it may be a persistent setting, among other examples. Thus, intercept circuit 906 may enable an operator to remotely control aspects of a vehicle and/or access vehicle control system information (e.g., via connection 908), for example using an operator device or via a vehicle platform.

Figure 39:
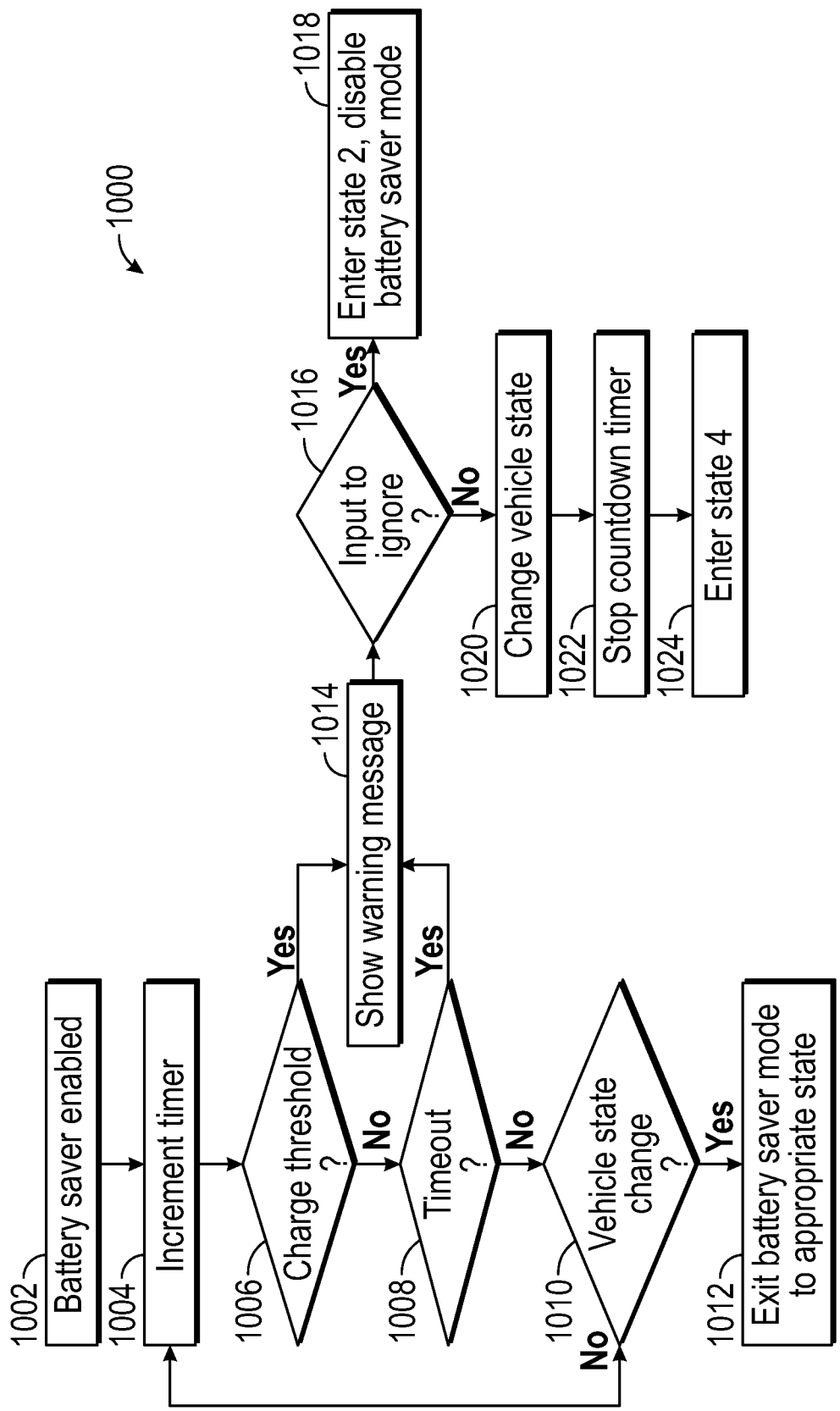
FIG. 39 illustrates an overview of an example method for controlling a vehicle using an intercept circuit in accordance with aspects of the present disclosure

FIG. 39 illustrates an overview of an example method 1000 for controlling a vehicle using an intercept circuit in accordance with aspects of the present disclosure. In examples, aspects of method 1000 are performed by an intercept circuit, such as intercept circuit 906 in FIG. 38. Method 1000 begins at operation 1002, where battery saver is enabled. For example, battery saver may be automatically enabled during operation of a vehicle or may be manually enabled by an operator, among other examples.

At operation 1004, a timer is incremented. As described above, an inactivity timer may be used to control aspects of the vehicle independently or further with respect to a state of charge of the vehicle, among other examples. At determination 1006, it may be determined whether a state of charge of below a predetermined threshold. For example, the state of charge may be determined based on a battery voltage detected via a VBATT connection, as described above with respect to intercept circuit 906 of FIG. 38. In other examples, vehicle control system information may be obtained via a connection to one or more ECUs, such as via connection 908.

If it is determined that the charge is not below a predetermined threshold, flow branches "NO" to determination 1008, where it is determined whether a timeout has been reached. As described above, the timeout may be operator-configurable in some instances. If a timeout has not been reached, flow branches "NO" to determination 1010, where it is determined whether a vehicle state has changed. As described above, an operator interaction may cause a timeout countdown to end, in which case flow branches "YES" and terminates at operation 1012, where battery saver mode is exited to an appropriate state. Example states are described below with respect to FIGS. 40 and 41. By contrast, if the vehicle state has not changed, flow branches "NO" and returns to operation 1004, such that flow loops as described above.

Returning to determinations 1006 and 1008, if a charge threshold has been reached or the timeout has been satisfied, respectively, flow instead branches "YES" to operation 1014, where a warning message is presented. For example, the warning message may be presented via an operator interface or an operator device, among other examples. As an example, the warning may be a visual warning (e.g., via a screen, or using one or more lights or light patterns) and/or an audible warning.

At determination 1016, it is determined whether input to ignore the warning has been received. Accordingly, if it is determined input has been received, flow branches "YES" and terminates at operation 1018, where battery saver mode is disabled and the vehicle may enter state 2 (e.g., an accessory mode, as is described below in more detail with respect to FIGS. 40 and 41).

By contrast, if input is not received, the vehicle state may be changed at operation 1020. For example, the intercept circuit may disconnect one or more signals to a key switch harness, thereby disabling accessories and/or turning off the vehicle. At operation 1022, a countdown timer is stopped and, at operation 1024, the vehicle enters state 4 (e.g., such that the vehicle has been turned off, as described in more detail with respect to FIG. 40). Flow terminates at operation 1024.

Figure 40:
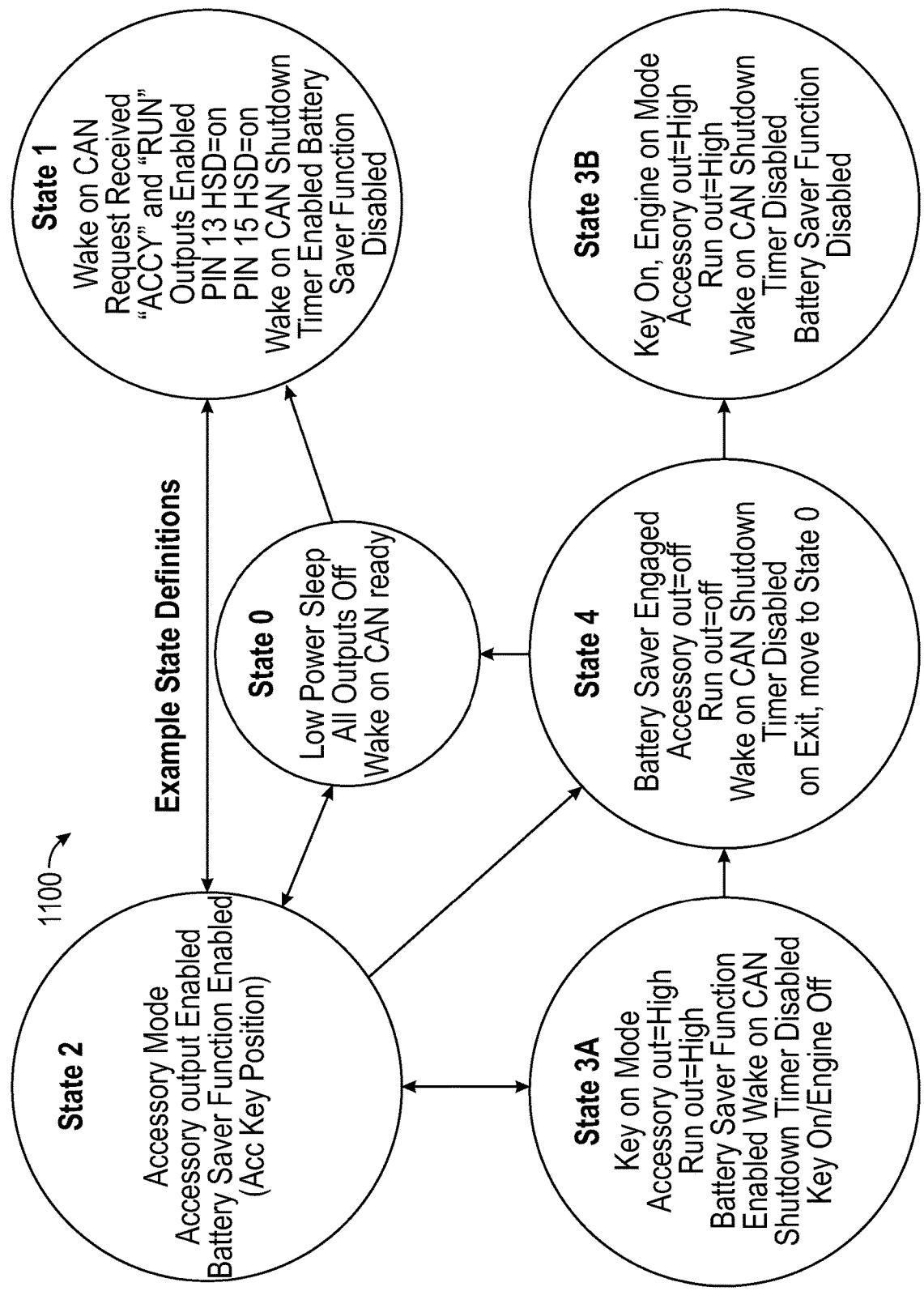
FIG. 40 illustrates an overview of example vehicle states associated with an intercept circuit.

FIG. 40 illustrates an overview of example vehicle states 1100 associated with an intercept circuit. For example, the illustrated states may be implemented by an intercept circuit, such as intercept circuit 906 in FIG. 38. Accordingly, the illustrated states indicate signals that may be provided via an ACCY and/or RUN connection, such as those described above with respect to FIG. 38. Additionally, the states indicate whether battery saver functionality is enabled, similar to aspects described above with respect to FIG. 39. Finally, certain states may enable "Wake on CAN" functionality, similar to that described above with respect to intercept circuit 906 via connection 908 in FIG. 38. States 1100 further illustrate example key positions, as may be received by a key switch such as a key switch connected to key switch connector 902 in FIG. 38.

Figure 41:
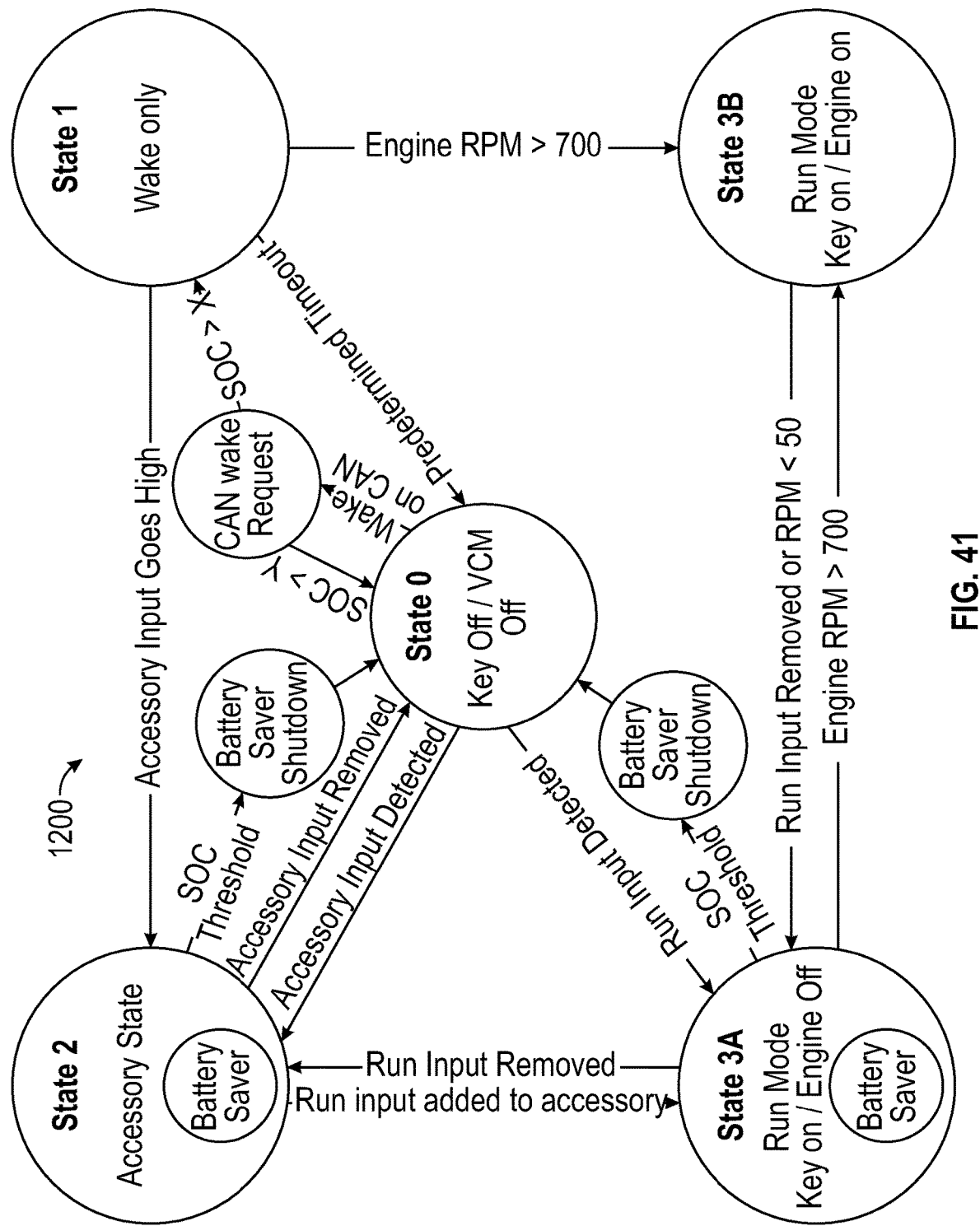
FIG. 41 illustrates an overview of example vehicle states and associated transition logic for an intercept circuit.

FIG. 41 illustrates another overview 1200 of example vehicle states and associated transition logic for an intercept circuit. The states shown in overview 1200 are similar to states 1100 discussed with respect to FIG. 40 and are further illustrated as comprising example transition logic between the illustrated states. For example, multiple thresholds may be used with respect to a vehicle state of charge (e.g., "SOC>X" or "SOC<Y"). Similarly, an engine RPM (or other information associated with a prime mover, such as prime mover 112 in FIGS. 1-4) may be evaluated as part of transition logic (e.g., as may be obtained via a CAN bus or other connection similar to connection 908 in FIG. 38). "Accessory Input" and "Run Input" are provided as example inputs that may be received via a key switch according to aspects described herein.

Figure 42:
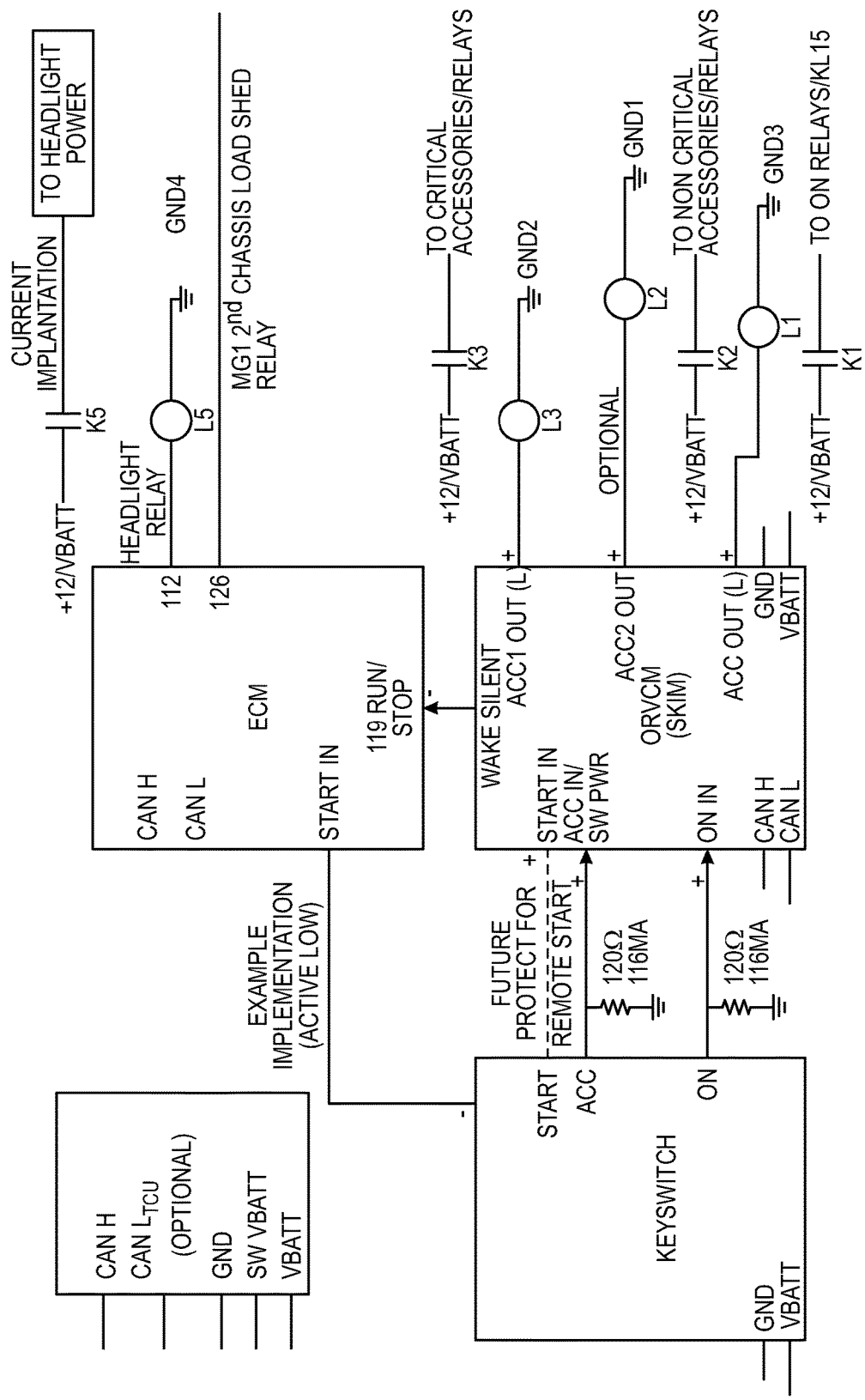
FIG. 42 illustrates an overview of a schematic for an intercept circuit according to aspects of the present disclosure.

FIG. 42 illustrates an overview of another schematic 1300 for an intercept circuit according to aspects of the present disclosure. Aspects of schematic 1300 are similar to those described above with respect to schematic 900 in FIG. 38. For example, signals from key switch 1302 (e.g., via ON and ACC connections) are received by ORVCM 1306 (aspects of which are similar to intercept circuit 906). Accordingly, ORVCM 1306 may provide a signal to engine control module (ECM) 1304 or may control one or more sets of accessories (e.g., via ACC1 OUT and ACC2 OUT). Thus, while only one accessory connection is illustrated between key switch 1302 and ORVCM 1306, ORVCM 1306 may still manage multiple accessory connections and associated accessories in accordance with aspects described herein. It will be appreciated that circuitry, resistor values, voltages, and other aspects of schematics 900 and 1300 in FIGS. 38 and 42, respectively, are provided as examples and, in other examples, such aspects may be different.

Figure 43:
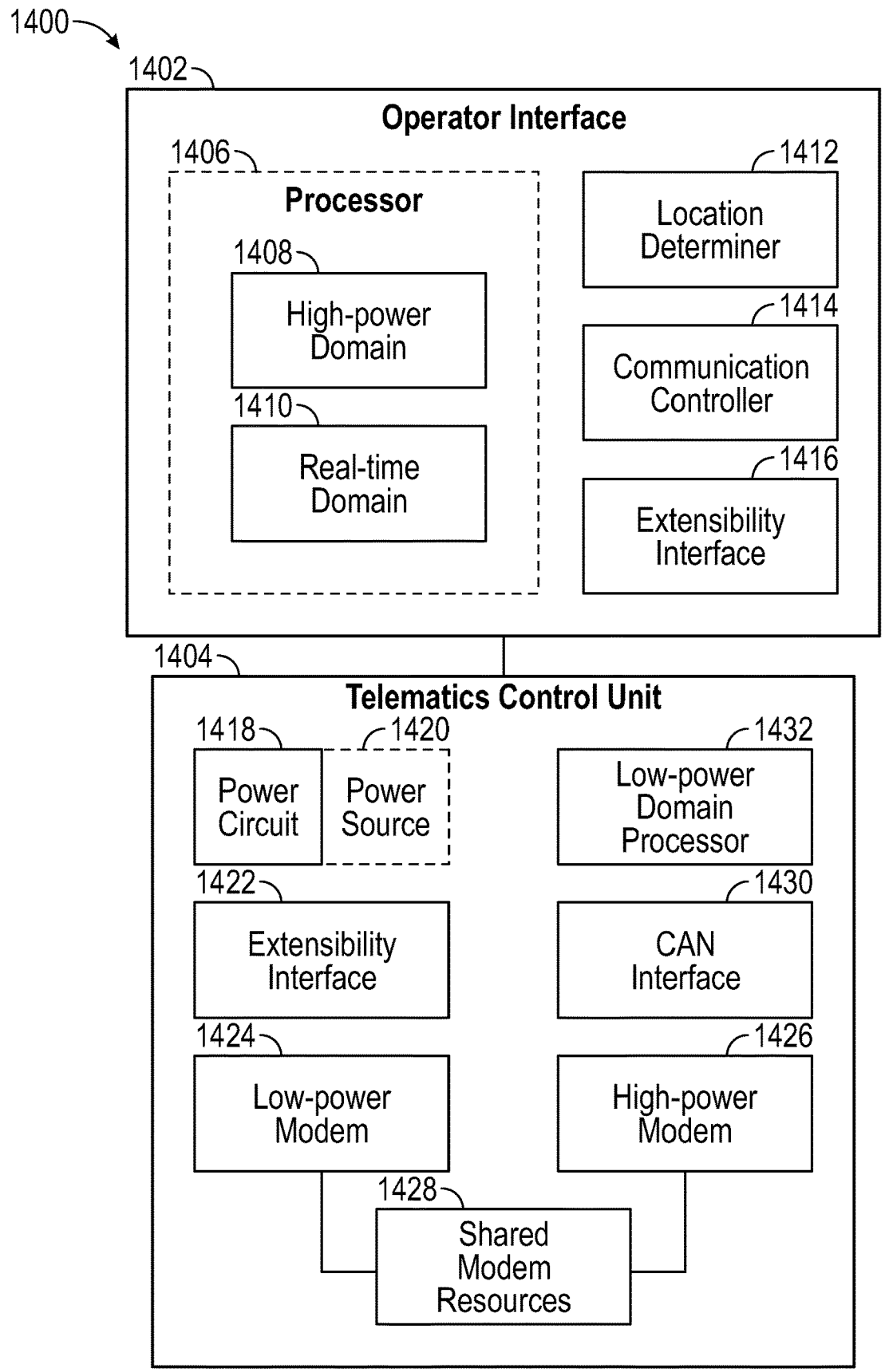
FIG. 43 illustrates an example system in which an operator interface and add-on telematics control unit operate to provide vehicle connectivity functionality according to aspects described herein.

FIG. 43 illustrates an example system 1400 in which an operator interface 1402 and telematics control unit 1404 operate to provide vehicle connectivity functionality according to aspects described herein. In examples, aspects of operator interface 1402 and telematics control unit 1404 may be similar operator interface 510 and connectivity circuit 512, respectively, discussed above with respect to FIG. 34. As another example, aspects of operator interface 1402 may be similar to operator interface 150 discussed above with respect to FIGS. 1-4. Similarly, aspects of telematics control unit 1404 may be similar to wireless plug-in dongle 170, telematics control unit 250, intercept circuit 906, or ORVCM 1306 discussed above with respect to FIGS. 1-4, 38, and 42. Accordingly, such aspects are not necessarily re-described below.

Operator interface 1402 is illustrated as comprising processor 1406, location determiner 1412 (e.g., a GPS), communication controller 1414, and extensibility interface 1416. Processor 1406 includes high-power domain 1408 and real-time domain 1410. In examples, high-power domain 1408 and real-time domain 1410 may each have associated physical and/or virtual resources of processor 1406. For example, a process of real-time domain 1410 may have a higher priority as compared to a process of high-power domain 1408. In some examples, each domain may have an associated set of physical and/or virtual resources. For example, real-time domain 1410 may have one or more dedicated processor cores that are not shared with high-power domain 1408. Real-time domain 1410 may be responsible for functionality associated with the operation of the vehicle (e.g., as may be associated with prime mover 142, transmission 146, suspension systems 120, braking systems 122, and/or steering system 124 discussed above in FIGS. 1-4), while high-power domain 1408 may be responsible for tasks that are comparatively less sensitive to processing delays and stability considerations (e.g., associated with IVI functionality).

While example processing and resource allocations are described herein, it will be appreciated that any of a variety of other processing and/or allocations may be performed or used. For example, high-power domain 1408 and real-time domain 1410 need not be implemented using a single processor 1406. As another example, high-power domain 1408 may be responsible for at least some functionality associated with vehicle operation, as may be the case when operator interface 1402 displays information associated with the vehicle functionality to the operator. In such an example, high-power domain 1408 may obtain and/or present such information without affecting operation of the vehicle (e.g., vehicle 100 or vehicle 502), as such aspects may instead be handled by real-time domain 1410 or another electronic control unit.

In examples, communication controller 1414 enables communication (e.g., by processor 1406) with another vehicle (not pictured), an operator device (e.g., operator device 506 in FIG. 5), or a vehicle platform (e.g., vehicle platform 504), among other examples, using one or more wired and/or wireless communication technologies. For instance, communication controller 1414 may comprise a Bluetooth and/or Wi-Fi radio that communicates directly with a corresponding radio of a remote device. It will be appreciated that communication controller 1414 may implement any of a variety of additional or alternative communication technologies, including, but not limited to, UWB or NFC, among other examples. In some instances, communication controller 1414 may communicate with other vehicles and/or emit beacons (e.g., using Wi-Fi or Bluetooth Low Energy) that may be used by other vehicles and/or a vehicle platform to locate the vehicle in the absence of or in addition to communication via a cellular network or other Internet connection.

Telematics control unit 1404 is illustrated as comprising power circuit 1418, power source 1420, extensibility interface 1422, low-power modem 1424, high-power modem 1426, shared modem resources 1428, CAN interface 1430, and low-power domain processor 1432. In examples, power circuit 1418 supplies power to elements of telematics control unit 1404 (e.g., low-power domain processor 1432, low-power modem 1424, and high-power modem 1426).

For example, power circuit 1418 may supply power from power source 1420 and/or another power source of the vehicle. As an example, power circuit 1418 may supply power from a vehicle power source when the vehicle is in operation (e.g., from a battery or alternator of vehicle 100 or vehicle 502), while power circuit 1418 may instead supply power from power source 1420 when the vehicle is powered off or a vehicle power source has a state of charge below a predetermined threshold. It will be appreciated that power sources need not be mutually exclusive, such that power circuit 1418 may supply power from multiple such power sources in some examples. As another example, power source 1420 may enable telematics control unit 1404 to operate even if a vehicle power source has been disconnected, as may be the case when the vehicle is subject to theft.

Telematics control unit 1404 may operate in a reduced state or be powered off when the vehicle is powered off or a power source of the vehicle is below a predetermined range. Similarly, telematics control unit 1404 may operate in a reduced state or be powered off according to the state of charge of power source 1420. The behavior of telematics control unit 1404 in such scenarios may be similar to those discussed above, for example with respect to FIGS. 33, 37A-C, 39, and 40.

Power source 1420 is illustrated using a dashed box to indicate that, in some examples, power source 1420 may be omitted. Power source 1420 may be preinstalled or, as another example, may be user serviceable such that a user can install or replace power source 1420 accordingly. In examples where power source 1420 is present, power circuit 1418 may recharge power source 1420 using a vehicle power source (e.g., when the vehicle is charging or is powered on). Additionally, the behavior of telematics control unit 1404 may differ depending on whether power source 1420 is present. For example, connectivity via low-power modem 1424 and/or high-power modem 1426 may be available while the vehicle is powered off in instances where power source 1420 is present. In other examples, information may be provided to a vehicle platform at a higher frequency or with greater fidelity (as may be preconfigured or user-configurable, among other examples).

As another example, power source 1420 may enable telematics control unit 1404 to operate at a lower voltage as compared to when a vehicle power source is used. For instance, telematics control unit 1404 may be able to operate at a wide range of voltages, at least a part of which may be below a threshold that the vehicle can operate. Thus, absent power source 1420, telematics control unit 1404 may be powered down to conserve the vehicle power source, thereby ensuring the vehicle can start.

In a further example, power source 1420 may utilize a different battery chemistry as compared to a vehicle power source. For instance, the chemistry of power source 1420 may be selected according to an intended environment in which the vehicle may operate, thereby enabling telematics control unit 1404 to operate at extremes that may otherwise be difficult or impossible using a vehicle power source.

Similarly, telematics control unit 1404 may operate at a voltage that is lower than a range of power source 1420, thereby simplifying aspects of power circuit 1418. As the voltage of power source 1420 may fluctuate according to temperature, state of charge, and/or whether power source 1420 is charging, among other examples, utilizing a lower voltage may reduce or eliminate the need to step the voltage up or down that is supplied to telematics control unit 1404 from power source 1420.

In examples, a state of charge of power source 1420 may be made available to other components of the vehicle. For example, low-power domain processor 1432 may provide an indication of the state of charge via CAN interface 1430, such that other functionality of the vehicle may be configured accordingly. As another example, an indication may be provided to operator interface 1402 (e.g., via extensibility interface 1422), such that the state of charge may be presented to an operator of the vehicle. As a further example, an indication may be provided to a vehicle platform and/or an operator device (e.g., via low-power modem 1424 and/or high-power modem 1426).

Telematics control unit 1404 is further illustrated as comprising low-power domain processor 1432. As compared to processor 1406, low-power domain processor 1432 may consume less power. Thus, low-power domain processor 1432 may perform processing more efficiently than processor 1406 in at least some scenarios. In instances where the vehicle is powered off, low-power domain processor 1432 may therefore enable connectivity (e.g., via low-power modem 1424 and/or high-power modem 1426) for a longer period of time than would otherwise be possible were processor 1406 used.

Functionality provided by low-power domain processor 1432 may be similar to processor 1406. Thus, low-power domain processor 1432 may be used to perform processing as an alternative to processing by processor 1406 (e.g., in the high-power domain 1408 and/or real-time domain 1410). In other examples, low-power domain processor 1432 may perform processing contemporaneously and/or in cooperation with processor 1406, for example to provide access to a CAN bus of the vehicle (e.g., via CAN interface 1430). Thus, as compared to instances where processor 1406 would be powered off, put into a suspend state, or utilized at reduced functionality (e.g., with a reduced load or a lower clock speed), low-power domain processor 1432 may provide similar functionality but with reduced power consumption. In examples, processor 1406 and low-power domain processor 1432 may share storage, memory, and/or an event bus, which may be used for such cooperative processing.

For example, low-power domain processor 1432 may control low-power modem 1424 to provide anti-theft functionality, to provide location tracking, to provide other vehicle information or telemetry, and/or to communicate with a vehicle platform or operator device to provide any of a variety of functionality.

Low-power domain processor 1432 may have a sleep state, such that various wake sources may cause low-power domain processor 1432 to wake from the sleep state and perform processing. For example, low-power domain processor 1432 may determine whether theft monitoring is enabled and, if so, an accelerometer (not pictured) may be set as a wakeup source.

As another example, low-power domain processor 1432 may provide telemetry data to a vehicle platform (e.g., using low-power modem 1424). Accordingly, low-power domain processor 1432 may determine whether to schedule a check-in interval and, if so, may make an authentication request to the vehicle platform. For example, low-power domain processor 1432 may use authentication data (e.g., as may be obtained from processor 1406, using a hardware mailbox and/or from secure storage) to authenticate with the vehicle platform. In examples, a valid authentication token may be received from the vehicle platform in response, after which low-power domain processor 1432 may issue a check-in request and process the response for further action instructions. Low-power domain processor 1432 may then return to the sleep state until it is time for a subsequent check-in.

It will be appreciated that any of a variety of responses may be received from the vehicle platform, including, but not limited to, an indication that an over-the-air update is available (e.g., in response to which processor 1406 may be activated to handle the update according to aspects described herein), a request for trouble codes or telemetry data (e.g., in response to which low-power domain processor 1432 may obtain the requested information, for example via CAN interface 1430 and/or extensibility interface 1422), an indication to change the state of vehicle theft monitoring (e.g., such that low-power domain processor 1432 may configure its theft alerting accordingly), an indication to update a geofence of the vehicle (e.g., such that location determiner 1412 may be used to monitor a vehicle status with respect to the geofence), and/or a no-operation indication (which, in some examples, may include an indication of a next scheduled check-in).

In examples, an interval and/or set of wake sources may be user-configurable, for example using an application on an operator device, via a vehicle platform, and/or by providing user input to operator interface 1402. In some examples, the interval and/or set of wake sources may be dynamically configured. For example, low-power domain processor 1432 may wake on accelerometer activity, at which point it may be configured to wake more frequently and/or provide location information (at such an updated frequency) to the vehicle platform. Low-power domain processor 1432 may remain in this configuration until accelerometer activity has not been detected for a predetermined amount of time, at which point it may return to its initial configuration.

In examples, when low-power domain processor 1432 is in a sleep state, a message received from low-power modem 1424 may wake low-power domain processor 1432, thereby providing "shoulder-tap" functionality. Thus, operation of low-power domain processor 1432 may be controlled using SMS messages, for example containing a command associated with specified behavior. As another example, low-power domain processor 1432 may request additional instruction from the vehicle platform in response to such a message.

Low-power domain processor 1432 may exhibit similar wake behavior in other examples, such as when CAN traffic is detected (e.g., via CAN interface 1430), when it is detected that a vehicle power source has been disconnected (e.g., via power circuit 1418), when it is determined that the state of charge of power source 1420 is below a predetermined threshold, when an interrupt or other indication is received from processor 1406, when an accelerometer event is detected and theft alerting is enabled (as discussed above), and/or after a predetermined amount of time has passed (e.g., as may be the case when a real time clock alarm fires), among other examples.

In some instances, low-power domain processor 1432 may identify a scenario in which additional computing resources should be used. For example, low-power domain processor 1432 may determine to utilize high-power modem 1426 and/or cause processor 1406 to perform processing (e.g., in high-power domain 1408) according to aspects described herein.

Thus, low-power domain processor 1432 may configure low-power modem 1424 and high-power modem 1426 accordingly or, as another example, may provide an indication to processor 1406 to perform such processing. For instance, low-power domain processor 1432 may cause processor 1406 to boot or other hardware of the vehicle may cause processor 1406 to boot, among other examples. In examples, low-power domain processor 1432 may provide data to processor 1406, such that processor 1406 may resume or otherwise continue processing performed by low-power domain processor 1432 in high power domain 1410. As an example, low-power domain processor 1432 may buffer data from CAN interface 1430, low-power modem 1424, and/or high-power modem 1426 while processor 1406 boots.

In another example, processor 1406 may identify a scenario in which reduced computing resources should be used. For example, processor 1406 may determine the vehicle is no longer in operation, that utilization of processor 1406 is such that low-power domain processor 1432 can handle similar processing at a reduced rate of power consumption, or that operator interface 1402 is no longer in use, among other examples. Accordingly, low-power domain processor 1432 may be used to perform processing instead or in addition to processor 1406. For instance, processor 1406 may cause low-power domain processor 1432 to boot or other hardware of the vehicle may cause low-power domain processor 1432 to boot, among other examples. In examples, processor 1406 may provide data to low-power domain processor 1432, such that low-power domain processor 1432 may resume or otherwise continue processing performed by processor 1406. As an example, processor 1406 may provide information usable by low-power domain processor 1432 to communicate with a vehicle platform, such as an authentication token or other authentication information that may be used to communicate with the vehicle platform while low-power domain processor 1432 is used.

As an example, an indication of an over-the-air update may be received, such that low-power domain processor 1432 may perform at least a part of the processing associated with the update (e.g., downloading and staging a set of files associated with the update). Once low-power domain processor 1432 has completed its processing, processor 1406 may be activated (and, in some examples, low-power domain processor 1432 may be powered off), such that applying the over-the-air update is completed by processor 1406. For example, processor 1406 may generate checksums to verify the downloaded data and perform differential processing associated with applying a differential update. In other examples, at least a part of the processing by processor 1406 may be performed contemporaneously with processing by low-power domain processor 1432. While example operations are described as being performed by either processor 1406 or low-power domain processor 1432, it will be appreciated that any of a variety of processing may be performed according to a similar or different division of tasks.

Telematics control unit 1404 is further illustrated as comprising low-power modem 1424, high-power modem 1426, and shared modem resources 1428. In examples, low-power modem 1424 and high-power modem 1426 may each have an associated set of modem characteristics, at least some of which may be different. For example, low-power modem 1424 may implement features associated with reduced power consumption, such as those of Category M defined by the Long-Term Evolution (LTE) standard (e.g., Power Saving Mode (PSM) and/or Extended Discontinuous Reception (eDRX)). Similarly, high-power modem 1426 may implement features resulting in comparatively higher power consumption, such as those of LTE Category 1. Each of cellular modems 1424 and 1426 may implement different cellular technology standards in some examples.

Thus, low-power modem 1424 may consume less power (e.g., on average or at peak load) than high-power modem 1426, while high-power modem 1426 may offer a comparatively higher data rate than low-power modem 1424. In examples, low-power modem 1424 may have increased range and/or radio sensitivity as compared to high-power modem 1426. While example modem characteristics and tradeoffs are described, it will be appreciated that a set of cellular modems may exhibit or otherwise be selected according to any of a variety of additional, alternative, or fewer criteria, including, but not limited to, cost, size, operating voltage, and/or operating temperature.

As a result of including multiple cellular modems (low-power modem 1424 and high-power modem 1426 in the instant example, e.g., dual modems), it may be possible to utilize scenario-specific benefits of each modem. For example, low-power modem 1424 may be used to provide low-power connectivity (e.g., as may be used when the vehicle is off or when a state of charge of power source 1420 is below a predetermined threshold). By contrast, high-power modem 1426 may be used for high-bandwidth connectivity, as may be the case when downloading a software or map update for an ECU of the vehicle or for downloading content for operator interface 1402, among other examples. As another example, high-power modem 1426 may be used when power need not be conserved, such as when the vehicle is charging or in operation. In some instances, low-power modem 1424 may implement a cellular technology having greater range or signal sensitivity than high-power modem 1426, such that low-power modem 1424 may be used as a "fallback" when high-power modem 1426 is unable to establish a connection (or vice versa, where high-power modem 1426 has improved range or sensitivity and acts as a fallback when low-power modem 1424 is unable to establish a connection).

Telematics control unit 1404 is further illustrated as comprising shared modem resources 1428, which are used by both low-power modem 1424 and high-power modem 1426. For example, shared modem resources 1428 may include an antenna and a subscriber identity module (SIM). Accordingly, the antenna and SIM may be selectively connected (e.g., using a physical or electrical switch, among other examples) to low-power modem 1424 or high-power modem 1426, depending on which modem is in use. For instance, a switch may have a first state and a second state, wherein a resource of the shared modem resources 1428 is electrically coupled with low-power modem 1424 in the first state and electrically coupled with high-power modem 1426 in a second state. In some instances, transitioning shared modem resources 1428 from one modem to another may have an associated process (e.g., to deregister one modem with the cellular network, transition shared modem resources 1428 from low-power modem 1424 to high-power modem 1426 (or vice versa), and reregister the other modem with the cellular network), aspects of which are described below with respect to FIG. 45B.

It will be appreciated that an antenna and SIM are provided as example of shared modem resources 1428 and, in other examples, fewer, additional, or alternative resources and/or resource types may be used. In examples, multiple antennas may be used, for example one that is external to telematics control unit 1404 (and therefore has improved range) and another that is internal to telematics control unit 1404 and serves as a backup antenna. The backup antenna may be used in a scenario where the external antenna is unavailable, as may be the case when it is damaged or has been intentionally disconnected during a theft of the vehicle.

Further, while the instant examples are described in a scenario where multiple cellular modems are used, it will be appreciated that similar techniques may be used for any of a variety of other wireless communication radios, including satellite communications, Bluetooth, or Wi-Fi. Further, while the cellular modems may have overlapping functionality, each modem need not implement the same set of communication technologies.

As illustrated, operator interface 1402 and telematics control unit 1404 are communicatively coupled, for example via extensibility interface 1416 and extensibility interface 1422, respectively. For example, operator interface 1402 and telematics control until 1404 may communicate using a USB connection, an Ethernet connection, and/or a BroadR-Reach connection, among other examples.

Accordingly, processor 1406 and low-power domain processor 1432 may communicate via extensibility interfaces 1416 and 1422, respectively, as described above. In other examples, processor 1406 may be able to utilize elements of telematics control unit 1404 without active involvement by low-power domain processor 1432 (e.g., when low-power domain processor 1432 is powered off or suspended), while low-power domain processor 1432 may be able to utilize elements of operator interface 1402 without active involvement by processor 1406 (e.g., while processor 1406 is powered off or suspended).

For instance, high-power modem 1426 may be switchably connected to low-power domain processor 1432 and extensibility interface 1422, thereby enabling control of high-power modem 1426 by low-power domain processor 1432 and by processor 1406 (e.g., via extensibility interface 1422). For instance, a USB switch may be used to enable USB communication with high-power modem 1426 from one of processors 1406 or 1432. Low-power modem 1424 may be similarly connected to both low-power domain processor 1432 and extensibility interface 1422 or, as another example, may utilize a communication protocol (e.g., universal asynchronous receiver-transmitter (UART), Inter-Integrated Circuit (I²C), or Serial Peripheral Interface (SPI)) for which it is in sole communication with low-power domain processor 1432.

As another example, location determiner 1412 may be switchably connected to processor 1406 and extensibility interface 1416, thereby enabling control of location determiner 1412 by processor 1406 or by low-power domain processor 1432 (e.g., via extensibility interface 1416). Thus, low-power domain processor 1432 may utilize location determiner 1412 even when processor 1406 is powered off.

It will be appreciated that any of a variety of communication protocols may be used. For instance, extensibility interfaces 1416 and 1422 may utilize USB in the instant example because high-power modem 1426 and/or location determiner 1412 may each implement USB and may therefore communicate with operator interface 1402 and telematics control unit 1404, respectively, with little to no additional processing. In other examples, extensibility interface 1416 and 1422 may implement additional or alternative protocols, for example as may be the case when high-power modem 1426 and/or location determiner 1412 implement one or more different protocols. In other instances, an extensibility interface need not implement the same protocol, such that a translation circuit (e.g., as part of processor 1406 or 1432, extensibility interface 1416 or 1422, or as an independent circuit) may be used to translate communication via an extensibility interface for use by high-power modem 1426, location determiner 1412, or any of a variety of other elements.

Thus, telematics control unit 1404 provides additional and/or low-power functionality in addition to the functionality provided by operator interface 1402. In examples, telematics control unit 1404 may be an add on device, such that a vehicle may have only functionality provided by operator interface 1402 in some examples, while another vehicle may have functionality provided by both operator interface 1402 and telematics control unit 1404. For instance, a vehicle may be outfitted with telematics control unit 1404 during manufacture or after manufacture (e.g., by an operator or at a service center).

Further, as a result of the communication enabled by extensibility interfaces 1416 and 1422, the extent to which components are duplicated may be reduced. As illustrated, telematics control unit 1404 need not include a processor similar to processor 1406, as processor 1406 is able to utilize elements of telematics control unit 1404. Similarly, telematics control unit 1404 need not include a location determiner, as low-power domain processor 1432 may be able to utilize location determiner 1412. Shared modem resources 1428 further reduces component duplication. Additionally, power consumption may also be reduced as a result of shifting processing between processor 1406 and low-power domain processor 1432 and dynamic utilization of low-power modem 1424 or high-power modem 1426 according to aspects described herein.

It will be appreciated that operator interface 1402 and telematics control unit 1404 as illustrated in system 1400 are provided as examples and, in other examples, operator interface 1402 and/or telematics control unit 1404 may include additional, alternative, or fewer elements. For example, operator interface 1402 may include a CAN interface in addition to or as an alternative to CAN interface 1430 of telematics control unit 1404. As another example, telematics control unit 1404 may include a location determiner in addition to or as an alternative to location determiner 1412 of operator interface 1402. Similarly, telematics control unit 1404 may include a communication controller similar to communication controller 1414 or operator interface 1402 may include a modem (e.g., similar to low-power modem 1424 or high-power modem 1426).

Figure 44:
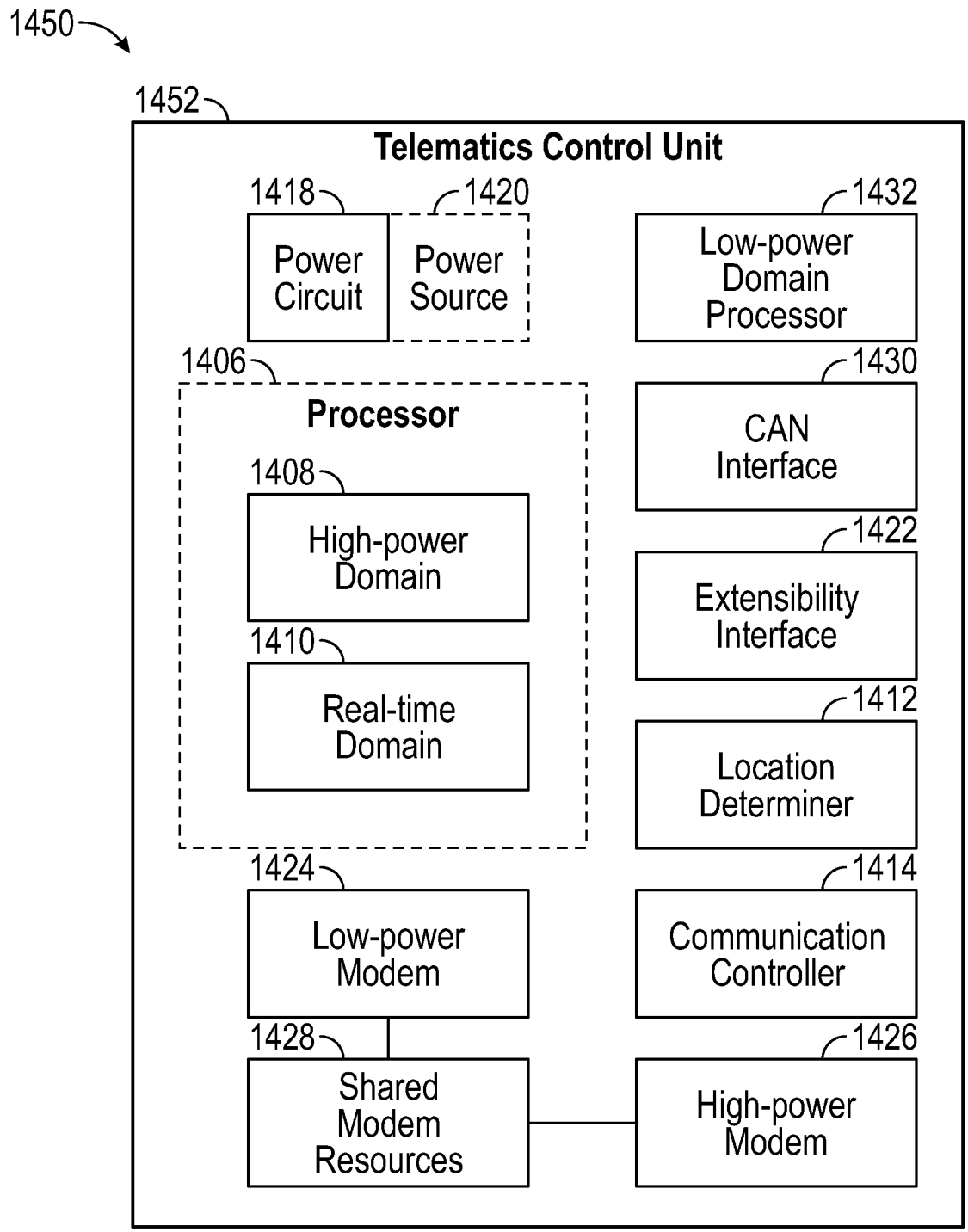
FIG. 44 illustrates an example system in which a telematics control unit incorporates aspects discussed above with respect to FIG. 43.

FIG. 44 illustrates an example system 1450 in which telematics control unit 1452 incorporates aspects of operator interface 1402 and telematics control unit 1404 discussed above with respect to FIG. 43. Accordingly, aspects of telematics control unit 1452 may be similar to those discussed above and are therefore not necessarily re-described below in detail.

As illustrated, telematics control unit 1452 includes power circuit 1418, power source 1420, processor 1406, low-power domain processor 1432, low-power modem 1424, high-power modem 1426, shared modem resources 1428, CAN interface 1430, extensibility interface 1422, location determiner 1412, and communication controller 1414.

Thus, as compared to FIG. 43, telematics control unit 1452 may incorporate the functionality discussed above into a single device. Similar to FIG. 43, processor 1406 and low-power domain processor 1432 may be in switchable communication with high-power modem 1426 via extensibility interface 1422, for example using a USB switch. In other examples, processor 1406 and low-power domain processor 1432 may be a single processor, for example having a set of physical and/or virtual resources allocated to each of high-power domain 1408, real-time domain 1410, and a low-power domain in which processing similar to the processing discussed above with respect to low-power domain processor 1432 is performed.

In examples, processor 1406 and low-power domain processor 1432 may each utilize CAN interface 1430, for example depending on which processor is active. A switch (not pictured) may be used to enable communication via CAN interface 1430 by either processor 1406 or low-power domain processor 1432. Further, in instances where both processors are active, preference may be given to either processor 1406 or low-power domain processor 1432, whereby the other processor is able to access the CAN bus via the processor for which CAN interface 1430 is accessible. As another example, in instances where telematics control unit 1452 is transitioning from a first processor to a second processor, the first processor may buffer CAN data in memory until CAN interface 1430 is been switched to be operable by the second processor, at which point the buffered CAN data may be provided for use by the second processor, thereby reducing the extent to which access to the CAN bus is interrupted.

FIGS. 43 and 44 are provided as example configurations with which to provide the vehicle connectivity functionality described herein. In some instances, telematics control unit 1404 may be used, as may be the case when an operator interface similar to operator interface 1402 is already present or to enable installation of such a telematics control unit after manufacture. Thus, as noted above, telematics control unit 1404 reduces component duplication in such scenarios. In other instances, telematics control unit 1452 may be used, as may be the case when a vehicle does not have an operator interface (e.g., telematics control unit 1452 may be used in a headless configuration without a display) or where the operator interface is provided by telematics control unit 1452 itself. Thus, it will be appreciated that any of a variety of alternative configurations of the described elements may be used in other examples, for example depending on preexisting hardware availability and an intended use case.

Figure 45A:
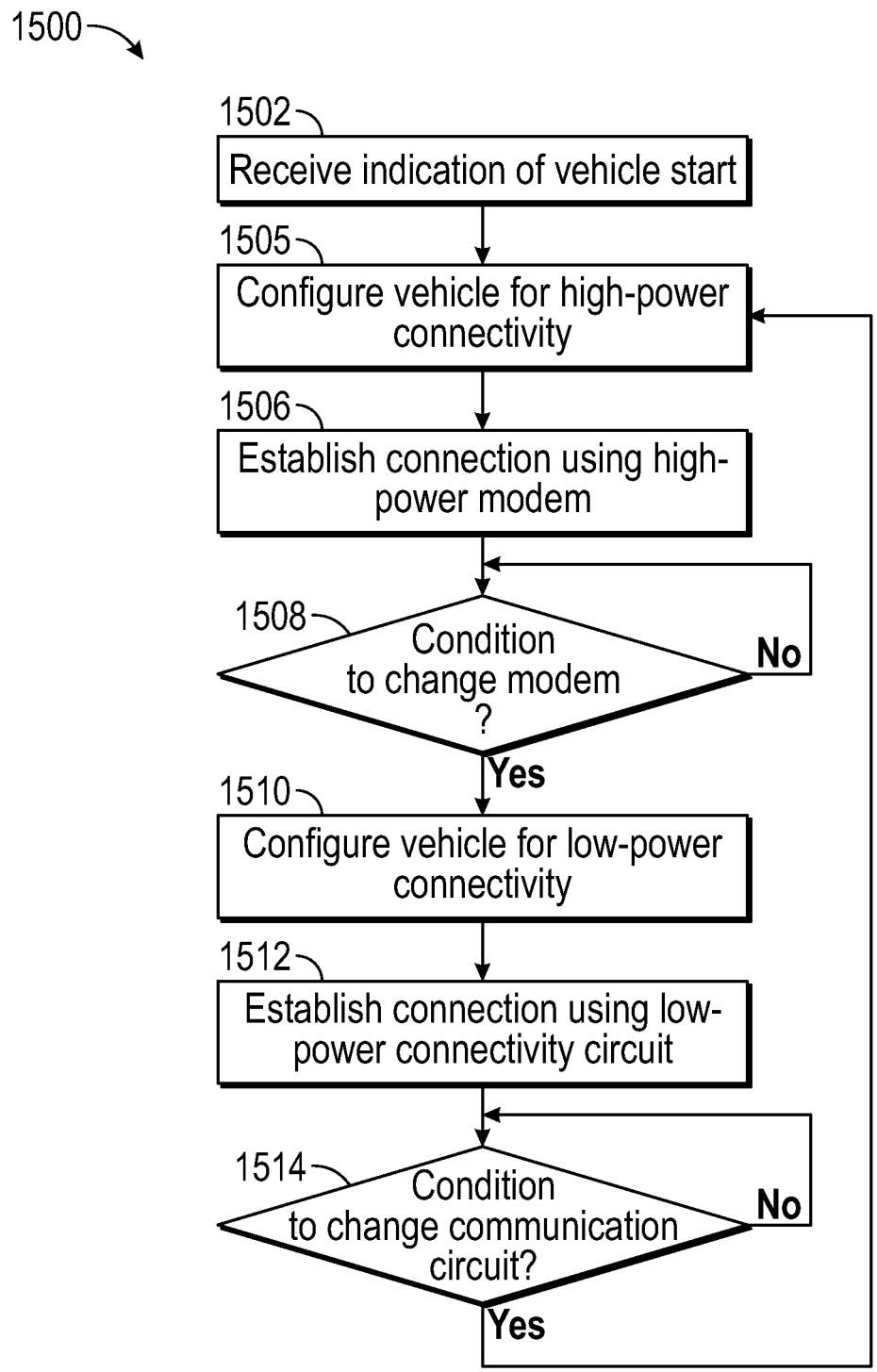
FIG. 45A illustrates an overview of an example method for configuring high-power and low-power connectivity of a vehicle according to aspects described herein.

FIG. 45A illustrates an overview of an example method 1500 for configuring high-power and low-power connectivity of a vehicle according to aspects described herein. In examples, aspects of method 1500 are performed by a telematics control unit, such as telematics control unit 1404 in FIG. 43 or telematics control unit 1452 in FIG. 44.

Method 1500 begins at operation 1502, where an indication of vehicle start is received. For example, the indication may be received as a result of user input received by the vehicle or as a result of user input received by an application on an operator device, among other examples.

Flow progresses to operation 1504, where the vehicle is configured for high-power connectivity. In examples, operation 1504 comprises unregistering a low-power modem (e.g., low-power modem 1424 in FIGS. 43 and 44) from a network and/or shutting down the low-power modem. In some instances, the low-power modem may utilize one or more shared modem resources (e.g., shared modem resources 1428), such that operation 1504 may comprise configuring the shared modem resources for use by a high-power modem (e.g., high-power modem 1426). For instance, an antenna connection may be transitioned from the low-power modem to the high-power modem. Similarly, a SIM may be transitioned to the high-power modem. Additional examples of such aspects are described below with respect to method 1550 of FIG. 45B. In an example, aspects of operation 1504 are performed by a low-power domain processor, such as low-power domain processor 1432.

At operation 1506, a connection is established using the high-power modem. For example, operation 1506 may comprise registering with the network using a SIM. Accordingly, high-power communication may occur using the high-power modem, as may be the case when a vehicle is powered on or charging, among other examples. As an example, the high-power modem may be used to perform activities for which higher bandwidth or use of other modem characteristics provided by the high-power modem is beneficial (e.g., as compared to those of the low-power modem).

Flow eventually progresses to determination 1508, where it is determined whether a condition exists for which to change the modem that is in use. For example, determination 1508 may comprise determining that a vehicle has been powered off, has been unused for a predetermined amount of time, or is not charging. As another example, determination 1508 may comprise determining that the high-power modem has a signal strength below a predetermined threshold or has not been able to (re)establish a network connection for predetermined amount of time. In some instances, an evaluation of the signal strength may use an average over a period of time, as geographic or other features may temporarily affect the detected signal strength. In some instances, determination 1508 may comprise evaluating a location from a location determiner as compared to a coverage map to determine whether the high-power modem is likely to have coverage at the location. While example determinations and associated techniques are described, it will be appreciated that any of a variety of determinations may be performed at determination 1508 in other examples. Additionally, such a determination may be made within a high-power domain or a low-power domain, as discussed above with respect to processor 1406 and low-power domain processor 1432, respectively.

If it is determined that a condition does not exist for which to change the modem, flow branches "NO," such that the high-power modem continues to be used until such a determination is performed again. However, if it is instead determined that a condition exists for which to change the modem, flow branches "YES," where the vehicle is configured for low-power connectivity. Aspects of operation 1510 may be similar to operation 1504, but with respect to the low-power modem rather than the high-power modem.

For instance, operation 1510 may comprise unregistering the high-power modem from the network and/or shutting down the high-power modem. In some instances, the high-power modem may utilize one or more shared modem resources, such that operation 1510 may comprise configuring the shared modem resources for use by the low-power modem. For instance, an antenna connection may be transitioned from the high-power modem to the low-power modem. Similarly, a SIM may be transitioned to the low-power modem. Additional examples of such aspects are described below with respect to method 1550 of FIG. 45B. In an example, aspects of operation 1510 are performed by a low-power domain processor, such as low-power domain processor 1432.

At operation 1512, a connection is established using the low-power modem. For example, operation 1512 may comprise registering with the network using the SIM. Accordingly, low-power communication may occur using the low-power modem, as may be the case when a vehicle is powered off or has been unused for a predetermined amount of time, among other examples. As another example, low-power communication may be used in instances where the low-power modem is capable of greater range or has increased signal sensitivity as compared to the high-power modem.

Flow eventually progresses to determination 1514, where it is determined whether a condition exists for which to change the modem that is in use. For example, determination 1514 may comprise determining that a vehicle has been powered on, has resumed being used by an operator, or is charging. As another example, determination 1508 may comprise determining that the low-power modem has a signal strength above a predetermined threshold or that a location from a location determiner as compared to a coverage map indicates that the high-power modem is likely to have coverage. As noted above, an evaluation of the signal strength may use an average over a period of time. In other examples, determination 1514 may comprise determining that a predetermined amount of time has elapsed since switching to the low-power modem, such that it may be determined to retry connectivity with the high-power modem. While example determinations and associated techniques are described, it will be appreciated that any of a variety of determinations may be performed at determination 1514 in other examples. Additionally, such a determination may be made within a high-power domain or a low-power domain, as discussed above with respect to processor 1406 and low-power domain processor 1432, respectively.

If it is determined that a condition does not exist for which to change the modem, flow branches "NO," such that the low-power modem continues to be used until such a determination is performed again. However, if it is instead determined that a condition exists for which to change the modem, flow branches "YES" and returns to operation 1504, where the vehicle is configured for high-power connectivity.

Thus, flow may loop between operations 1504-1514 to control connectivity of the vehicle using either the low-power modem or the high-power modem depending on a variety of criteria. In some examples, an additional determination may be made to power off both modems, as may be the case when an associated power source (e.g., a vehicle power source or a power source of a telematics control unit) has a state of charge below a predetermined threshold, among other examples.

Additionally, method 1500 is provided in an example where shared modem resources support operation of one modem at a time. However, in some instances, the shared modem resources may comprise multiple antennas (e.g., supporting the same or different frequencies or at different locations of a vehicle) and/or SIMs, such that both the high-power and low-power modems may remain powered and/or in use. In such instances, a method similar to method 1500 may be used to determine which modem should be used to communicate. For instance, such a method may be used to fall back to the low-power modem when it is determined that the high-power modem does not have connectivity and may eventually resume using the high-power modem once it is determined that the high-power modem has reestablished connectivity.

Figure 45B:
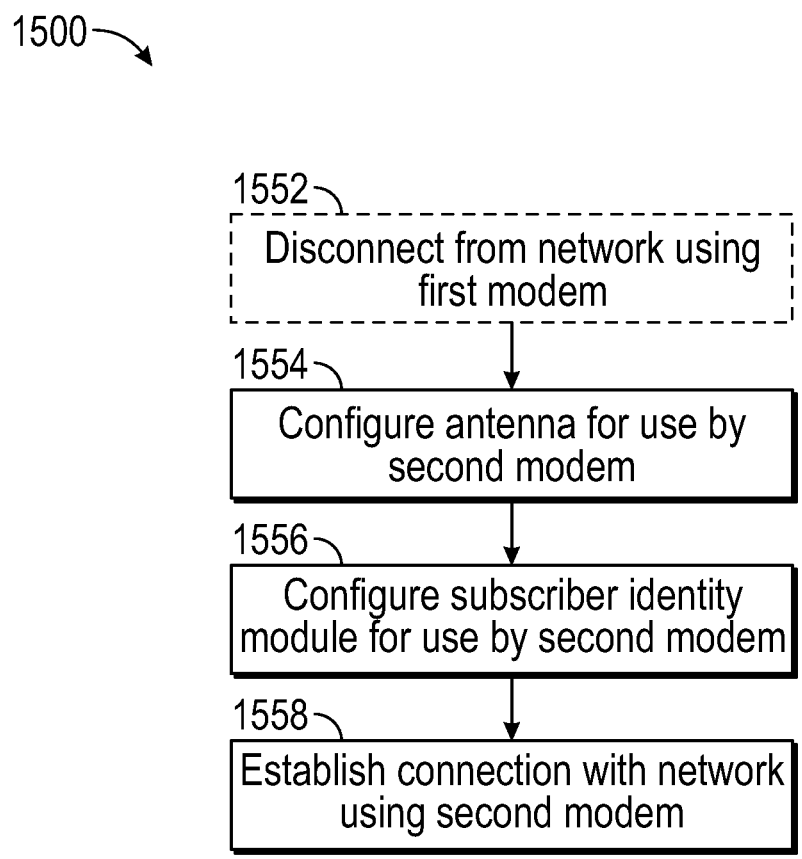
FIG. 45B illustrates an overview of an example method for configuring a high-power or low-power modem of a vehicle.

FIG. 45B illustrates an overview of an example method 1550 for configuring a high-power or low-power modem of a vehicle. In examples, aspects of method 1550 are performed when transitioning from a first modem to a second modem, for example as discussed above with respect to operations 1504 and 1510 of method 1500 in FIG. 45A.

Method 1550 begins at operation 1552, where the first modem is disconnected from a network. In examples, operation 1552 comprises powering down the first modem. As another example, the first modem may be used to provide an indication to the network that unregisters the modem accordingly. Operation 1552 is illustrated using a dashed box to indicate that, in other examples, operation 1552 may be omitted. For instance, a network may automatically unregister a modem or may not request such behavior. As another example, the first modem may remain powered up, as may be the case when data is received or buffered during the transition process.

Flow progresses to operation 1554, where an antenna is configured for use by the second modem. For example, a physical or electronic switch may be used to transition the antenna from the first modem to the second modem. The antenna may be part of shared modem resources (e.g., shared modem resources 1428 discussed above with respect to FIGS. 43 and 44). While example configuration techniques are described, it will be appreciated that any of a variety of other techniques may be used to configure an antenna that was used by a first modem for subsequent use by a second modem.

At operation 1556, a SIM is configured for use by the second modem. Similar to operation 1554, a physical or electronic switch may be used to transition the SIM from the first modem to the second modem. The SIM may be part of the shared modem resources. While example configuration techniques are described, it will be appreciated that any of a variety of other techniques may be used to configure SIM that was used by a first modem for subsequent use by a second modem.

Moving to operation 1558, a connection is established with the network using the second modem. In examples, operation 1558 comprises registering the second modem with the network to establish the connection. In some instances, the network may automatically register the second modem and may similarly automatically unregister the first modem as a result. In other instances, the first modem and second modem may not be unregistered or registered, respectively, as they may connect to different networks or the network may permit multiple devices per SIM. Method 1550 terminates at operation 1558.

It will be appreciated that, in some examples, operation 1554 and/or operation 1556 may be omitted, as may be the case when each modem has an associated antenna or SIM, respectively. In other examples, method 1550 may comprise additional operations, as may be the case when additional resources are transitioned for use by the second modem. Thus, it will be appreciated that similar techniques may be used in instances where a different set of shared modem resources is used with multiple modems.

Figure 46A:
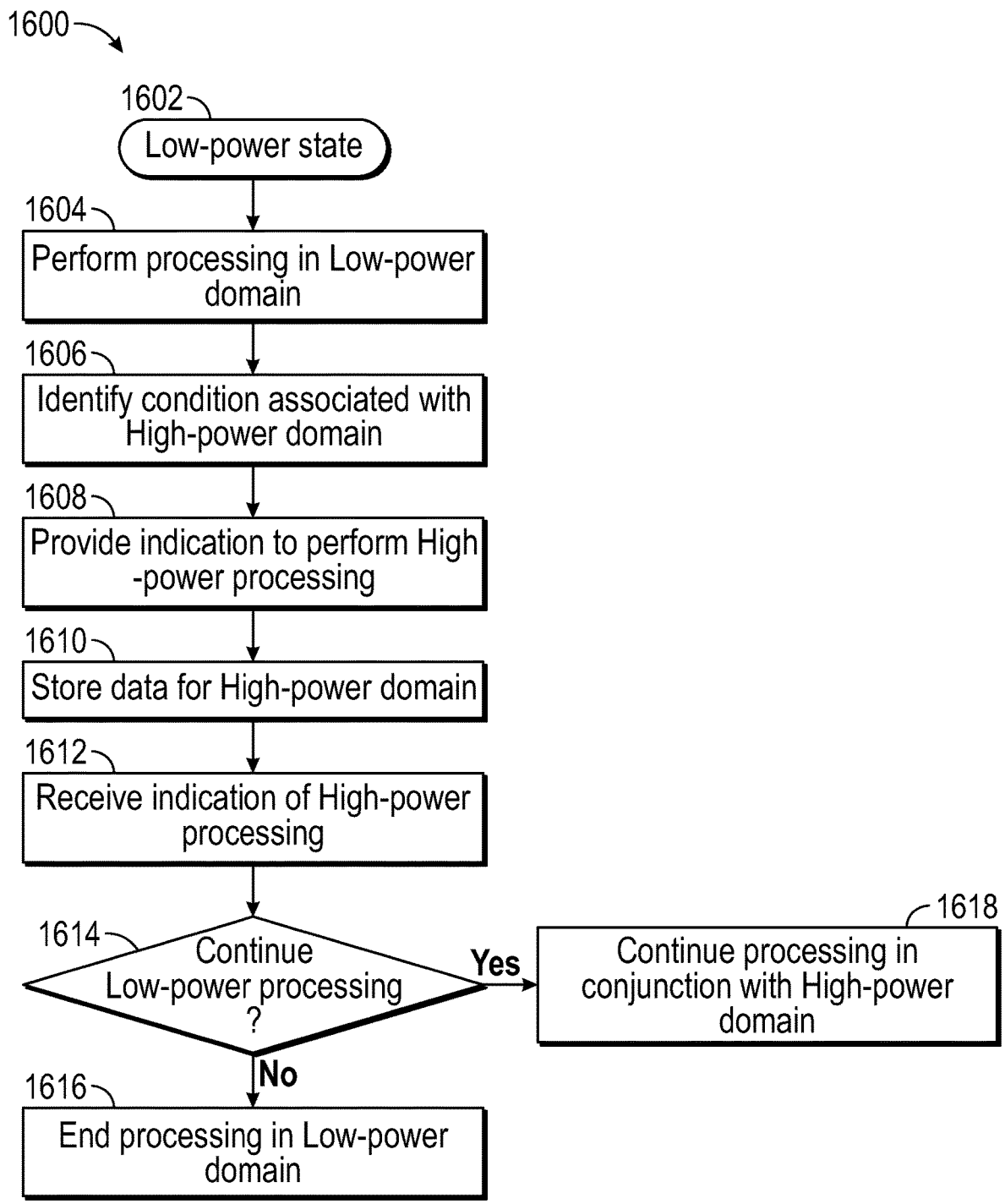
FIG. 46A illustrates an overview of an example method for performing low-power processing according to aspects described herein.

FIG. 46A illustrates an overview of an example method 1600 for performing low-power processing according to aspects described herein. In examples, aspects of method 1600 are performed by a low-power domain processor, such as low-power domain processor 1432 discussed above with respect to FIGS. 43 and 44.

Method 1600 begins at 1602, where a telematics control unit (e.g., telematics control unit 1404 or 1452) is in a low-power state. For example, a vehicle may be off, may have been unused for a predetermined period of time, or a state of charge of a power source may be below a predetermined threshold, among other examples.

Accordingly, at operation 1604, processing is performed in the low-power domain (e.g., as may be performed using a low-power domain processor). Example processing includes, but is not limited to, periodic check-ins with a vehicle platform (e.g., to provide vehicle information, telemetry data, and/or a location from a location determiner), processing accelerometer events, processing associated with a CAN bus (e.g., via a CAN interface such as CAN interface 1430), and managing a network connection of a modem (e.g., low-power modem 1424 and/or high-power modem 1426). Thus, such low-power processing may enable the vehicle connectivity aspects described herein, while prolonging or conserving the power that is available from one or more power sources.

Further, as discussed above, the processing performed at operation 1604 may be adapted as described herein according to any of a variety of conditions, including, but not limited to, a power source state of charge, whether the telematics control unit has a power source (e.g., power source 1420), whether an accelerometer event has been detected (as may be the case during vehicle theft or other external activity), whether an operator device is proximate, and/or depending on user configuration. Behavior of a low-power modem may be configured similarly, for example to adjust an eDRX interval. It will be appreciated that operation 1604 may be performed using a low-power modem or a high-power modem, as may be configured according to aspects of methods 1500 and 1550 discussed above with respect to FIGS. 45A and 45B.

Eventually, flow progresses to operation 1606, where a condition associated with a high-power domain is identified. Example conditions include, but are not limited to, the vehicle being powered on, an indication received from a vehicle platform, or identifying a possibility that the vehicle is being stolen, among other examples.

Accordingly, at operation 1608, an indication is provided to perform high-power processing. For example, the indication may be provided to a processor (e.g., processor 1406) to cause the processor to boot a high-power domain (e.g., high-power domain 1408).

Flow progresses to operation 1610, where data is stored for the high-power domain. For example, CAN messages, accelerometer data, and/or data received from a modem may be buffered at operation 1610. In examples, the data is buffered in storage and/or memory, as may be shared with the high-power domain.

At operation 1612, an indication is received of high-power processing, thereby indicating that the high-power processor has finished booting. In examples, operation 1612 may comprise providing the data that was stored at operation 1610 in response or, as another example, the data may have been stored in a shared location such that it is accessible to the high-power domain.

At determination 1614, it is determined whether to continue low-power processing. As discussed above, a low-power domain processor may continue to perform processing contemporaneously or in cooperation with processing performed in a high-power domain. For example, the low-power processing domain may continue to process accelerometer events and/or location data received from a location determiner, such that an indication of such processing may be provided to the high-power domain. Thus, the low-power domain processor may be used to offload at least some of the processing that would otherwise be performed by the high-power domain, thereby freeing computing resources of the high-power domain and, in some examples, reducing power consumption associated with such processing. As another example, the high-power domain or the low-power domain may be selected over the other domain by virtue of code stability/maturity or computing resource availability, among other examples. Thus, aspects described herein may similarly reduce code complexity and yield stability improvements.

Accordingly, if it is determined to continue the low-power processing, flow branches "YES" to operation 1618, where the low-power domain processor continues processing according to aspects described herein. In other examples, if it is instead determined that the low-power processing should not be continued, flow branches "NO" to operation 1616, where processing in the low-power domain ends, for example by suspending or powering down the low-power domain processor accordingly. Method 1600 ends at either operation 1616 or operation 1618.

Figure 46B:
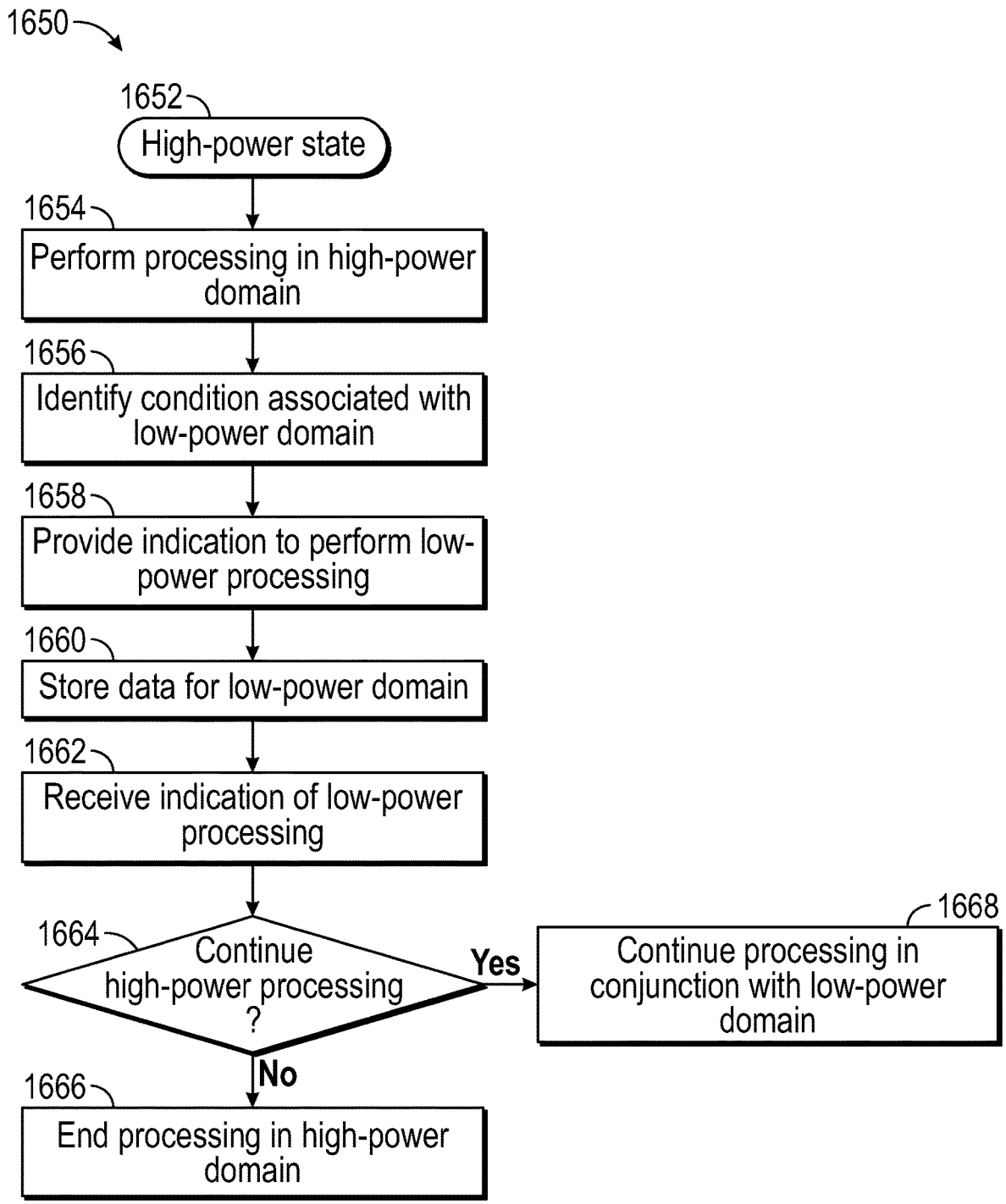
FIG. 46B illustrates an overview of an example method for performing high-power processing according to aspects described herein.

FIG. 46B illustrates an overview of an example method 1650 for performing high-power processing according to aspects described herein. In examples, aspects of method 1650 are performed in a high-power domain, for example high-power domain 1408 of processor 1406 discussed above with respect to FIGS. 43 and 44.

Method 1650 begins at 1652, where a telematics control unit (e.g., telematics control unit 1404 or 1452) is in a high-power state. For example, a vehicle may be in operation or may be charging, among other examples. As another example, the vehicle may be in a high-power state as a result of aspects of method 1600 discussed above with respect to FIG. 46A.

Accordingly, at operation 1654, processing is performed in the high-power domain. Example processing includes, but is not limited to, higher frequency and/or higher fidelity location updates (as compared to the low-power domain), media playback, applying over-the-air updates, and/or processing associated with providing a user interface, among other examples. In some instances, operation 1654 may comprise performing processing in cooperation with a low-power domain processor, as certain processing may be offloaded to the low-power domain processor as described above.

Further, as discussed above, the processing performed at operation 1654 may be adapted according to any of a variety of conditions, including, but not limited to, a power source state of charge, whether the telematics control unit has a power source (e.g., power source 1420), whether an accelerometer event has been detected (as may be the case during vehicle theft or other external activity), whether an operator device is proximate, and/or depending on user configuration. It will be appreciated that operation 1654 may be performed using a low-power modem or a high-power modem, as may be configured according to aspects of methods 1500 and 1550 discussed above with respect to FIGS. 45A and 45B.

Eventually, flow progresses to operation 1656, where a condition associated with a low-power domain is identified. Example conditions include, but are not limited to, the vehicle being powered off, an indication received from a vehicle platform, determining that processing in the high-power domain has completed, or determining that an operator has not engaged with the vehicle after a predetermined amount of time, among other examples.

Accordingly, at operation 1658, an indication is provided to perform low-power processing. For example, the indication may be provided to a low-power domain processor (e.g., low-power domain processor 1432) to cause the low-power domain processor to boot. In some examples, the low-power domain processor may already be active, as may be the case when high-power domain processing is performed contemporaneously with low-power domain processing. Accordingly, operation 1658 may be omitted in some examples.

Flow progresses to operation 1660, where data is stored for the low-power domain. For example, CAN messages, accelerometer data, and/or data received from a modem may be buffered at operation 1660. In examples, the data is buffered in storage and/or memory, as may be shared with the low-power domain.

At operation 1662, an indication is received of low-power processing, thereby indicating that the low-power processor has finished booting. In examples where the low-power processing domain is already active, such an indication may not be received. Operation 1662 may comprise providing the data that was stored at operation 1660 to the low-power domain or, as another example, the data may have been stored in a shared location such that it is accessible to the low-power domain.

At determination 1664, it is determined whether to continue high-power processing. As discussed above, a high-power domain processor may continue to perform processing contemporaneously or in cooperation with processing performed in a low-power domain. For example, the high-power processing domain may continue to provide a user interface, process CAN data, and/or operate a communication controller (e.g., communication controller 1414), such that an indication of such processing may be provided to the low-power domain. Thus, the high-power domain may perform at least some of the processing that would otherwise be performed by the low-power domain, thereby freeing computing resources of the low-power domain. As another example, the high-power domain or the low-power domain may be selected over the other domain by virtue of code stability/maturity or computing resource availability, among other examples. Thus, aspects described herein may similarly reduce code complexity and yield stability improvements.

Accordingly, if it is determined to continue the high-power processing, flow branches "YES" to operation 1668, where the high-power domain processor continues processing according to aspects described herein. In other examples, if it is instead determined that the high-power processing should not be continued, flow branches "NO" to operation 1666, where processing in the high-power domain ends, for example by suspending or powering down the high-power domain processor accordingly. Method 1650 ends at either operation 1666 or operation 1668.

Figure 47A:
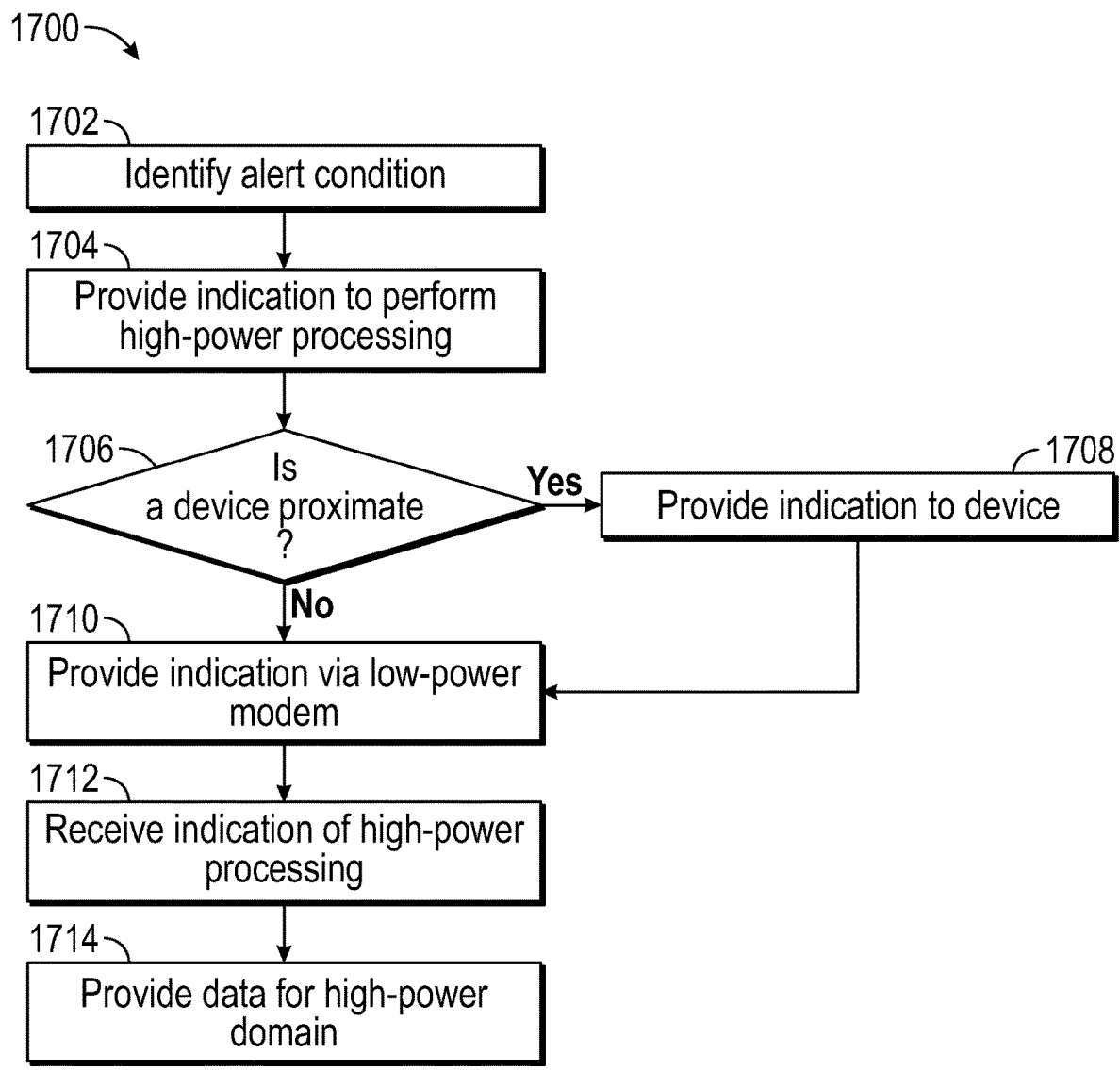
FIG. 47A illustrates an overview of an example method for handling an alert condition in a low-power domain according to aspects of the present disclosure.

FIG. 47A illustrates an overview of an example method 1700 for handling an alert condition in a low-power domain according to aspects of the present disclosure. In examples, aspects of method 1700 are performed by a low-power domain processor, such as low-power domain processor 1432 discussed above with respect to FIGS. 43 and 44.

Method 1700 begins at operation 1702, where an alert condition is identified. For example, an alert condition may be identified based on accelerometer data, location data, and/or any of a variety of other information. In examples, the alert condition may be identified as a result of aspects of methods 600 and 650 discussed above with respect to FIGS. 35A and 35B. Thus, it will be appreciated that any of a variety of alerts may be identified according to aspects described herein.

Flow progresses to operation 1704, where an indication to perform high-power processing is provided. For example, the indication may be provided to a processor (e.g., processor 1406) to cause the processor to boot a high-power domain (e.g., high-power domain 1408).

At operation 1706, it is determined whether a device with which to communicate is proximate. For example, it may be determined whether a communication controller (e.g., communication controller 1414) can communicate with an operator device (e.g., via Bluetooth or Wi-Fi), such that the device is in range. As another example, it may be determined whether communication with there is another vehicle in range with which to communicate.

If it is determined that a device with which to communicate is proximate, flow branches "YES" to operation 1708, where an indication of the alert condition is provided. For example, an indication may be provided to an operator device, such that the operator is notified of the alert condition. As another example, an indication may be provided to a proximate vehicle (e.g., as may be part of the same fleet) or associated with the same operator. In instances where the alert condition is associated with vehicle theft, the alert may include a location, as may be determined by a location determiner. Flow progresses to operation 1710, which is discussed below.

Method 1700 is described in an example where paired or otherwise related devices are available to receive the indication provided at operation 1708. In other examples, determination 1706 and operation 1708 may be omitted and a beacon may be generated instead. For instance, a Bluetooth Low Energy beacon may be transmitted, which may be detected by one or more other devices. Accordingly, an indication of the detected beacon may be provided to a vehicle platform or other beacon aggregation service. In such examples, the beacon may be provided in association with a location for the device by which it was detected, thereby enabling an operator to potentially identify the location of the vehicle or telematics control unit even in instances where an Internet connection is unavailable.

Returning to determination 1706, if it is instead determined that there is not a device that is proximate, flow branches "NO" to operation 1710, where an indication of the identified alert condition is provided (e.g., to a vehicle platform). In examples, the indication may comprise a type of alert condition and a location from a location determiner. Method 1700 is described in an example where a low-power modem (e.g., low-power modem 1424) is used so as to reduce power consumption associated with method 1700. In the present example, the indication may be relatively small in size, such that the higher bandwidth associated with a high-power modem need not be used. Further, it may be beneficial to manage power consumption in such a scenario, such that indications may be provided to the vehicle platform for as long as possible, thereby increasing the likelihood that the vehicle and/or telematics control unit is recovered. It will be appreciated that, in other examples, operation 1710 may further comprise transitioning to the high-power modem according to aspects described herein.

In examples, operations 1708 and/or 1710 are performed multiple times, such that indications are provided while the high-power domain is booting. Thus, such indications may be provided more quickly as compared to instances where the high-power domain must first finish booting (or, in other examples, resuming from a sleep state). Further, while method 1700 is described in an example where indications are provided to a device and/or vehicle platform while the high-power domain is booted, it will be appreciated that any of a variety of additional or alternative actions may be similarly performed. For example, a CAN interface may be used to control one or more vehicle components via a CAN bus, thereby disabling such components and/or placing the vehicle in a lockout state. Similarly, the frequency with which information is provided to the device and/or vehicle platform may be adjusted depending on whether a device was detected at determination 1706 and/or based on the proximity of the device, among other examples.

At operation 1712, an indication of high-power processing is received, thereby indicating that the high-power processor has finished booting. Accordingly, at operation 1714, data is provided to the high-power domain, which enables the high-power domain to continue processing associated with the identified alert condition. In other examples, such data may be stored in a shared location, thereby enabling the high-power domain to access it.

In some examples, the low-power domain processor may power off or enter a sleep state. In other examples, the low-power domain processor may continue to process location information from a location determiner, as may be provided to the high-power domain for processing, among other example processing. Method 1700 terminates at operation 1714.

Figure 47B:
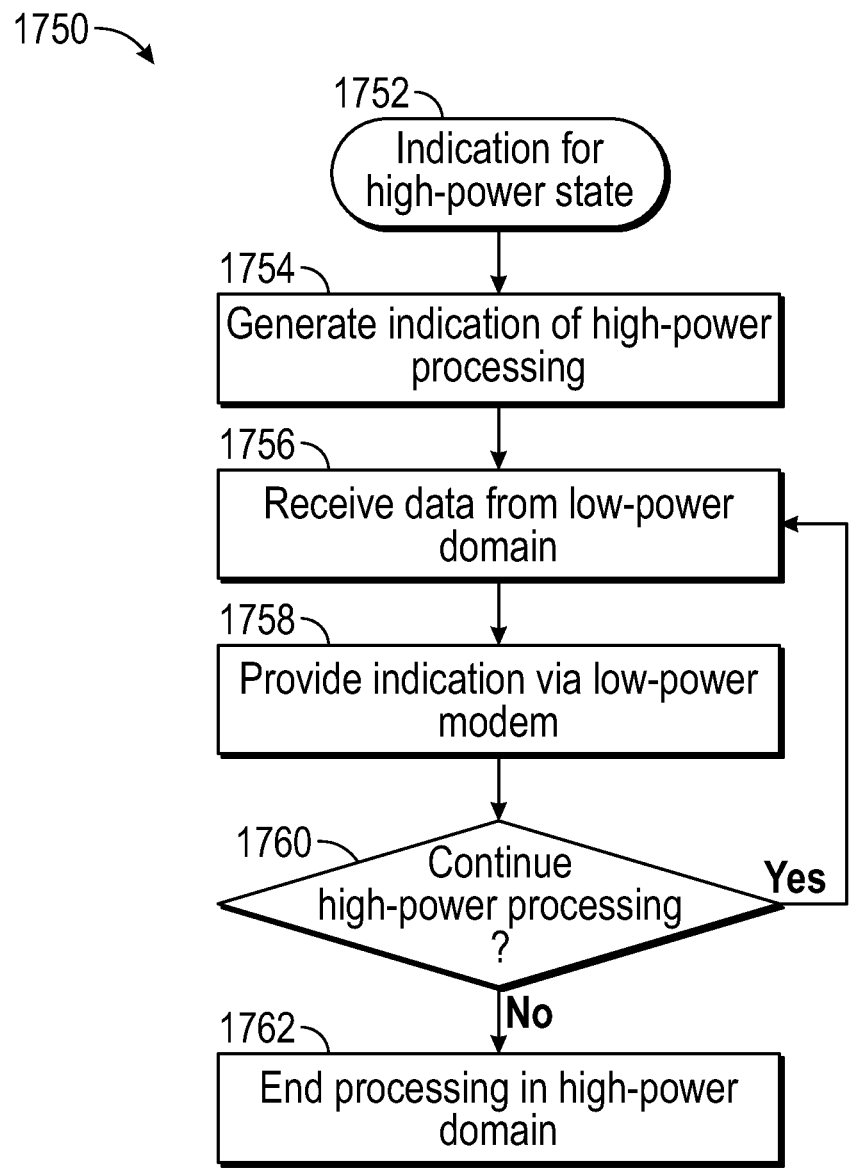
FIG. 47B illustrates an overview of an example method for handling an alert condition in a high-power domain according to aspects of the present disclosure.

FIG. 47B illustrates an overview of an example method 1750 for handling an alert condition in a high-power domain according to aspects of the present disclosure. In examples, aspects of method 1750 are performed by a processor having a high-power domain, such as processor 1406 discussed above with respect to FIGS. 43 and 44.

Method 1750 begins at 1752, where an indication for a high-power state is received. For example, the indication may be received as a result of a low-power domain processor performing aspects of operations 1704 discussed above with respect to FIG. 47A.

Accordingly, operation 1754 is performed once the high-power domain is booted, where an indication of high-power processing is generated. The indication may be provided to a low-power domain processor, such that it is received by the low-power domain processor at operation 1712 discussed above with respect to FIG. 47A.

Flow progresses to operation 1756, where data is received from the low-power domain processor. For example, the received data may comprise a location from a location determiner, an indication as to the type of alert condition, and/or information from a CAN bus of the vehicle, among other data. In other examples, such data may instead be accessed from a shared location.

At operation 1758, an indication is provided via the low-power modem. The indication may be provided to a vehicle platform and/or to another device (similar to operations 1708 and/or 1710 discussed above). The provided indication may comprise at least a part of the data that was received from the low-power domain processor, as well as additional information that may be generated by high-power domain processing. As compared to an indication that may be provided by a low-power domain processor (e.g., performing aspects of operation 1708 and/or 1710), indications provided at operation 1758 may be provided at a higher frequency, may be of a higher fidelity, and/or have more information, among other examples. Thus, the combined processing performed by a low-power domain processor performing aspects of method 1700 and a high-power domain performing aspects of method 1750 enable both indications that are close in time to when the alert condition is first identified, as well as indications that have a higher frequency/fidelity or require additional processing on the part of the telematics control unit.

Flow progresses to determination 1760, where it is determined whether to continue high-power processing. In examples, it may be determined whether the alert condition is still present and/or whether a power source is above a predetermined threshold, among other examples. As another example, if it is determined that an operator device is no longer within range of the vehicle (e.g., according to a communication controller or within a predetermined distance), it may be determined not to continue high-power processing, as lower frequency updates may be sufficient (for example at least until it is determined the operator is once again proximate to the vehicle).

Accordingly, if it is determined to continue high-power processing, flow returns to operations 1756 and 1758, such that indications continue to be provided (e.g., while the alert condition is present). Further, while method 1750 is described in an example where indications are provided to a device and/or vehicle platform, it will be appreciated that any of a variety of additional or alternative actions may be similarly performed. For example, a CAN interface may be used to control one or more vehicle components via a CAN bus, thereby disabling such components and/or placing the vehicle in a lockout state. For instance, an operator interface may be disabled or may be configured to display information, among other examples. Similar to method 1700, the frequency with which information is provided to the device and/or vehicle platform may be adjusted depending on a state of charge and/or whether a device is within range of a communication controller or proximate to the vehicle, among other examples.

Returning to determination 1760, if it is instead determined not to continue high-power processing, flow branches "NO" and terminates at operation 1762, where processing in the high-power domain ends. For example, the processor may enter a sleep state or may be powered down, among other examples.

FIGS. 47A and 47B are provided as an example of contemporaneous or cooperative processing that may be performed by a processor having a high-power domain and a low-power domain processor. While the instant example is discussed in the context of identifying and handling an alert condition, it will be appreciated that similar techniques may be used in any of a variety of other scenarios, for example to reduce power consumption while improving the availability of a vehicle to provide aspects of the connected functionality described herein.

The following clauses are provided as example aspects of the disclosed subject matter:

1. An intercept circuit for a vehicle, comprising: a first connector that can be connected to a key switch connector of the vehicle; a second connector that can be connected to a key switch harness of the vehicle; and a controller connected to the first connector and the second connector, wherein the controller is configured to: pass a signal from the first connector to the second connector in a first operating mode; and interrupt the signal in a second operating mode, thereby preventing transmission of the signal from the first connector to the second connector.

2. The intercept circuit of clause 1, wherein the controller is further configured to switch from the first operating mode to the second operating mode after a predetermined period of inactivity.

3. The intercept circuit of clause 2, wherein switching from the first operating mode to the second operating mode comprises generating a timeout warning.

4. The intercept circuit of any one of clauses 2-3, wherein: the intercept circuit further comprises a connection to a controller area network; and the predetermined period of inactivity is identified based on the connection to the controller area network.

5. The intercept circuit of any one of clauses 1-4, wherein the controller is further configured to generate a signal via the second connector, thereby operating functionality of the vehicle via the key switch harness.

6. The intercept circuit of clause 5, wherein the controller is further configured to: receive an indication to operate the functionality of the vehicle; evaluate a state of charge of the vehicle based on a predetermined threshold; and when the state of charge of the vehicle exceeds the predetermined threshold, generate the signal to operate the functionality of the vehicle.

7. The intercept circuit of clause 6, wherein the indication is received via a connectivity circuit of the vehicle.

8. The intercept circuit of any one of clauses 1-7, further comprising a third connector that can be connected to a key switch harness of the vehicle, wherein the second connector is a non-critical accessory connector and the third connector is a critical accessory connector.

9. The intercept circuit of clause 8, wherein a signal is provided via the third connector in the second operating mode, thereby disabling a non-critical accessory of the vehicle and retaining power to a critical accessory of the vehicle.

10. The intercept circuit of any one of clauses 8-9, wherein the controller is further configured to: evaluate a state of charge of the vehicle based on a predetermined threshold; and provide, based on the state of charge of the vehicle, a signal via at least one of the second connector or the third connector.

11. A vehicle, comprising: a frame; a prime mover supported by the frame; a battery supported by the frame; and a controller configured to: receive an indication of an operating mode, wherein the operating mode is at least one of: a shipping operating mode; an operator connectivity operating mode; an off-season storage operating mode; a start guarantee operating mode; an over-the-air (OTA) operating mode; and a warehouse operating mode; and configure the vehicle according to the indicated operating mode.

12. The vehicle of clause 11, wherein the indication is received via a connection of the controller to a key switch connector, and the connection is associated with the indicated operating mode.

13. The vehicle of clause 11, wherein the indication is received via a connectivity circuit of the vehicle.

14. The vehicle of clause 11, wherein the indication is received via a controller area network of the vehicle.

15. The vehicle of any one of clauses 11-14, wherein the controller is further configured to: evaluate a state of charge associated with the battery; and based on the state of charge of the battery, configure the vehicle according to the indicated operating mode.

16. The vehicle of any one of clauses 11-15, wherein the start guarantee operating mode is associated with a state of charge of the battery and comprises: a full connectivity operating mode; a limited connectivity operating mode; and a no connectivity operating mode.

17. The vehicle of any one of clauses 11-16, wherein configuring the vehicle according the warehouse operating mode comprises: limiting a power output of the prime mover;
restricting functionality of an operator interface; and configuring a light of the vehicle to operate at reduced brightness.

18. The vehicle of any one of clauses 11-17, wherein configuring the vehicle comprises: providing an indication to a vehicle control module of the vehicle to configure vehicle functionality according to the indicated operating mode.

19. A method for configuring a vehicle based on a state of charge of a battery, comprising: evaluating, based on a first predetermined threshold, the state of charge; based on determining the state of charge is below the first predetermined threshold: configuring a connectivity circuit of the vehicle to awaken periodically; and when the connectivity circuit is awake, communicating with a vehicle platform; evaluating, based on a second predetermined threshold that is below the first predetermined threshold, the state of charge; and based on determining the state of charge is below the second predetermined threshold: disabling the connectivity circuit of the vehicle.

20. The method of clause 19, further comprising: evaluating, based on the first predetermined threshold, the state of charge; and based on determining the state of charge is above the first predetermined threshold: configuring the connectivity circuit of the vehicle to an enabled state; and maintaining a communication session with the vehicle platform.

21. The method of any one of clauses 19-20, wherein: a first notification is generated based on determining the state of charge is below the first predetermined threshold; and a second notification is generated based on determining the state of charge is below the second predetermined threshold.

22. The method of clause 21, wherein the first notification and the second notification are provided to an operator device.

23. The method of any one of clauses 19-22, wherein the second predetermined threshold represents a state of charge above a minimum state of charge for operation of a prime mover of the vehicle.

24. The method of any one of clauses 19-23, further comprising: receiving, from the vehicle platform, a threshold update to at least one of the first predetermined threshold or the second predetermined threshold; and storing the threshold update.

25. The method of any one of clauses 19-24, wherein a set of non-critical components is disabled based on determining the state of charge is below the first predetermined threshold.

26. The method of clause 25, wherein communicating with the vehicle platform comprises transmitting data from a set of critical components of the vehicle.

27. The method of any one of clause 19-26, wherein a set of critical components is disabled based on determining the state of charge is below the second predetermined threshold 28. The method of any one of clauses 19-27, wherein a set of non-critical components and a set of critical components are enabled based on determining the state of charge is above the first predetermined threshold.

29. The method of any one of clauses 19-28, wherein the state of charge is based on a voltage of the battery.

30. A telematics control unit for a vehicle, comprising: a first cellular modem; a second cellular modem; a set of shared modem resources comprising an antenna; a switch having: a first state in which the first modem is coupled to the antenna; and a second state in which the second modem is coupled to the antenna; and a controller connected to the switch, wherein the controller is configured to: configure the switch in the first state; establish a first connection with a cellular network using the first modem; configure the switch in the second state; and establish a second connection with the cellular network using the second modem.

31. The telematics control unit of clause 30, wherein the controller determines to configure the switch in the second state based on a geographic location of the telematics control unit in relation to a coverage map associated with the cellular network.

32. The telematics control unit of any one of clauses 30-31, wherein the controller determines to configure the switch in the second state from the first state when a signal strength of the first modem is below a first predetermined threshold.

33. The telematics control unit of any one of clauses 30-32, wherein the controller is further configured to: configure the switch from the second state to the first state; and establish a third connection with the cellular network using the first modem.

34. The telematics control unit of clause 33, wherein the controller determines to configure the switch from the second state to the first state when a signal strength of the second modem is above a second predetermined threshold.

35. The telematics control unit of any one of clauses 30-34, wherein the set of shared modem resources further comprises a second antenna usable by at least the first modem that is internal to the telematics control unit.

36. The telematics control unit of any one of clauses 30-35, wherein: the switch is a first switch; the set of shared modem resources further comprises a subscriber identity module (SIM); the telematics control unit further comprises a second switch having: a first state in which the first modem is coupled to the SIM; and a second state in which the second modem is coupled to the SIM; and the first state of the first switch is associated with the first state of the second switch and the second state of the first switch is associated with the second state of the second switch.

37. The telematics control unit of any one of clauses 30-36, wherein: the second cellular modem implements Category M of a Long Term Evolution (LTE) standard; and the controller determines to configure the switch in the second state from the first state when a state of charge associated with a power source is below a predetermined threshold.

38. The telematics control unit of any one of clauses 30-37, wherein the first cellular modem implements Category 1 of the LTE standard.

39. The telematics control unit of any one of clauses 30-38, wherein the controller is further configured to: configure the switch from the second state to the first state in response to an indication received from the cellular network using the second cellular modem.

40. A telematics control unit for a vehicle, comprising: a cellular modem; a switch in electrical communication with the cellular modem; an extensibility interface that enables communication with the cellular modem via the switch when the switch is in a first state; and a processor in communication with the cellular modem via the switch with the switch is in a second state, wherein the processor is configured to: based on determining to perform processing in a high-power domain, configure the switch to be in the first state; and based on determining to perform processing in a low-power domain associated with the processor, configure the switch to be in the second state.

41. The telematics control unit of clause 40, wherein the processor is further configured to provide data associated with the cellular modem via the extensibility interface when the switch is configured to the first state from the second state.

42. The telematics control unit of any one of clauses 40-41, wherein the processor is further configured to receive data from an operator interface via the extensibility interface when the switch is configured to the second state from the first state.

43. The telematics control unit of any one of clauses 40-42, wherein the telematics control unit further comprises a power source and the processor is configured to switch between the first state and the second state based at least in part on a state of charge of the power source.

44. The telematics control unit of clause 43, wherein the processor operates at a voltage below a voltage range of the power source.

45. The telematics control unit of any one of clauses 40-44, wherein the switch is a Universal Serial Bus (USB) switch and the extensibility interface enables access to the USB switch by an operator interface.

46. The telematics control unit of any one of clauses 40-46, wherein: the high-power domain is associated with a processor of an operator interface; and the extensibility interface enables communication between the processor of the operator interface and the cellular modem for processing in the high-power domain.

47. The telematics control unit of any one of clauses 40-46, wherein: the cellular modem is a first cellular modem; and the telematics control unit further comprises: a second cellular modem in electrical communication with the processor; and a set of shared modem resources associated with the first cellular modem and the second cellular modem.

48. The telematics control unit of clause 47, wherein: the processor configures the set of shared modem resources for use by the first cellular modem for processing in the high-power domain; and the processor configures the set of shared modem resources for use by the second cellular modem for processing in the low-power domain.

49. A method for managing a high-power state and a low-power state of a telematics control unit, the method comprising: processing, using a low-power domain of a first processor of the telematics control unit, data received from a vehicle platform using a first cellular modem; determining, based on the received data, to transition to the high-power state; based on determining to transition to the high power state, booting a high-power domain of a second processor of the telematics control unit; and in response to receiving an indication from the high-power domain, providing at least a part of the received data to the second processor for processing.

50. The method of clause 49, further comprising: based on determining to transition to the high power state, configuring a set of shared modem resources of the telematics control unit for use by a second cellular modem, wherein the second processor of the telematics control unit is in communication with the second cellular modem.

51. The method of any one of clauses 49-50, further comprising: in response to receiving the indication from the high-power domain, placing the first processor of the telematics control unit in a sleep mode.

52. The method of clause 51, further comprising: receiving an indication that processing in the high-power domain has concluded; and in response to the indication that processing in the high-power domain has concluded, waking the first processor of the telematics control unit.

53. The method of any one of clauses 49-52, wherein the first processor buffers data from a controller area network (CAN) bus and provides at least a part of the buffered data to the second processor in response to receiving the indication from the high-power domain.

54. The method of any one of clauses 49-53, wherein the first processor processes the received data while the high-power domain of the second processor is booting.

55. The method of clause 54, wherein: the data received from the vehicle platform is an over-the-air update; processing the received data while the high-power domain of the second processor is booting comprises staging at least a part of the over-the-air update; and the over-the-air update is processed in the high-power domain to apply the update.

56. The method of any one of clauses 49-55, wherein the first processor provides an indication of a location obtained from a location determiner while the high-power domain of the second processor is booting.

57. The method of any one of clauses 49-56, wherein the first processor provides an indication of telemetry data obtained from a controller area network (CAN) bus.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for configuring a vehicle based on a state of charge of a battery, comprising:
    evaluating, based on a first predetermined threshold, the state of charge;
    based on determining the state of charge is below the first predetermined threshold:
        configuring a connectivity circuit of the vehicle to awaken periodically; and
        when the connectivity circuit is awake, communicating with a vehicle platform;
    evaluating, based on a second predetermined threshold that is below the first predetermined threshold, the state of charge; and
    based on determining the state of charge is below the second predetermined threshold:
        disabling the connectivity circuit of the vehicle.

2. The method of claim 1, further comprising:
    evaluating, based on the first predetermined threshold, the state of charge; and
    based on determining the state of charge is above the first predetermined threshold:
        configuring the connectivity circuit of the vehicle to an enabled state; and
        maintaining a communication session with the vehicle platform.

3. The method of claim 1, wherein:
    a first notification is generated based on determining the state of charge is below the first predetermined threshold; and
    a second notification is generated based on determining the state of charge is below the second predetermined threshold.

4. The method of claim 3, wherein the first notification and the second notification are provided to an operator device.

5. The method of claim 1, wherein the second predetermined threshold represents a state of charge above a minimum state of charge for operation of a prime mover of the vehicle.

6. The method of claim 1, further comprising:
- receiving, from the vehicle platform, a threshold update to at least one of the first predetermined threshold or the second predetermined threshold; and
- storing the threshold update.

7. The method of claim 1, wherein a set of non-critical components is disabled based on determining the state of charge is below the first predetermined threshold.

8. The method of claim 7, wherein communicating with the vehicle platform comprises transmitting data from a set of critical components of the vehicle.

9. The method of claim 1, wherein a set of critical components is disabled based on determining the state of charge is below the second predetermined threshold.

10. The method claim 1, wherein a set of non-critical components and a set of critical components are enabled based on determining the state of charge is above the first predetermined threshold.

11. The method of claim 1, wherein the state of charge is based on a voltage of the battery.

\* \* \* \* \*